US010194017B2

United States Patent
Skelton

(10) Patent No.: US 10,194,017 B2
(45) Date of Patent: Jan. 29, 2019

(54) SYSTEMS, DEVICES AND METHODS FOR VEHICLES

(71) Applicant: Clay Skelton, Roanoke, VA (US)

(72) Inventor: Clay Skelton, Roanoke, VA (US)

(73) Assignee: Mill Mountain Capital, LLC, Roanoke, VA (US)

( * ) Notice: Subject to any disclaimer, the term of this patent is extended or adjusted under 35 U.S.C. 154(b) by 0 days.

(21) Appl. No.: 15/225,237

(22) Filed: Aug. 1, 2016

(65) Prior Publication Data

US 2017/0104865 A1 Apr. 13, 2017

Related U.S. Application Data

(63) Continuation-in-part of application No. 15/067,314, filed on Mar. 11, 2016, which is a continuation of application No. 13/711,274, filed on Dec. 11, 2012, now Pat. No. 9,283,931.

(60) Provisional application No. 61/653,438, filed on May 31, 2012, provisional application No. 61/569,585, filed on Dec. 12, 2011.

(51) Int. Cl.
| | |
|---|---|
| H04M 1/725 | (2006.01) |
| H04B 1/3822 | (2015.01) |
| H04L 12/24 | (2006.01) |
| H04L 29/12 | (2006.01) |
| H04W 12/06 | (2009.01) |
| H04W 4/04 | (2009.01) |
| H04L 12/40 | (2006.01) |

(52) U.S. Cl.
CPC ...... *H04M 1/72569* (2013.01); *H04B 1/3822* (2013.01); *H04L 41/0686* (2013.01); *H04L 61/6022* (2013.01); *H04W 4/046* (2013.01); *H04W 12/06* (2013.01); *H04L 2012/40215* (2013.01)

(58) Field of Classification Search
CPC ............ H04M 1/72569; H04B 1/3822; H04W 4/046; H04W 12/06; H04L 61/6022; H04L 41/0686; H04L 2012/40215
See application file for complete search history.

(56) References Cited

U.S. PATENT DOCUMENTS

| | | | | | |
|---|---|---|---|---|---|
| 5,838,227 | A | * | 11/1998 | Murray | ................... B60R 25/04 307/1 |
| 6,002,921 | A | * | 12/1999 | Pfahlert | .............. B60R 11/0241 455/420 |
| 6,069,411 | A | * | 5/2000 | Charron | ................... B60R 25/04 180/287 |
| 6,104,309 | A | * | 8/2000 | Ozawa | .................... B60R 25/24 340/12.51 |

(Continued)

*Primary Examiner* — Courtney D Heinle
(74) *Attorney, Agent, or Firm* — Rhodes IP PLC; Christopher R Rhodes

(57) ABSTRACT

Certain configurations described herein are directed to a system configured to detect the presence of at least one mobile device within a vehicle and determine if the detected mobile device is an authorized mobile device. In some instances, the system comprises a processor separate from a vehicle engine control unit, in which the processor is electrically coupled to a first antenna configured to receive a wireless transmission from the mobile device when the mobile device is present in the vehicle and transmitting wirelessly. The processor may also be configured to determine if the detected mobile device is an authorized mobile device.

19 Claims, 27 Drawing Sheets

(56) References Cited

U.S. PATENT DOCUMENTS

| | | | | |
|---|---|---|---|---|
| 6,535,107 B1* | 3/2003 | Bartz | ............ | B60R 25/24 340/5.2 |
| 2002/0135466 A1* | 9/2002 | Bunyan | ............ | B60R 25/24 340/426.1 |
| 2003/0083113 A1* | 5/2003 | Chua | ............ | H04M 1/6083 455/569.2 |
| 2004/0002354 A1* | 1/2004 | Nagano | ............ | B60R 25/245 455/550.1 |
| 2004/0051379 A1* | 3/2004 | Turner | ............ | B60R 25/045 307/10.2 |
| 2004/0227615 A1* | 11/2004 | John | ............ | B60R 7/06 340/5.61 |
| 2004/0233046 A1* | 11/2004 | Gotfried | ............ | B60R 25/04 340/426.1 |
| 2005/0200204 A1* | 9/2005 | Jonsson | ............ | B63C 9/0005 307/10.3 |
| 2005/0266958 A1* | 12/2005 | Ehrmaier | ............ | B60K 28/10 477/73 |
| 2006/0006983 A1* | 1/2006 | Inoue | ............ | G07C 9/00309 340/5.61 |
| 2006/0083406 A1* | 4/2006 | Ishimura | ............ | B60R 25/24 382/106 |
| 2006/0125348 A1* | 6/2006 | Smith | ............ | B06B 1/0292 310/309 |
| 2006/0152348 A1* | 7/2006 | Ohtaki | ............ | B60R 25/04 340/426.1 |
| 2006/0232131 A1* | 10/2006 | Endo | ............ | B60R 25/042 307/10.2 |
| 2006/0232491 A1* | 10/2006 | Nakamura | ............ | G01R 29/0821 343/841 |
| 2006/0238300 A1* | 10/2006 | Ohtaki | ............ | B60R 25/04 340/5.72 |
| 2006/0264111 A1* | 11/2006 | Ohtaki | ............ | H03G 3/3068 439/637 |
| 2007/0000712 A1* | 1/2007 | Kamiya | ............ | B60R 25/02153 180/287 |
| 2007/0100514 A1* | 5/2007 | Park | ............ | B60R 25/00 701/2 |
| 2008/0045381 A1* | 2/2008 | Vermeersch | ............ | B60R 25/066 477/99 |
| 2008/0085689 A1* | 4/2008 | Zellner | ............ | H04M 1/6075 455/187.1 |
| 2008/0204332 A1* | 8/2008 | Ikeura | ............ | H01Q 1/3241 343/703 |
| 2009/0033150 A1* | 2/2009 | Ko | ............ | B60R 25/045 307/10.6 |
| 2009/0085725 A1* | 4/2009 | Brookner | ............ | G06Q 10/10 340/10.41 |
| 2009/0253408 A1* | 10/2009 | Fitzgerald | ............ | G06F 21/316 455/411 |
| 2010/0017056 A1* | 1/2010 | Asakura | ............ | B60R 25/04 701/36 |
| 2010/0151917 A1* | 6/2010 | Wilson | ............ | H04B 1/3877 455/571 |
| 2010/0152961 A1* | 6/2010 | Atri | ............ | G01C 21/26 701/31.4 |
| 2010/0210254 A1* | 8/2010 | Kelly | ............ | G07C 5/008 455/418 |
| 2010/0214083 A1* | 8/2010 | McNay | ............ | B60R 25/25 340/426.1 |
| 2010/0234068 A1* | 9/2010 | Bolton | ............ | G06F 13/387 455/557 |
| 2010/0279627 A1* | 11/2010 | Bradley | ............ | H04M 1/72577 455/69 |
| 2010/0314190 A1* | 12/2010 | Zimmermann | ............ | A61B 5/18 180/272 |
| 2010/0323657 A1* | 12/2010 | Barnard | ............ | H04M 1/663 455/404.1 |
| 2011/0065375 A1* | 3/2011 | Bradley | ............ | H04M 1/72577 455/1 |
| 2011/0070930 A1* | 3/2011 | Pothul | ............ | H04M 1/667 455/575.9 |
| 2011/0087385 A1* | 4/2011 | Bowden | ............ | B60W 50/085 701/2 |
| 2011/0117903 A1* | 5/2011 | Bradley | ............ | H04M 1/6075 455/418 |
| 2011/0275321 A1* | 11/2011 | Zhou | ............ | H04M 1/6091 455/41.2 |
| 2011/0294466 A1* | 12/2011 | Tang | ............ | H04W 4/046 455/411 |
| 2011/0295458 A1* | 12/2011 | Halsey-Fenderson | ............ | B60K 28/10 701/29.1 |
| 2012/0006611 A1* | 1/2012 | Wallace | ............ | H04M 1/67 180/272 |
| 2012/0021777 A1* | 1/2012 | Lazaridis | ............ | H04W 4/046 455/456.4 |
| 2012/0028680 A1* | 2/2012 | Breed | ............ | B60C 11/24 455/556.1 |
| 2012/0071151 A1* | 3/2012 | Abramson | ............ | H04L 67/12 455/418 |
| 2012/0078473 A1* | 3/2012 | Ridder | ............ | A61B 5/0071 701/45 |
| 2012/0162891 A1* | 6/2012 | Tranchina | ............ | B60R 11/0252 361/679.26 |
| 2012/0173128 A1* | 7/2012 | Peeler | ............ | G06Q 10/06 701/113 |
| 2012/0214408 A1* | 8/2012 | Chronister | ............ | H04W 12/06 455/26.1 |
| 2012/0214472 A1* | 8/2012 | Tadayon | ............ | H04B 5/0062 455/418 |
| 2012/0232765 A1* | 9/2012 | Holub | ............ | B60R 25/08 701/66 |
| 2012/0244883 A1* | 9/2012 | Tibbitts | ............ | H04W 48/04 455/456.2 |
| 2012/0253552 A1* | 10/2012 | Skelton | ............ | B60K 28/063 701/2 |
| 2012/0258668 A1* | 10/2012 | Rokusek | ............ | H04N 21/41407 455/66.1 |
| 2012/0264409 A1* | 10/2012 | Geyer | ............ | H04W 4/02 455/415 |
| 2012/0278882 A1* | 11/2012 | Lydon | ............ | G06F 21/31 726/17 |
| 2012/0282906 A1* | 11/2012 | Frye | ............ | H04W 4/04 455/414.2 |
| 2012/0282908 A1* | 11/2012 | Nicolini | ............ | H04W 4/04 455/418 |
| 2012/0283894 A1* | 11/2012 | Naboulsi | ............ | B60R 11/0264 701/1 |
| 2012/0289217 A1* | 11/2012 | Riemer | ............ | H04M 1/72577 455/418 |
| 2012/0313768 A1* | 12/2012 | Campbell | ............ | B60R 25/2009 340/438 |
| 2013/0006526 A1* | 1/2013 | Banus | ............ | G01C 21/265 701/444 |
| 2013/0102282 A1* | 4/2013 | Cutts | ............ | G06F 21/10 455/411 |
| 2013/0116892 A1* | 5/2013 | Wu | ............ | B60R 25/09 701/45 |
| 2013/0137489 A1* | 5/2013 | Takikawa | ............ | H04W 4/001 455/566 |
| 2013/0151111 A1* | 6/2013 | Skelton | ............ | B60R 25/00 701/99 |
| 2013/0172018 A1* | 7/2013 | Correale | ............ | H04M 1/72577 455/456.4 |
| 2013/0244575 A1* | 9/2013 | Forutanpour | ............ | H04M 1/7253 455/41.1 |
| 2013/0316737 A1* | 11/2013 | Guba | ............ | G08G 1/20 455/456.4 |
| 2013/0332641 A1* | 12/2013 | Selkirk | ............ | G06F 1/1632 710/304 |
| 2014/0032806 A1* | 1/2014 | Fils | ............ | G06F 1/16 710/303 |
| 2014/0043135 A1* | 2/2014 | Kotecha | ............ | G05B 19/0428 340/3.1 |
| 2014/0049366 A1* | 2/2014 | Vasquez | ............ | G07C 9/00857 340/5.54 |

(56) References Cited

U.S. PATENT DOCUMENTS

| | | | |
|---|---|---|---|
| 2014/0058586 A1* | 2/2014 | Kalhous | B60R 25/24 701/2 |
| 2014/0070921 A1* | 3/2014 | Jansseune | G05B 11/01 340/5.72 |
| 2015/0054639 A1* | 2/2015 | Rosen | G06K 9/00785 340/439 |
| 2015/0156309 A1* | 6/2015 | Gruberman | H04W 8/245 455/414.3 |

* cited by examiner

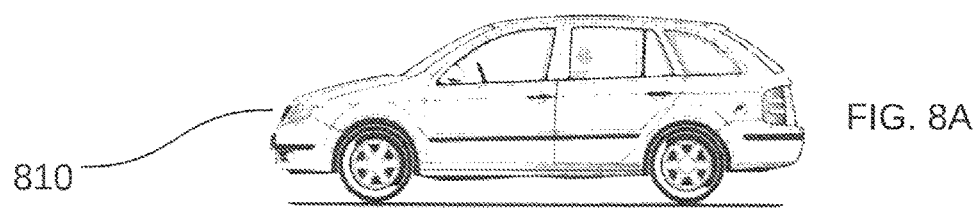
810 — FIG. 8A
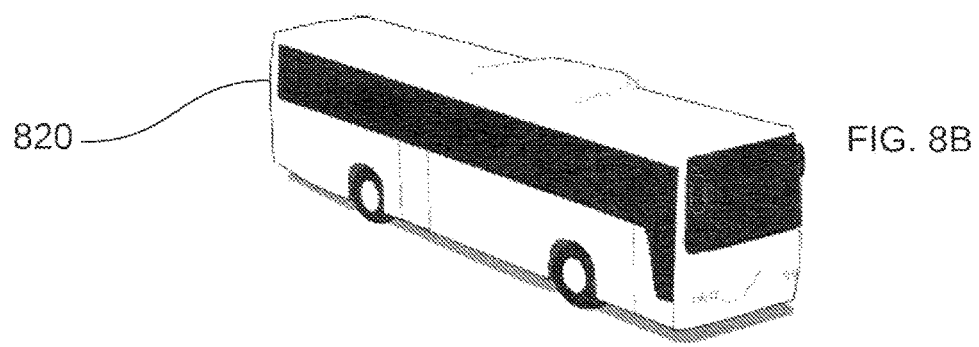
820 — FIG. 8B
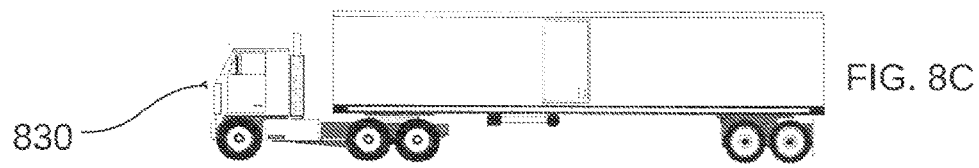
830 — FIG. 8C

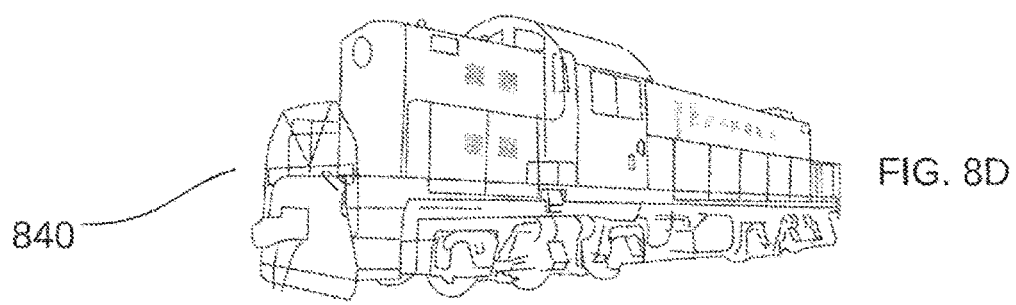
840 — FIG. 8D
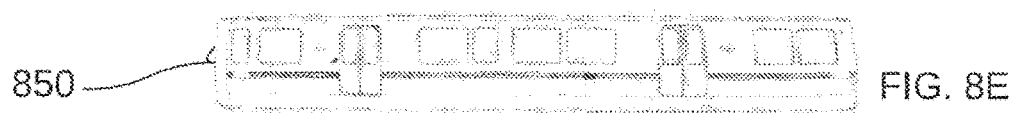
850 — FIG. 8E

SYSTEMS, DEVICES AND METHODS FOR VEHICLES

RELATED APPLICATIONS

This application claims priority to, and the benefit of each of, U.S. Provisional Application No. 61/569,585 filed on Dec. 12, 2011 and U.S. Provisional Application No. 61/653,438 filed on May 31, 2012. The entire disclosure of each of these related applications is hereby incorporated herein by reference for all purposes.

TECHNOLOGICAL FIELD

This application is related to systems, devices and methods for vehicles. In particular, certain embodiments described herein are directed to safety devices, systems and methods for use with a vehicle and one or more mobile devices.

BACKGROUND

Driver distraction has become an increasing problem as mobile-device use has become more common. For example, the ability of a driver to send text messages while driving leads to increased driver distraction, reduced reaction times and higher incidences of accident. This is true of drivers and particularly true of less experienced drivers. Many states have attempted to deter distracted driving by making it illegal to: text while driving, perform any hands-on operation (calling or texting) while driving or banning all such operation. While the laws have been passed, such use is often a secondary offense in most states or is not followed by most vehicle operators. Employers, for example, mass transit employers and fleet operators have also banned mobile-device use (phones, tablets, etc.) while operating the mass transit or fleet vehicles.

Various approaches have been suggested to reduce the frequency of distracted driving. These include requiring that a mobile phone be locked within a container before the vehicle can be operated, disabling all mobile phones within a vehicle while the vehicle is operating and using mobile-phone proximity sensing to confirm a location of the mobile phone near a seat belt or head rest of a vehicle.

Each of the preceding approaches suffers from one or more significant drawbacks. For example, the effectiveness of each of these approaches can be compromised relatively easily by a motivated vehicle-operator.

SUMMARY

As used herein, the term "hardwired" refers to a physical connection between two or more conductive elements in an electrical and/or electronic system, for example, a connection provided when a first electrical connector is plugged into a second electrical connector. As will be apparent to one of ordinary skill in the art view of the disclosure herein, the term "hardwired connection" can refer to a permanent physical connection or a temporary physical connection. Further, a hardwired connection can be completed via the contact surface or other conductor that need not include a wire. As used herein, the term "coupler" refers to a connection between two or more elements where the connection may be completed using a hardwired connection, or alternatively, a wireless connection.

As used herein, the term "case" refers to a first element that receives and at least partially encloses a second element of the system. Accordingly, as will be recognized by those of ordinary skill in the art, a case can include any of a jacket, a sleeve or other enclosure. Further, in some embodiments, with the second element (for example, a mobile phone) received by the case, the two elements can be moved together in a conventional fashion for the mobile device while the mobile device remains securely attached to the case.

As used herein, the term "annunciator" refers to an indicator that can be detected by one or more human sense. For example, an annunciator can include an audible or visual indication observable to the human. Further, an annunciator can also include a buzzing or vibratory output that is detectable by human. For example in one embodiment the annunciation described herein is implemented via a vibratory output in a steering wheel or vehicle seat. As should be apparent to those of skill in the art in view of the disclosure herein, an annunciator can include any of the preceding alone or in combination with one another or other detectable indicators.

As used herein, the term "flashing" refers to an act of reprogramming a rewritable memory element without removing the memory element from the system. Accordingly, embodiments herein describe that vehicles including an electronic engine control unit (ECU) can be reprogrammed by reprogramming a rewritable memory element in the ECU to include various aspects described herein.

As used herein, the term "docking station" refers to an element that receives a mobile device. Depending on the embodiment, a docking station may or may not require a hardwired electrical connection. In some embodiments, for example, a docking station must physically receive a mobile device to allow operation of the vehicle but need not complete a hardwired electrical connection with the mobile device. In other embodiments, the docking station physically receives the mobile device and also completes a hardwired electrical connection with the mobile device to allow operation the vehicle.

In some embodiments, a hands-on user interface included in the mobile device is inaccessible with the mobile device received by the docking station, for example, the docking station may partially enclose the mobile device when it is received to prevent access to the hands-on user interface. According to other embodiments, the docking station may fully enclose the mobile device. In some embodiments, a faceplate or other panel is employed in the docking station to prevent access to the hands-on user interface with a docked mobile device and the mobile device is not enclosed when it is received by the docking station. According to the some embodiments, the docking station can provide a pedestal in which the mobile device is placed.

As used herein with reference to a vehicle being operating or an operating vehicle, such terms refer to, but are not limited to, a vehicle having an engine utilizing and/or producing power in some manner, e.g. a combustion engine, a diesel engine, an electric drive, a battery, a fuel-cell or some other source of fuel or motive force that can provide a primary and/or secondary source of power used to propel the vehicle. Depending on the embodiment, a vehicle is inoperative where the motive force is incapable of being used to propel the vehicle, for example, because a combustion engine is not firing, a vehicle transmission is in park or a starting circuit is open.

In an aspect, a system for a vehicle comprising a processor and a circuit electrically coupled to the processor and configured to receive an input from a mobile device, the circuit constructed and arranged to prevent operation of the vehicle when the mobile device is not coupled to the circuit and to allow operation of the vehicle when the mobile device is coupled to circuit is provided.

In an additional aspect, an inline switch configured to prevent starting of a vehicle when a mobile device is uncoupled and to permit starting of a vehicle when a mobile device is coupled is provided. In some embodiments, the inline switch can be configured to permit starting of the vehicle but may prevent shifting into drive (or reverse) until the mobile device is coupled to the inline switch. As described herein, the inline switch can be positioned in, or electrically coupled to, many different systems, e.g., may be configured as an inline switch that is electrically coupled to and between the ignition system and the starter system of the vehicle.

In an aspect, a docking station configured to couple to a mobile device is provided. In certain examples, the docking station can be configured to couple to send a suitable signal to permit starting of the vehicle and/or switching of the vehicle from park into drive or reverse once the mobile device is coupled to the docking station. In some instances, the docking station may be configured to send a signal, e.g., continuously or intermittently, to prevent starting of a vehicle (or shifting the vehicle into drive or reverse) when the mobile device is uncoupled and the signal may be interrupted by coupling of the mobile device to the docking station such that starting of the vehicle or shifting the vehicle into drive or reverse is permissible once the signal from the docking station is interrupted. Additional configurations and uses of a docking station are described in more detail below.

In an additional aspect, a coupler configured to couple to a mobile device and provide a compatibility feature to permit coupling of the mobile device to one or more of the devices described herein is provided. For example, a coupler can be connected to a mobile device and used to permit coupling the mobile device to a system even if in its native state the mobile device does not include the appropriate coupler. Examples of suitable couplers are described herein and include, but are not limited to, those that include a suitable coupler on one side to couple to a mobile device and a suitable coupler on another side or end to couple to a device or system as described herein, e.g., an Apple® iPhone type coupler on one end or side and a mini USB coupler on the other side that couples to the vehicle, a docking station or other device or system as described herein. In some embodiments, the couplers can be integrated into a phone jacket such that the coupler is designed to couple to the vehicle system is accessible externally and in the phone jacket. Other configurations of couplers suitable for use to couple a mobile device to a vehicle system are described in more detail below.

In an aspect, a method of preventing a vehicle operator from starting a vehicle when a mobile device is uncoupled comprising coupling a mobile device to a vehicle through a phone jacket is provided. In some embodiments, the method can also include sending periodic signals from the mobile device to the vehicle to ensure the mobile device remains coupled to the vehicle. In other embodiments, the method can include disabling the screen of the mobile device when the phone jacket is coupled to the vehicle. In some examples, the method can permit starting of the vehicle but prevent switching the vehicle into drive or reverse until the phone jacket with the mobile device is coupled.

In another aspect, a method of preventing a vehicle operator from starting a vehicle comprising interrupting an ignition signal if a mobile device is uncoupled to a docking station is described. In some examples, the docking station may be operative as a mechanical switch that is configured to disrupt any signal from the ignition switch if a mobile device is not coupled to the docking station. In some configurations, the method can permit starting of the vehicle but prevent switching the vehicle into drive or reverse until the mobile device is coupled to the docking station.

In other aspects, a system configured to be coupled to the dash of a vehicle and comprising a coupler to permit insertion of a mobile device into the system is provided. For example, the system can replace the factory radio in a vehicle and may include a suitable slot or opening that permits insertion of the mobile device into the system. In some examples, the system may comprise a case, sleeve or jacket that first couples to the mobile device and the sleeve or jacket is then inserted into the system. In this latter configuration, the case, sleeve or jacket may comprise a suitable internal coupler to couple to the mobile device and an external coupler to couple the case, sleeve or jacket to the system when the case, sleeve or jacket is inserted into, or otherwise coupled to, the system. In some configurations, the case, sleeve or jacket can be configured such that the display of the mobile device is not substantially viewable once the case, sleeve or jacket is coupled to the system. In other configurations, the case, sleeve or jacket can be configured to couple to the system such that the display of the mobile device is facing downward once the case, sleeve or jacket is coupled to the system.

In an additional aspect, a system configured to use one or more biometric features optionally in combination with a mobile device is provided. For example, a fingerprint or other unique biological feature or, in the alternative, a user code, can be used to enable the system and permit starting of the vehicle and/or shifting of the vehicle transmission from park, e.g., into drive or reverse.

In a further aspect, a system configured to control an operating state of a vehicle is provided where the system includes a docking station and a controller. In some embodiments the docking station is configured to receive a mobile device and coupled to the mobile device using a hardwired connection. In further embodiments, the controller is configured to couple to the docking station and the vehicle ignition system, and further configured to allow operation of the vehicle with the mobile device coupled to the docking station via the hardwired connection when information that uniquely identifies a mobile device is provided by the mobile device to the controller. In still further embodiments, the mobile device includes a mobile phone and the information includes at least one of a SIM number, an IMEI number and a USB serial number. In one embodiment the controller is configured to periodically poll the mobile device for the information.

According to an embodiment, the system includes at least one relay coupled to the controller, the controller configured to operate the at least one relay to prevent the vehicle from starting if the mobile device is not received by the docking station. According to one embodiment, the at least one relay includes a first relay, and the at least one relay further includes a second relay coupled to the controller the controller configured to operate the second related interrupting ignition system to shut down the vehicle following a removal of the mobile device from the docking station while a vehicle is operating.

According to one embodiment, the system also includes a user interface coupled to the controller, the user interface configured to provide for entry of information that allows temporary operation of the vehicle with the mobile device removed from the docking station. In one embodiment the information includes a one-time code.

According to a further embodiment, the system includes a mobile-device case that is sized and configured to securely fit within the docking station with a mobile device received within the case. In one embodiment, the mobile-device case is a first mobile-device case configured to receive a first mobile device having a first size defined by a first set of dimensions, and the system also includes a second mobile device case configured to securely fit within the docking station with a second mobile device received within the case, the second mobile device having a second size defined by second set dimensions different than the first set of dimensions. In still a further embodiment the first mobile-device case is configured to receive a first mobile phone employing a first hardwired electrical connection and the second mobile device case is configured to receive a second mobile phone employing a second hardwired electrical connection different than the first hardwired electrical connection. According to one embodiment the mobile-device case provides a USB connection to connect the mobile-device case including the mobile device to the docking station.

In still another aspect, a method of preventing operation of the vehicle and mobile-device based activities that otherwise contribute to distracted operation of the vehicle are detected is provided. In some embodiments, the method includes an act of establishing an authorized mobile device for a system configured to uniquely recognize the authorized mobile device, where operation of the vehicle is permitted when the authorized mobile device is coupled by a hardwired connection to a docking station included in the vehicle. In further embodiments, the method also includes an act of authenticating a mobile-device ID communicated from a mobile device coupled to the docking station to determine whether the mobile device coupled to the docking station is the authorized mobile device. In still further embodiments, if the mobile-device ID indicates that the mobile device coupled to the docking station of an inoperative vehicle is the authorized mobile device, then allowing the vehicle to start; and if the mobile-device ID indicates that the mobile device coupled to the docking station of the inoperative vehicle is not the authorized mobile device, then preventing the vehicle from starting.

According to one embodiment the method also includes determining whether a mobile device is received by the docking station using a sensing element included in the docking station. In another embodiment the method includes determining, subsequent to the starting the vehicle, whether the mobile device remains coupled to the docking station by the hardwired connection. According to one embodiment, the method includes generating an audible alarm in the vehicle subsequent to an uncoupling of the authorized mobile device from the docking station while the vehicle is operating. In a further embodiment, the vehicle is shut down, a predetermined amount of time subsequent to the generation of the audible alarm, if the authorized mobile device remains a couple from the docking station while the vehicle is operating. According to one embodiment the vehicle and shut down by interrupting ignition circuit. In still another embodiment, the method also includes determining, subsequent to the starry the vehicle whether the mobile device remains coupled to the docking station by monitoring a status of a USB connection of the mobile device and the docking station In still another embodiment, the method includes an act of receiving an ID associated with the authorized mobile device from the mobile device. These embodiments can also include an act of comparing the ID associated with the authorized mobile device with the mobile-device ID communicated from the mobile device coupled to the docking station. According to further embodiments, the ID associated with the authorized mobile device is included in a look-up table in the controller and the controller retrieves the ID associated with the authorized mobile device from the look-up table to perform the comparison.

In still further embodiments, the method includes an act of polling the mobile device coupled to the docking station for an identification number that uniquely identifies the mobile device to the system. In one embodiment the mobile devices is polled for at least one of a SIM number, an IMEI number and a USB serial number. According to one embodiment, the mobile device is continuously polled for the identification information. In another embodiment, the mobile device is periodically polled for the at least one of the SIM number, the IMEI number and the USB serial number. According to some embodiments, identification information other than or in addition to numeric data is employed to authenticate the mobile device. According to one embodiment, the identification information used to authenticate the mobile device includes alpha numeric information. According to another embodiment, the identification information used to authenticate the mobile device does not include any numeric information.

According to still a further aspect, a system is configured to control use of a mobile device in a vehicle where the mobile device includes, a hands-on user interface and a wireless communication interface and the system includes: a docking station configured to receive the mobile device and to couple to the mobile device using a hardwired connection, where the hands-on interface is inaccessible with the mobile device received in the docking station; and a controller configured to couple to the docking station and a vehicle-start system, the controller configured to allow operation of the vehicle with the mobile device coupled to the docking station via the hardwired connection and to prevent a vehicle start when the mobile device is not coupled to the docking station via the hardwired connection. According to this embodiment, the wireless communication interface is operational with the mobile device coupled to the docking station via the hardwired connection, and the controller is configured to permit, once the vehicle is started, a continued operation of the vehicle following removal of the mobile device from the docking station.

In one embodiment, the controller is configured to allow the vehicle to be started following receipt, from the mobile device via the hardwired connection, of information that uniquely identifies the mobile device. In a further embodiment, the mobile device includes a mobile phone, and the information includes at least one of a SIM number, an IMEI number and a USB serial number.

In a further embodiment, the system includes an annunciator coupled to the controller where the controller configured to operate the annunciator to notify an operator of the vehicle when the mobile device is removed from the docking station with the vehicle operating.

According to a further aspect, a method of controlling use of a mobile device in a vehicle is provided where the vehicle includes a docking station configured to receive the mobile device and the mobile device includes a hands-on interface and a wireless communication interface. In some embodiments, the method includes acts of receiving the mobile device with the docking station via a hardwired connection, where the hands-on interface is inaccessible with the mobile device received by the docking station; if the mobile device received by the docking station is an authorized mobile device: allowing the vehicle to start; and if the mobile device received by the docking station is an unauthorized mobile device; preventing the vehicle from starting; permitting use of the wireless communication interface unit when the vehicle is operational and with the mobile device received by the docking station; and permitting, once the vehicle is started, a continued operation of the vehicle following removal of the mobile device from the docking station.

According to one embodiment, the method includes authenticating a mobile-device ID communicated from the mobile device to determine whether the mobile device coupled to the docking station is the authorized mobile device. According to a further embodiment, the method includes authenticating the mobile-device ID using a USB serial number associated with the mobile device.

According to another embodiment, the method includes saving a record of a removal of the mobile device from the docking station with the vehicle operating. In a further embodiment, the method includes preventing a re-starting of the vehicle when the record identifies a previous removal of the mobile device from the docking station with the vehicle operating. In still a further embodiment, the method includes permitting the re-starting of the vehicle following entry of a code that permits a temporary operation of the vehicle.

These and other features and aspects are described in more detail below.

BRIEF DESCRIPTION OF THE FIGURES

Certain embodiments are described with reference to the figures in which:

FIGS. 8A-8E are illustrations of vehicles, in accordance with certain examples;

DETAILED DESCRIPTION

Figure 1A:
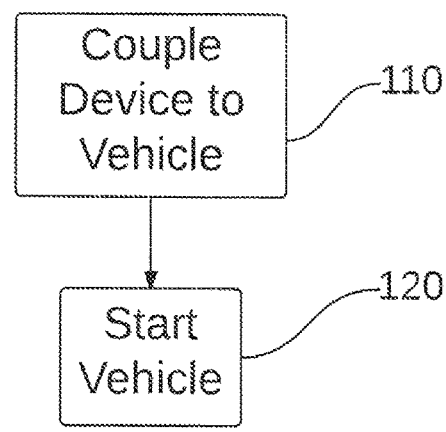
FIG. 1A is a flow chart of a method of controlling a vehicle, in accordance with certain examples.

Certain embodiments of the devices described herein can be used with passenger and commercial vehicles including automobiles, trucks, trains, buses, subways, airplanes or other devices that include a combustion engine, electric engine, fuel cell or other engine or device that can provide power to one or more wheels or other mechanisms of propulsion. e.g., a jet turbine. The exact configuration of the technology described herein can vary depending on the end-use application, and the configuration may desirably be different where the technology is used in a passenger vehicle as compared to using it in a commercial vehicle or public transit vehicle. Unless otherwise clear from the context of the usage, the term "public transit vehicle" is intended to encompass all vehicles designed to transport people including subways, buses, airplanes, taxis, or other above or below ground electric or combustion engine powered devices commonly encountered or used to travel from one place to another.

In certain embodiments, the devices, systems and methods described herein can provide many advantages including preventing non hands free mobile device functions, e.g., text messaging, while driving, reducing driver distraction, permitting hands free use of a mobile device and other desirable features such as mobile device charging. These and other advantages will be recognized by the person of ordinary skill in the art, given the benefit of this disclosure.

There are many drawbacks of existing systems used to increase vehicle safety. Some systems include complex sensors to detect proximity of the phone near a seat belt or head rest of a vehicle. See, for example, US 20100087137. Shielding of the phone signal can trick the sensors into thinking no phone is present. In addition, software means can be implemented to bypass the sensor system. Also, a "dummy" phone can be used to trick the system into thinking it has deactivated the operator's cellular phone.

In certain examples, the technology described herein can be used to disable non hands free functions of a mobile device, e.g., disable sending of text messages from a mobile device, or otherwise prevent a vehicle operator from using non hands free functions while operating the vehicle. In some examples, the entire mobile device can be rendered inoperative or unusable, e.g., by locking the keyboard, disabling the device, disabling the interface screen, etc., whereas in other examples hands free phone functions may still work and the mobile device may still be able to receive text messages. It may be desirable to disable audible receipt notices such that a vehicle operator is not distracted when a text message arrives at the mobile device. In certain embodiments, the technology described herein can be used to disable the visual interface of the mobile device such that a user is unable to interact manually with the mobile device when it is coupled to the vehicle. These and other features and configurations are described in more detail herein and additional features and configurations will be recognized by the person of ordinary skill in the art, given the benefit of this disclosure.

In some examples, the technology described herein may be used to prevent starting of a vehicle until the driver's mobile device is coupled to the vehicle. In other examples, a vehicle may be started without the mobile device coupled to the vehicle, but the vehicle may not be put into gear, e.g., switched into drive until the mobile device is coupled to the vehicle. In some examples, coupling of the mobile device may enable fuel to be provided to the engine, whereas in other examples, when a mobile device is not coupled, a fuel shut off can be implemented such that the vehicle may not be started. In certain embodiments described herein, the mobile device can be coupled to the vehicle in a wired or wireless manner. Notwithstanding that there are numerous ways to couple the mobile device to the vehicle, when coupled the mobile device desirably is not operative to send text messages by the operator of the vehicle and may also not be operative to use other non hands free functions present on the mobile device. The mobile device may still receive text messages, send and receive phone calls by Bluetooth® devices or other wireless units and perform other passive operations not requiring any input from the operator of the vehicle. Such desirable features permit a vehicle operator to receive messages and information while not being distracted by those messages and information during driving.

In some embodiments, the exact configuration of the mobile device can vary and illustrative examples of mobile devices include, but are not limited to, cellular phones, smart phones, laptops, handheld computers, personal digital assistants, enterprise digital assistants, iPad® devices, Iphone® devices, mobile internet devices and other devices that can send and receive text messages, e-mail or other communications. In some embodiments, the mobile device can be configured to download a program to the vehicle or flash or reflash the processor, e.g., engine control unit of the vehicle, to include a method, software or a key to identify the particular mobile device, whereas in other examples, the mobile device couples to the vehicle but does not otherwise control the vehicle.

Figure 1B:
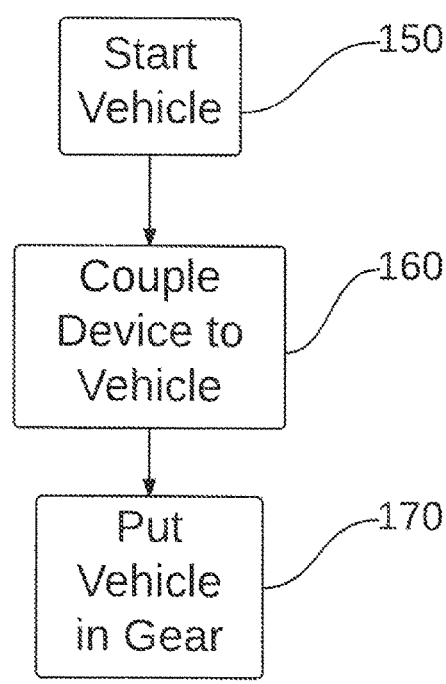
FIG. 1B is another flow chart of a method of controlling a vehicle, in accordance with certain examples.

In certain examples, one embodiment of the overall function of the device is shown in FIG. 1A. An operator first enters a vehicle. The operator then couples the mobile device to the vehicle at a step 110. Coupling of the mobile device allows the operator to start the vehicle at a step 120. Another embodiment of the overall function of the device is shown in FIG. 1B. The operator enters the vehicle and then starts the vehicle at step 150. The operator's mobile device is then coupled to the vehicle at step 160. The vehicle may then be shifted into gear, e.g., from park to drive, at step 170. In other examples, coupling of the mobile device to the vehicle may enable fuel to be provided to the engine of the vehicle.

Figure 2:
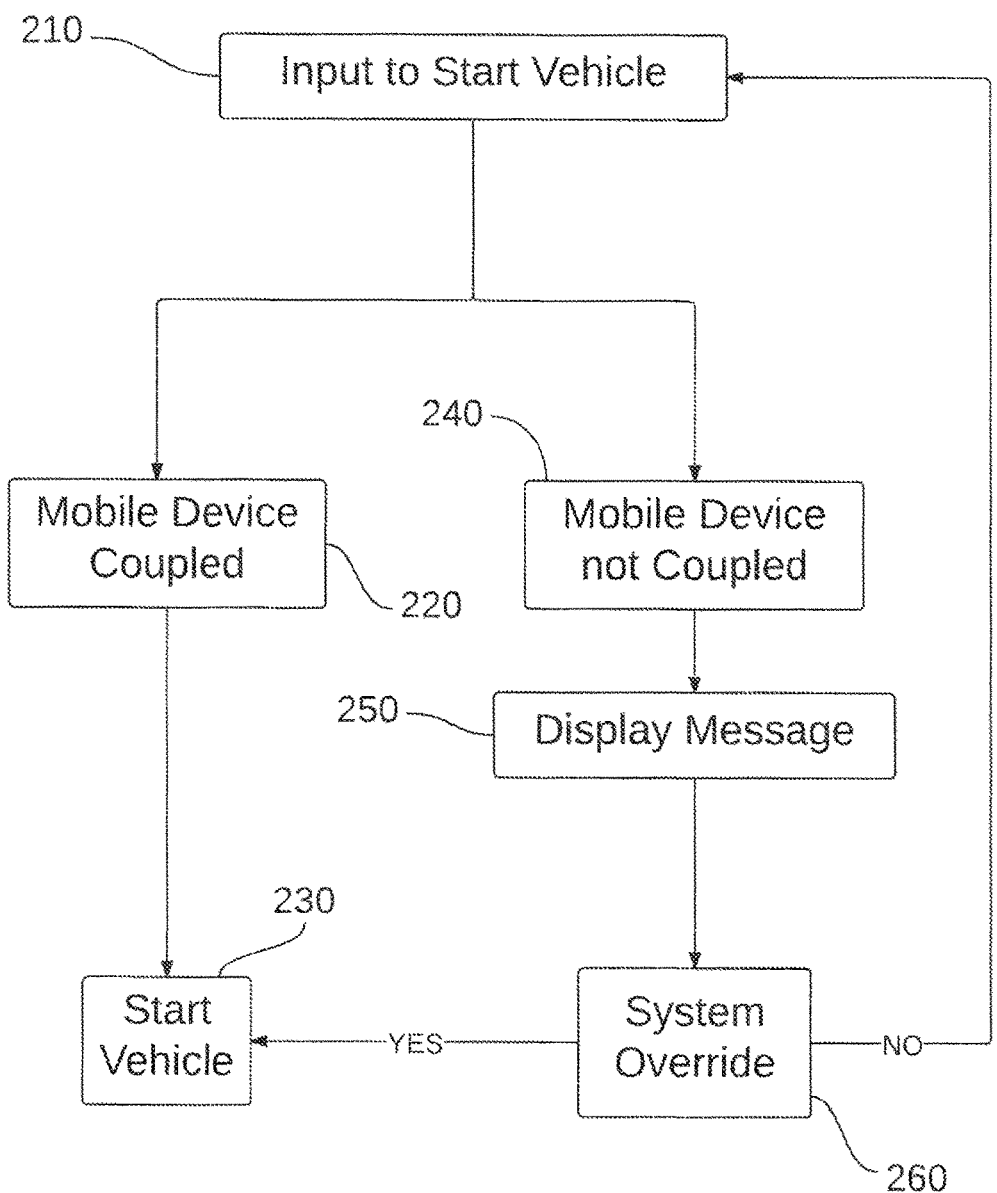
FIG. 2 is a flow chart of a method for coupling a mobile device to a vehicle, in accordance with certain examples.

In certain examples, the vehicle may include suitable hardware or software to verify whether or not the mobile device is coupled to the vehicle. For example, the vehicle may include a software program or implement a method that verifies that the mobile device is coupled. One illustrative method is shown in FIG. 2. The method includes receiving an input to start the vehicle at a step 210. As discussed elsewhere herein, such input may be turning of a ignition switch, pushing of a button or using the mobile device itself as a "key" to start the vehicle. Once the input to start the vehicle is received, the method would verify that the mobile device is coupled at a step 220. If the mobile device is coupled, then the vehicle would start at a step 230. If the mobile device is not coupled at a step 240, then the vehicle may display a message at a step 250 inquiring whether the operator would like to override the system at a step 260 or otherwise notify the vehicle operator that the mobile device is not coupled. If the override system is implemented by the operator, then the vehicle would start at a step 230. If the override system is not implemented by the operator, then the system would loop back to step 210 (or steps 240 or 250 if desired) to wait for operator input.

In certain embodiments, the exact form of the input to start the vehicle may vary. In certain instances, the input may be an operator turning an ignition switch that is standard on many vehicles. In other examples, the operator may push or activate a button. In addition examples, combinations of an ignition switch and a button can be used. In some examples, the mobile device itself may be operative as a key to start the vehicle. For example, the mobile device may include a unique identifier, e.g., a SIM card identifier or the like, which permits only the holder of the mobile device to operate the vehicle. Coupling of the mobile device by itself would permit starting of the vehicle, e.g., using a push button. As discussed elsewhere herein, the system can include one or more accounts, logs or lookup tables that can store the unique identifiers of authorized users. For example, an administrator may input the SIM card ID's of desired operators into the system such that only those operators would be able to start the vehicle. In other embodiments, the mobile device can be configured to receive a code that can be added into the phone before the phone is coupled to the vehicle to permit operation of the vehicle if the appropriate code is entered.

In certain examples, there may be instances where it is desirable to move or start the vehicle where the operator does not have a mobile device or an authorized mobile device. For example, the vehicle may need to be serviced, parked, towed or otherwise operated by a non-authorized user for some time. When such a situation arises, the override system may permit operation of the vehicle without coupling a mobile device to the vehicle. The override system can be configured to permit operation of the vehicle for a configurable period selected by an administrator or for a pre-determined period present in the system. An operator may enter a code into a keypad, the navigation system or other vehicle interface present to permit starting of the vehicle in the absence of a coupled mobile device or to permit placing the vehicle in neutral for towing purposes. In some examples, the override system can be configured to permit operation of the vehicle at low speed or a speed no greater than a speed selected by an administrator, e.g., 10 mph, 5 mph or less, to permit movement by a dealer, a service department, valet or the like. In other examples, the override system can be configured to permit placement of the vehicle into neutral so that it can be towed. In yet other examples, the override system may permit full functioning of the vehicle. In some examples, the override system can be coupled to a tilt sensor such that it is automatically activated if the vehicle is tilted beyond a certain angle, e.g., when towing, to prevent damage to the vehicle's power train components. While the override system can be configured for activation through a keypad or the mobile device, it may also be coupled to a transmitter/receiver to receive a remote signal from a satellite or other mobile device. For example, if a vehicle operator loses their mobile device, a remote user can send an override signal to the override system of the vehicle to permit its operation in the absence of the mobile device. This feature is desirable, for example, in the event of mobile device loss or malfunction. In some examples, the override system can include a time-out feature such that after a selected number of incorrect entries, no new entries will be received by the override system for a pre-selected period, e.g., 1, 5 or 10 minutes.

Figure 3:
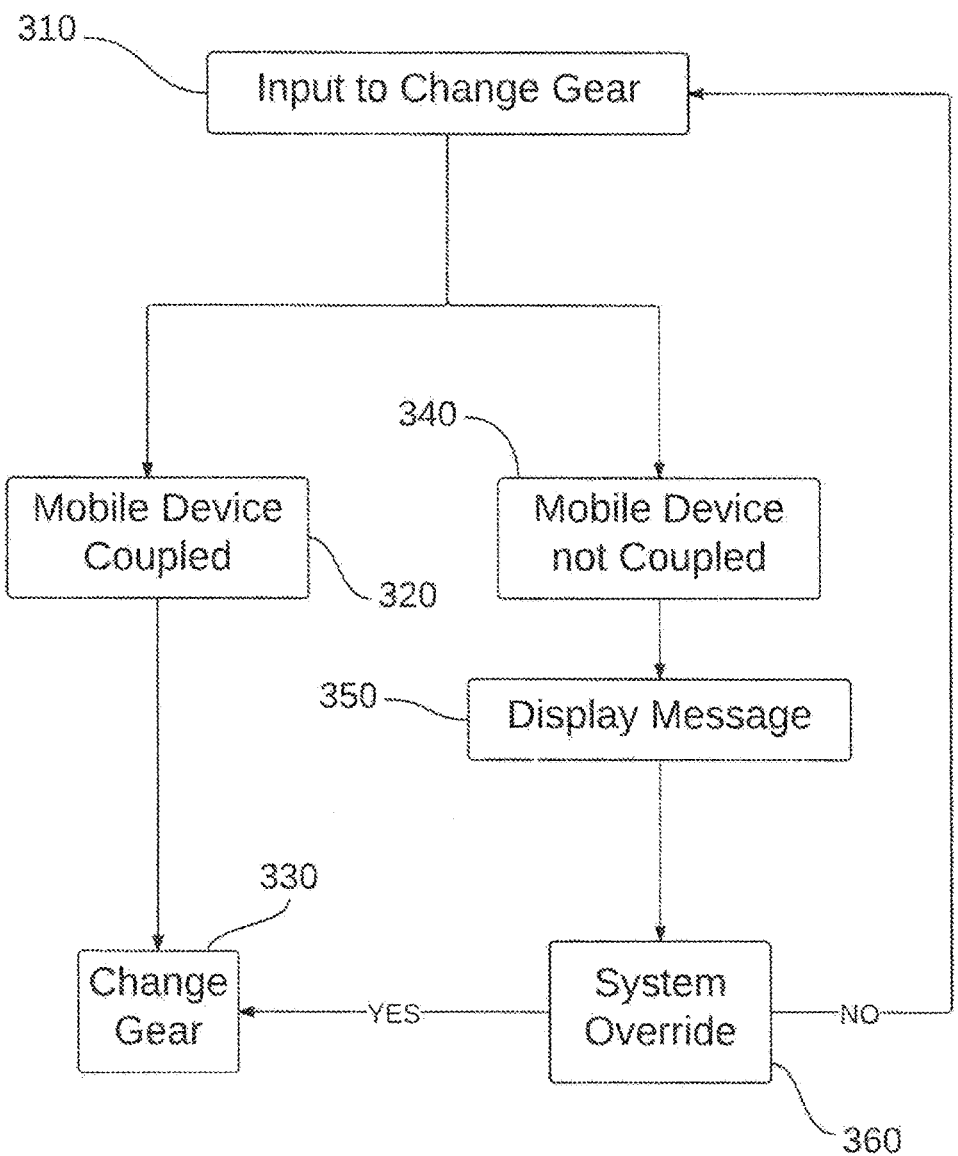
FIG. 3 is another flow chart of a method for coupling a mobile device to a vehicle, in accordance with certain examples.

In other embodiments, the method may permit starting of the vehicle but the vehicle may not be switched into gear prior to coupling of the mobile device. Referring to FIG. 3, the method includes receiving an input to change the gear from park at a step 310. If the mobile device is coupled at step 320, then the gear can be changed at a step 330 to permit driving of the vehicle. If the mobile device is not coupled (step 340), then the system may display a message at a step 350 inquiring whether or not the operator would like to override the system at a step 360 or otherwise notify the vehicle operator that the mobile device is not coupled. If the override system is implemented by the operator, then the vehicle would change gears at step 330. If the override system is not implemented by the operator, then the system would loop back to step 310 (or steps 340 or 350 if desired) to wait for operator input.

It will be recognized by the person of ordinary skill in the art, given the benefit of this disclosure, that other methods can be used to implement the technology described herein. In particular, any method that can limit starting of the vehicle or movement of the vehicle until a mobile device is coupled may be used to implement the technology described herein. Accessory devices or modules can be used to implement the technology, and such modules may be dealer installed, installed by a mechanic or installed by the vehicle owner.

In certain embodiments, either or both of the methods described in reference to FIGS. 2 and 3 can be used with existing sensors and devices in vehicles. For example, the system may use weight sensors built into the seat in combination with the coupling of the mobile device. If the weight sensor is activated, then the mobile device can desirably be coupled before starting the vehicle or switching the vehicle gears. The seatbelt sensor can also be used in combination with the mobile device. For example, the system may be designed such that starting of the vehicle (or switching from park to drive) is not possible until both the operator's seat belt is fastened and the mobile device is coupled. Additional sensors including brake sensors, speed sensors, GPS tracking sensors and the like may also be used in combination with coupling of the mobile device. For example, in some embodiments any of the brake sensors, speed sensors, GPS tracking sensors and the like are employing combination with the coupling of the mobile device to ensure that the vehicle is safely operated. The sensors can work in combination with the mobile device to upload or store information to the mobile device including, but not limited to, vehicle average speed, top speed, fuel mileage, etc.

In certain embodiments, the mobile device itself may be used as the vehicle's key. In some examples, the system can implement a method that uses coupling of the mobile device in combination with entering of a unique identifier in an interface in the vehicle, e.g., a navigation system, keypad or the like. For example and referring to FIG. 4, an operator can couple a mobile device to a vehicle at a step 410. Once the mobile device is coupled, a unique identifier can be entered into an interface at a step 420. If the identifier matches with one in the system, then the vehicle may be started at a step 430. Alternatively, the transmission can be placed into drive or reverse once the unique identifier is entered (step not shown). If the unique identifier does not match the one in the system, the system can display a message at step 440 inquiring whether the operator would like to override the system at step 450. If the system is overridden, then the vehicle will start at a step 430. When the mobile device is not coupled, the system can display a message at step 460 inquiring whether the operator would like to override the system at step 470. If the system is overridden, then the vehicle will start at a step 430. As described herein, the mobile device may be used in a wired or a wireless manner as the vehicle's key.

Figure 4:
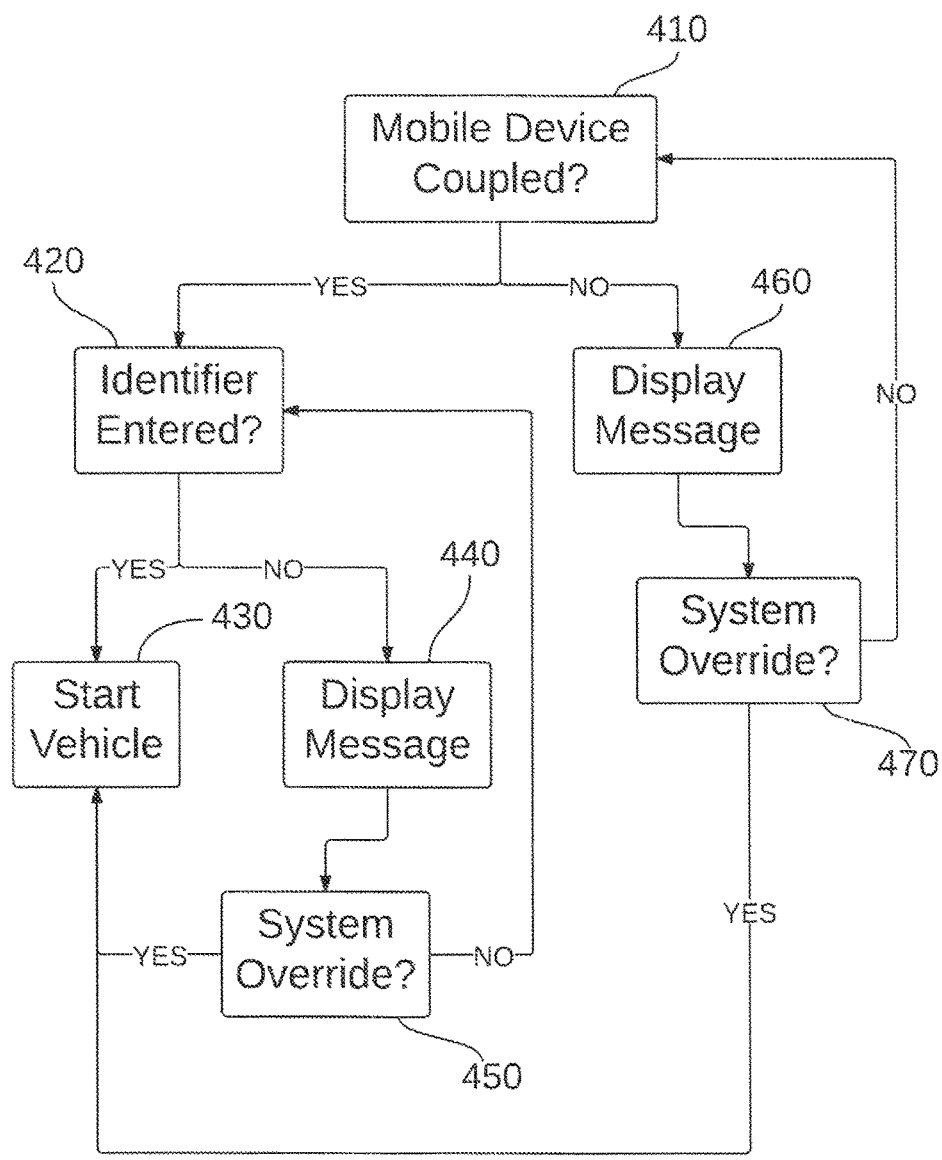
FIG. 4 is a flow chart showing verification of a mobile device coupled to a vehicle, in accordance with certain examples.

It will be recognized by the person of ordinary skill in the art, given the benefit of this disclosure, that the methods described in reference to FIGS. 2-4 are merely illustrative and certain steps may be omitted and other steps may be added. For example, the method may be implemented without the ability to override the system such that coupling of the mobile device to the vehicle is required to start the vehicle or change the gear of the vehicle.

In certain embodiments, when the mobile device is coupled to the vehicle, the mobile device may be rendered "dumb" such that texting or other features that require manual input are disabled. In some instances, it may be desirable to disable all features of the mobile device, whereas in other examples, the device may be able to receive incoming phone calls but substantially all other features are disabled as long as the device remains coupled to the vehicle.

Figure 5A:
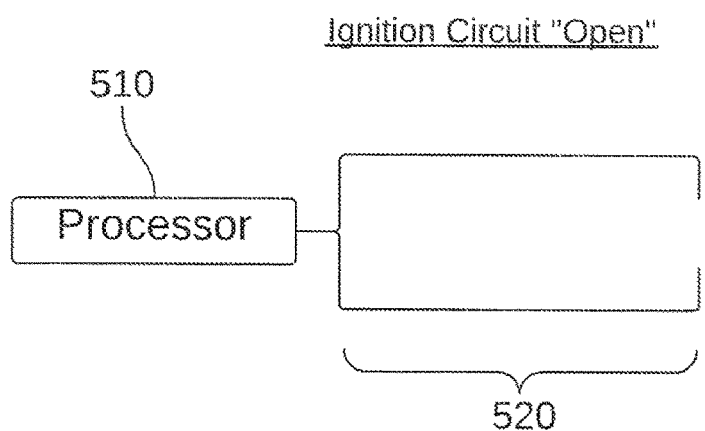
FIGS. 5A and 5B are schematics showing open and closed ignition circuits, in accordance with certain examples.
Figure 5B:
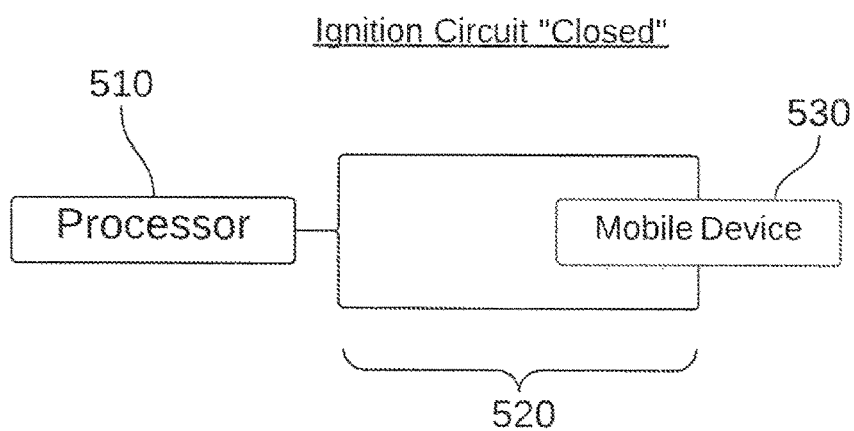

In certain embodiments, coupling of the mobile device to the vehicle can complete an ignition circuit such that the vehicle may start. The mobile device can act as a switch to close the circuit. For example, a simplified schematic of a part of a vehicle's electrical system is shown in FIGS. 5A and 5B. The electrical system includes a processor 510, which is typically housed in, or electrically coupled to, an engine control unit (ECU) which itself may include or be electrically coupled to an ignition circuit 520. The ignition circuit 520 is open when the mobile device is not coupled such that the engine will not start (FIG. 5A). When a mobile device 530 is coupled (FIG. 5B), the ignition circuit is closed such that the processor 510 will permit the engine to be started once a suitable input is received, e.g., turning of the ignition switch, pushing an ignition button, etc. The method can be implemented, for example and as discussed further below, by modifying the lookup tables (LUTs) in the ECU such that the coupling of the mobile device is desirably present to start the vehicle.

Figure 6A:
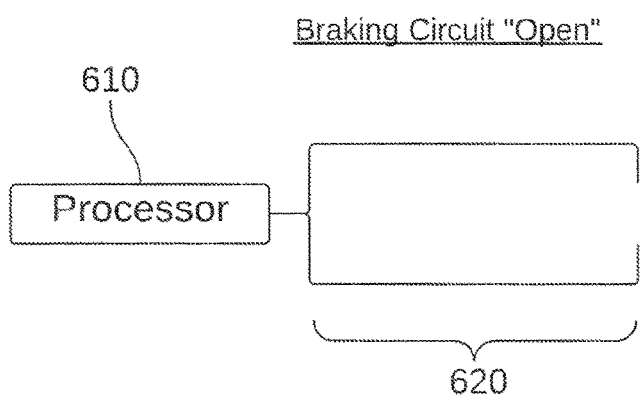
FIGS. 6A and 6B are schematics showing open and closed braking circuits, in accordance with certain examples.
Figure 6B:
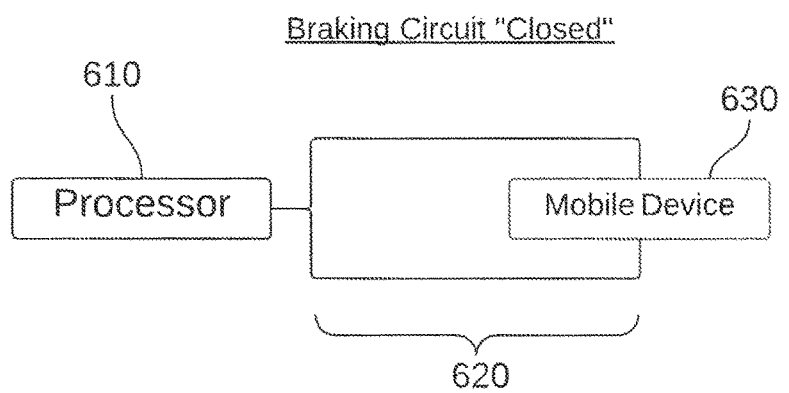

In some examples, a similar system can be implemented as part of the braking circuit. In many newer vehicles, a user must depress the brake pedal prior to being able to shift the vehicle into gear. Coupling of the mobile device to the braking circuit can close the braking circuit and permit shifting of the vehicle into gear. Referring to FIGS. 6A and 6B, a braking circuit 620 may be considered open when the mobile device is not coupled even when the brake is depressed by a user. Once a mobile device 630 is coupled to the system, the processor 610 will permit shifting of the transmission from park to a gear selected by an operator.

Figure 7A:
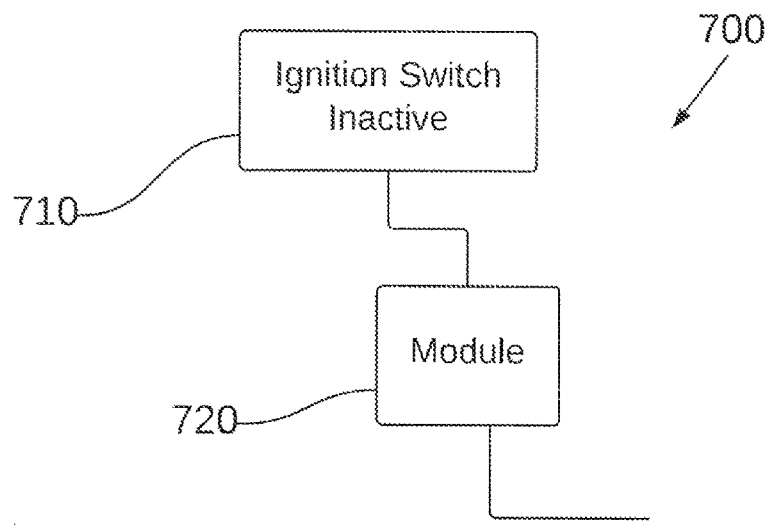
FIGS. 7A and 7B are schematics showing an in-line module, in accordance with certain examples.
Figure 7B:
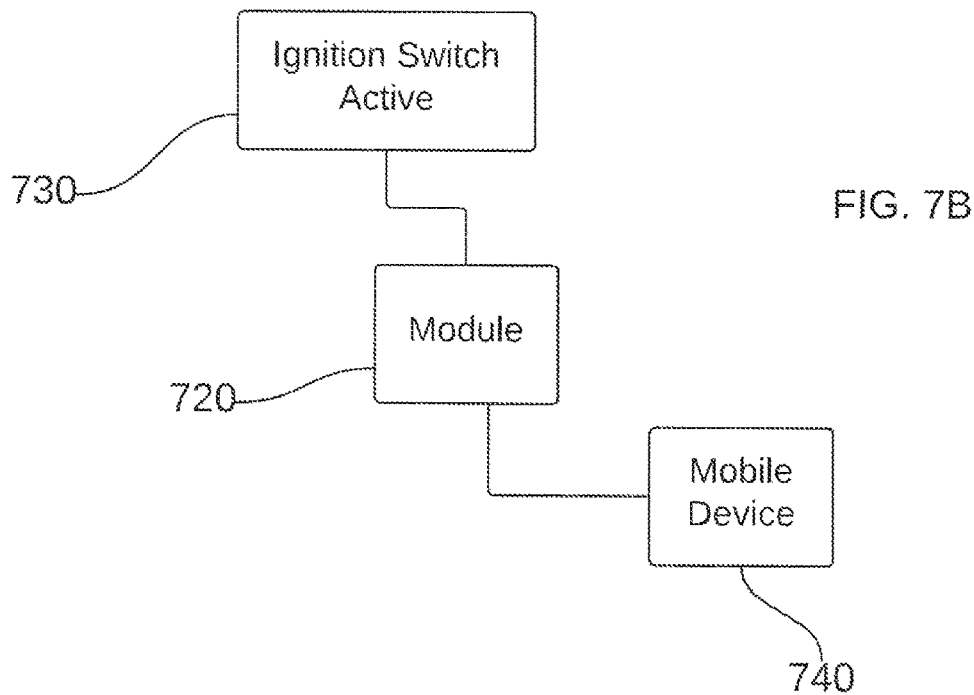

In some examples, it may be desirable to include an in-line switch or box that can be electrically coupled to the vehicle to permit operation of the vehicle when the mobile device is coupled and prevent operation of the vehicle when the mobile device is not coupled. For example, in older vehicles not including electronic management systems, it may be desirable to include a module on the cold side of the ignition switch as shown in the schematics of FIGS. 7A and 7B. The system 700 would include a module 720 inline with an ignition switch. Where a mobile device is not coupled to the module 720 (see FIG. 7A), the ignition switch would be in an inactive state 710, and the vehicle would not be able to start. When a mobile device 740 is coupled to the module 720 (see FIG. 7B), then the ignition switch would be in an active state 730 such that turning of the key by an operator would permit starting of the vehicle. The module 720 need not be in the ignition circuit. For example, the module may be inline with a braking circuit, with a fuel shut off circuit, etc., such that the vehicle can not be operated without coupling of a mobile device to the module. In operation, the module 720 would typically authenticate a SIM card (or other unique identifier) of the mobile device to permit operation of the vehicle. In some embodiments, the module 720 can be configured with electrical taps such that it can be added to a vehicle by inserting the module 720 inline with existing ignition wiring in the vehicle.

In certain examples, the mobile device can be coupled to the system through a wired coupler that is electrically coupled to at least some portion of the vehicle. While the term "wired" is used in certain instances, there may be no actual wire present. "Wired" refers to physical contact of some portion of the phone with some portion of the system. For example, a mini-USB port on the phone may interface with a mini USB port on the system by plugging the phone directly into the USB port of the system without any intervening wire between the two ports. In other examples, a coupling from a navigation unit may exist such that the mobile device is coupled to the navigation unit. By coupling the mobile device to the navigation unit, the vehicle may then be started or switched into gear.

In certain embodiments, the exact design of the wired coupler is not critical and desirably the coupler is selected such that it will work with about 80% of existing mobile devices such as cellular phones. In some examples, the vehicle can include two or more different types of wired couplers to increase the overall compatibility of the system. In some examples, each of the couplers can be controlled by an administrator and may be selectively activated and deactivated based on settings selected by the administrator. In addition, adapters, dongles and the like can be used to permit coupling of a mobile device to a wired coupler. Illustrative types of couplers include, but are not limited to, those having one or more of a USB interface, a mini USB interface, a micro USB interface, a serial ATA interface, a PS/2 interface, a MIDI interface, a serial bus interface, an IEEE 1394 interface and the like. While not required, it is desirable that the interface provide coupling of the mobile device to the system while at the same time charging (or keeping charged) the mobile device.

In some examples, the coupler can be constructed and arranged to lock the phone into place during operation of the vehicle. For example, the coupler can include actuatable tabs, bosses, projections, etc. that mate to slots or receptacles on the mobile device to lock the mobile device into place when the vehicle is running or otherwise being operated. Such a locking device prohibits removal and use of non hands free functions of the mobile device while operating the vehicle.

In certain embodiments, the coupler of the device can be configured as a cradle, socket, docking station or any device configured to receive the mobile device or a slot that can receive some portion of the mobile device. For example, the coupler can be configured as a cradle that receives the face of the mobile device such that a user cannot manually enter commands while the mobile device is coupled. As discussed herein, the coupler may include a cord or wire, but such coupling devices can be less than desired as they may permit the operator to still use the mobile device while it is coupled to the vehicle. In such instances, it may be desirable to disable the display of the mobile device or otherwise render some portion of the mobile device "dumb," e.g., lock the keyboard, such that the operator cannot manually interact with the mobile device while operating the vehicle.

In certain examples, the exact positioning of the coupler in the vehicle can vary from vehicle to vehicle and from system to system. In some examples, the coupler can be positioned in a storage compartment, e.g., glove compartment, trunk, under seat storage device, storage in a door or between the front fender well and the front portion of the door or other areas of the vehicle. In certain instances, the storage compartment can receive substantially all of the mobile device, whereas in other examples a portion of the mobile device may protrude or otherwise be viewed when it is coupled to the vehicle. In some examples, the coupler is positioned such that it renders the mobile device inaccessible to a vehicle operator. For example, the coupler may be positioned in the glove compartment, in a driver seat box, under the driver's seat, under the driver seat cushion, in an umbrella drawer or compartment, in the trunk, under the hood in the engine compartment, in the headliner, at the side of one of the seats or other areas where it would be difficult or impossible for the driver to use non hands free functions of the mobile device when coupled to the vehicle. In other examples, the coupler can be positioned in, or otherwise be part of, one of the cup holders of the vehicle.

In certain embodiments, the coupler can be configured to permit the mobile device to perform other functions including data transfer, charging of the mobile device, communicating with the navigation system of the vehicle and the like. If desired, the mobile device can be used for data logging to track speed, gas mileage or other performance parameters of interest to a vehicle operator.

In certain examples, coupling of the mobile device to the vehicle may permit uploading or transfer of user specific parameters from the mobile device to the vehicle. For example, an identifier on the mobile device, e.g., a SIM card, code or the like, can be used by the vehicle to ascertain the particular vehicle operator. User specific or user-specified parameters include, but are not limited to, the position of the seat, radio stations, HVAC settings, pre-stored navigation routes, speed limiter and the like, and such parameters may be automatically adjusted based on pre-selected or pre-stored user specific parameters that are correlated to the identifier of each mobile device. The lookup tables in the system may include default or selected maps or parameters that can be used if the identifier of the mobile device does not match those in the lookup table.

In certain embodiments, in implementing the methods and systems described herein, the vehicle can be retrofitted with a new processor and/or memory unit, e.g., an ECU, and the ECU can be flashed with a new software program that can implement the methods described herein, the method can be implemented on a dongle or device that couples to the vehicle through the OBDII port, the method can be implemented as part of a navigation system, e.g., factory or aftermarket navigation systems, or the mobile device itself may include a method that prevents operation of the mobile device once it is coupled to the vehicle. In embodiments where a new ECU is installed, a dealer, factory or OEM company may produce a replacement ECU that is vehicle specific and includes suitable software to implement vehicle controls, e.g., valve timing, transmission shift points, etc. The new ECU may also include a method that can detect the presence or absence of a coupled mobile device, e.g., through voltage sensing, receipt of a signal or message from the mobile device, completion of an open circuit when the mobile device is coupled, etc. The new ECU can be installed at a dealer or can be replaced by a vehicle owner where the ECU is properly configured.

In other embodiments, the ECU may be "flashed" or "re-flashed" where a different software program is uploaded to the ECU through an OBDII port, an accessory power port or by otherwise coupling a loading device to the ECU. In some instances, for example, the mobile device itself may include the software program that can be used to flash the ECU. Upon first coupling of the mobile device with the ECU, the mobile device may prompt the user to select certain parameters, e.g., vehicle year, make and model, such that a proper software program is uploaded to the ECU to permit suitable vehicle functioning and to implement the technology described herein. In some examples, a software program may be implemented using a reader device, e.g., code scanner, or other device, e.g., a laptop, iPad® device or, mobile computer, that can be implemented to upload a program or flash an ECU, such as those commonly available from many manufacturers including, but not limited to, Hypertech, Inc., Bully Dog Technologies, Edge Products and other manufacturers that commonly produce performance chips and performance software tools.

In certain embodiments, the method may permit different levels of user access. For example, the method may have an administrator setting that permits an administrator to add authorized users to the vehicle. Such users can be added with user-specified parameters such that the administrator can set the vehicle based on each user. For example, the administrator may select speed limiter settings for a particular user, may adjust mirror or seat positions, may switch on GPS tracking features for a particular user to monitor the position of that user, may switch on an alert system if the vehicle is driven beyond a certain distance or outside a certain area or may otherwise control each operator's ability to use the vehicle based on an identifier or other criteria associated with their mobile device. The system can also include user level access that permits the users to operate the vehicle but does not permit overriding of any user-specified parameters stored in a lookup table or elsewhere in the system. In certain embodiments, the administrative functions may reside with a centralized service, e.g., GM's Onstar® service, such that unwanted access by an outsider is not easily obtained. In other examples, the administrator may be able to control the system remotely through the internet or through a wireless device such as a mobile device. In such instances, the administrator can control the user-specified parameters in real time (or almost real time) so they can be adjusted as desired or needed. In addition, the administrator can activate a temporary key or the override system remotely to permit operation of the vehicle if the user's mobile device is lost or inoperative. Administrator selected settings are typically stored in one or more lookup tables on a memory unit, which may be separate from the ECU of the vehicle, may be integral to the ECU or may be stored remotely from the vehicle.

In certain embodiments, the ability to monitor the vehicle using the system provides several advantages in commercial settings. Vehicle positions can be monitored in real time to determine delivery times, arrival times, delays, a vehicle's current position and the like such that efficiency in delivery and monitoring may be increased. In addition, a vehicle may be disabled after a certain driving period, e.g., 10 hours, to comply with Department of Transportation regulations and the like. Data logging can be implemented to keep track of vehicle parameters, routes, traffic information, e.g., based on average vehicle speed, and other desired information.

In certain embodiments, the systems described herein can be used in conjunction with an additional coupler. For example, in commercial settings, a vehicle operator may have both a personal mobile device and a company provided mobile device. In such instances, it may be desirable to require the vehicle operator to couple both devices so that they cannot send text messages from their personal device while coupling the company-provided device to permit operation of the vehicle. The system may be configured to include two couplers with one of the couplers being configured to couple to each of the mobile devices. When both mobile devices are coupled, the vehicle may be operated as described herein. An administrator can selectively activate or deactivate each of the coupler using the administrative functions of the technology.

In certain examples, the system can include audible reminders or visual displays to retrieve the mobile device once the vehicle is switched off. For example, the system may provide an audible beep similar to the ones commonly used to remind a driver their keys are in the ignition. In certain examples, a driver information display may provide a message to retrieve the mobile device, or the mobile device may be automatically ejected when the vehicle engine is switched off. Other user friendly features may also be included in the system to facilitate operation of the vehicle and subsequent retrieval of a user's mobile device.

In certain embodiments, the systems described herein may include other sensors, devices, units and the like that work in conjunction with coupling of the mobile device. For example, a GPS unit of the mobile device may work in conjunction with the vehicle to provide feedback to a monitoring site regarding the position of the vehicle. Rather than implement a separate tracking system in each vehicle, a company provided mobile device can be used to track the vehicle through the internet or other interface. This feature greatly reduces tracking costs while at the same time increasing driver safety by preventing text messaging by the vehicle operator.

In certain embodiments, the mobile device can be wirelessly coupled to the vehicle. Such wireless coupling may take numerous forms including wireless coupling with an existing transmitter/receiver of the vehicle such as a Bluetooth® device. In such instances, it may be desirable to disable the mobile device when wirelessly coupled to prevent non hands free operation of the mobile device. For example, when wirelessly coupled, a handshake between the mobile device and vehicle can be established such that the vehicle may be operated. As long as the handshake is present, the mobile device may remain deactivated to prevent non hands free operation such as sending of text messages. Wireless coupling provides the advantage of not using a coupler specific for a certain type of mobile device.

In some examples, the mobile device can be used in conjunction with the system to be operative as a car key. For example, the system can be configured with a circuit electrically coupled to a processor and configured to receive an input from a mobile device to prevent operation of a vehicle when the mobile device is not coupled to the circuit and to permit operation of the vehicle when the mobile device is coupled to the circuit. The processor (or circuit) can be further configured to compare an identifier of the mobile device to an entry in a lookup table to permit operation of the vehicle if the identifier matches the entry in the lookup table, where the mobile device is wirelessly coupled to the vehicle, the mobile device may permit entry of a code on the mobile device, depression of a "Start" button on the mobile device or other input can be entered into the mobile device to permit starting of the vehicle. In instances where the mobile device will be disabled, there may be a delay period, e.g., a few seconds or more, prior to disabling to permit entry of such code or input. In other instances, authentication of the SIM card of the mobile device can permit starting of the vehicle by pressing a button or other device integral to the vehicle without the need for any input on the mobile device.

In certain embodiments, an administrator may add the entries in a lookup table based on the identifiers of mobile devices of authorized users. In other examples, an authorized user may couple their mobile device to the system, and an entry can be written to the lookup table to permit the user to operate the vehicle. The written entry may be approved by an administrator or in certain instances no approval may be required. As discussed herein, the system can be configured to adjust user-specified parameters, e.g., seat position, radio stations, speed limiter, etc., using the entries in the lookup table. Once an entry is verified, the user may start or operate the vehicle by pressing a button, e.g., either on the mobile device or on the vehicle itself without needing a physical key to be placed in an ignition switch. As described herein, the car key system may include a coupler that is configured to couple the mobile device to provide the input from the mobile device to the processor of the car key system. This coupler may take many different forms including a cradle, docking station, socket, USB port and the like and/or may be positioned in the vehicle out of reach of a vehicle operator or in a manner to be inaccessible to a vehicle operator. In other embodiments, the coupler may be configured such that the mobile device is accessible to a vehicle operator but is not usable, e.g., the screen is locked, the keyboard is locked, non hands-free functions are disabled, etc.

In certain examples where a car key system is present, the system can include an override system configured to permit operation of the vehicle when the mobile device is not coupled to the circuit. This override system may be particularly advantageous for non-authorized drivers to operate the vehicle or for temporary access to the vehicle. In some examples, the override system can be configured to permit operation of the vehicle at speeds less than a top speed selected by an administrator, e.g., less than 10 miles per hour, to only permit shifting of the transmission into neutral or to permit other administrator specified functions. The override system can, for example, be activated with a keypad or can be activated using a remote signal.

In embodiments where the car key system is used in a commercial vehicle, it may be desirable to base the system on two or more mobile devices. The key to starting the vehicle would be coupling of both mobile devices optionally in combination with entry of a code on a keypad, depressing a button, etc. The circuit can be configured, for example, to permit operation of the vehicle only when both mobile devices are coupled to the system. Where two or more devices are needed to couple to the system, each of the devices may be coupled by wire, one device may be coupled by wire and the other device may be wirelessly coupled or both devices may be wirelessly coupled.

In certain examples, the car key system may desirably include or work with other sensors and features including weight sensors, ABS sensors, GPS devices, tracking devices, navigation systems, entertainment systems and other vehicle systems. It is not intended that the use of any of the illustrative embodiments of car key systems described herein limit the other potential systems that can be used in a vehicle.

In certain embodiments, a vehicle comprising an engine, a processor configured to control the engine, and a circuit electrically coupled to the processor and configured to receive an input from a mobile device may be used. In some examples, the circuit can be constructed and arranged to prevent operation of the vehicle when the mobile device is not coupled to the circuit and to allow operation of the vehicle when the mobile device is coupled to circuit. In certain instances, the vehicle may include a fixed program such that a user cannot alter or otherwise delete the program to bypass the program.

In certain embodiments of the vehicle, the circuit can be configured to prevent starting of the engine when the mobile device is not coupled to the circuit and to allow starting of the engine when the mobile device is coupled to circuit. In other embodiments, the circuit is configured to prevent shifting of the vehicle into drive when the mobile device is not coupled to the circuit and to allow shifting of the vehicle into drive when the mobile device is coupled to circuit. In some embodiments, the vehicle can include a coupler electrically coupled to the processor and configured to couple to the mobile device to provide the input from the mobile device to the processor. As discussed herein, the coupler may take many different forms including, but not limited to, a cradle socket, docking station or other device configured to receive the mobile device. If desired, the coupler can be positioned in the vehicle out of reach of a vehicle operator or otherwise be inaccessible to the operator during operation of the vehicle. The coupler may permit wired or wireless coupling of the mobile device to the vehicle, may charge the mobile device, and can provide other desired functionality. In certain examples, text messaging functions or all non hands free functions of the mobile device can be disabled when the mobile device is coupled to the circuit.

In some embodiments, the vehicle can include an override system configured to permit operation of the vehicle, e.g., for a configurable period or a pre-selected period, when the mobile device is not coupled to the circuit. For example, the override system is configured to permit operation of the vehicle at less than a selected top speed, e.g., speeds less than 10 miles per hour, can be configured to only permit shifting of the transmission into neutral and, if desired, can be activated using a remote signal.

In other embodiments, the vehicle can be configured to implement at least one user-specific parameter based on an identifier on the mobile device. In some examples, the vehicle can include a memory unit electrically coupled to the processor and configured to receive a method that prevents operation of the vehicle when the mobile device is not electrically coupled to the circuit and to allow operation of the vehicle when the mobile device is electrically coupled to circuit.

In certain embodiments, the vehicle can include a second coupler electrically coupled to the processor and configured to couple to a second mobile device. In some embodiments, the system can be configured to permit operation of the vehicle only when the mobile device and the second mobile device are both coupled to the system.

In certain embodiments, the vehicle may include additional sensors and devices. For example, the vehicle can include a sensor coupled to the processor, the sensor configured to provide feedback to a vehicle operator to retrieve the mobile device when the engine of the vehicle is switched off. In other examples, the vehicle can include a GPS device electrically coupled to the processor to permit tracking of the vehicle.

In some examples, the type and nature of the engine in the vehicle is not limiting, and the vehicle may be a vehicle including an electric engine, a combustion engine, a fuel cell, a magnetic engine, an electric motor, a steam engine, a gas engine, e.g., a hydrogen engine or combinations thereof. Similarly, the type of vehicle is not limited. Referring to FIGS. 8A-8E, the vehicle may be a passenger vehicle 810, a bus 820, a commercial truck 830, a train 840, a subway 850, an air vehicle such as an airplane or other vehicles where operator distraction may decrease safe operation. The vehicles typically include drive means such as an engine to cause the vehicle to move forward, backward or in a desired direction. For example, an engine can be used to drive two or more wheels of a vehicle.

Figure 9:
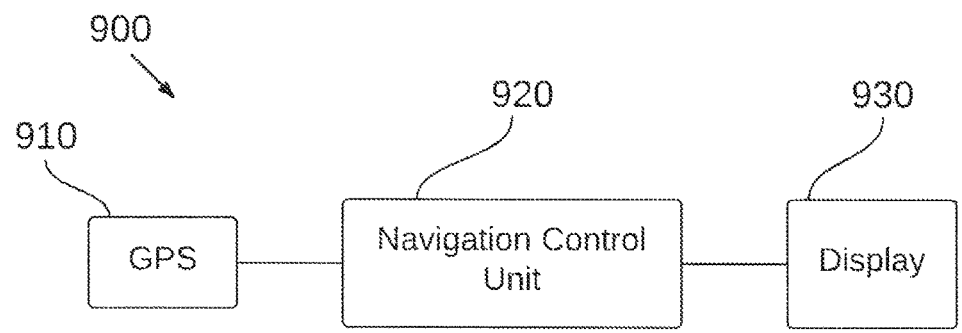
FIG. 9 is a schematic of a navigation system, in accordance with certain examples.

In certain examples, a navigation system can be configured to work with or implement the methods described herein. Referring to FIG. 9, a navigation system 900 includes a navigation control unit 920, which typically houses a processor and a memory unit. The navigation control unit 920 is electrically coupled to a global positioning sensor 910 and a display 930. In an illustrative navigation system, a memory unit is electrically coupled to the processor and comprises navigation information. The navigation system 900 can also include a circuit electrically coupled to the processor and configured to receive an input from a mobile device, the circuit constructed and arranged to prevent operation of the vehicle when the mobile device is not coupled to the circuit and to allow operation of the vehicle when the mobile device is coupled to circuit. In some examples, navigation information may include, for example, current position, route display, route planning and other common information provided by existing navigation systems to guide a user to a selected destination.

In certain embodiments, the circuit can be electrically coupled to a coupler configured to couple to the mobile device. In some embodiments, the coupler can be positioned out of reach of a vehicle operator or be inaccessible during operation of the vehicle. In other embodiments, the coupler can be electrically coupled to a wireless unit to permit wireless coupling of the mobile device to the coupler. In additional embodiments, the navigation system can include a wireless phone unit to permit hands free calling from the mobile device when the mobile device is coupled to the navigation system. In some embodiments, the processor (or circuit) can be configured to compare an identifier of the mobile device to an entry in a lookup table to permit operation of the vehicle if the identifier matches the entry in the lookup table. In certain embodiments, the navigation system can be configured to display a reminder to retrieve the mobile device when the vehicle is switched off. In other embodiments, the navigation system can include a second coupler electrically coupled to the processor and configured to couple to a second mobile device. Where two or more couplers are present each coupler may independently be configurable by an administrator. In some examples, the circuit can be configured to permit operation of the vehicle only when the mobile device and the second mobile device are both coupled to the system. In other examples, the circuit can be configured to permit operation of the vehicle once the mobile device is coupled without the use of a separate key. In additional examples, the navigation system can include an override system configured to permit operation of the vehicle, e.g., for a configurable period or for a pre-selected period, when the mobile device is not coupled to the circuit. For example, the override system can be configured to permit operation of the vehicle at less than a selected speed, e.g., speeds less than 10 miles per hour, can be configured to only permit shifting of the transmission into neutral, or can be activated using a remote signal.

In certain examples, the navigation system can include a transmitter/receiver electrically coupled to the circuit and configured to receive input from a remote user. For example, the transmitter/receiver can be configured to send a position of the vehicle to a remote site or can send vehicle information, e.g., location, speed, etc. to a remote site. In some examples, the navigation system can be configured to adjust vehicle settings using entries in a lookup table of the mobile device. For example, a speed limiter setting or other desired user-specified parameters may be selected or implemented by the navigation system. For ease of use, the navigation system can be configured to receive verbal commands from an operator of the vehicle. If desired, the navigation system can log vehicle information.

In certain embodiments, the navigation system can include processing means, position detecting means electrically coupled to the processing means for determining a position of a vehicle, display means electrically coupled to the processing means for displaying route information, and a circuit electrically coupled to the processing means and configured to receive an input from a mobile device, the circuit constructed and arranged to prevent operation of the vehicle when the mobile device is not coupled to the circuit and to allow operation of the vehicle when the mobile device is coupled to circuit.

In some examples, the circuit can be electrically coupled to coupling means for coupling to the mobile device. In other examples, the coupling means is positioned out of reach of a vehicle operator or inaccessible to the vehicle operator. In additional examples, the coupling means can be electrically coupled to a wireless unit to permit wireless coupling of the mobile device to the coupler. In further examples, the system can include wireless phone means for permitting hands free calling from the mobile device when the mobile device is coupled to the navigation system. In other examples, the circuit can be configured to compare an identifier of the mobile device to an entry in a lookup table to permit operation of the vehicle if the identifier matches the entry in the lookup table. In some examples, system can be configured to display a reminder on the display means to retrieve the mobile device when the vehicle is switched off. In other examples, the system can include a second coupler electrically coupled to the processor and configured to couple to a second mobile device. In additional examples, the circuit can be configured to permit operation of the vehicle only when the mobile device and the second mobile device are both coupled to the system. In further examples, the circuit can be configured to permit operation of the vehicle once the mobile device is coupled without the use of a separate key.

In other examples, the system can include override means configured to permit operation of the vehicle when the mobile device is not coupled to the circuit. For example, the override means can be configured to permit operation of the vehicle at speeds less than 10 miles per hour, can be configured to only permit shifting of the transmission into neutral and/or, if desired, can be configured to be activated using a remote signal. In some examples, the system can also include transmitter/receiver means electrically coupled to the circuit and configured to receive input from a remote user. In some examples, the transmitter/receiver means can be configured to send a position of the vehicle to a remote site or can send vehicle information to a remote site. In certain examples, the system can be configured to adjust vehicle settings using entries in a lookup table of the mobile device. In some examples, the system can be further configured to receive oral commands from an operator of the vehicle. In additional examples, the system can be further configured to log vehicle information.

Figure 10:
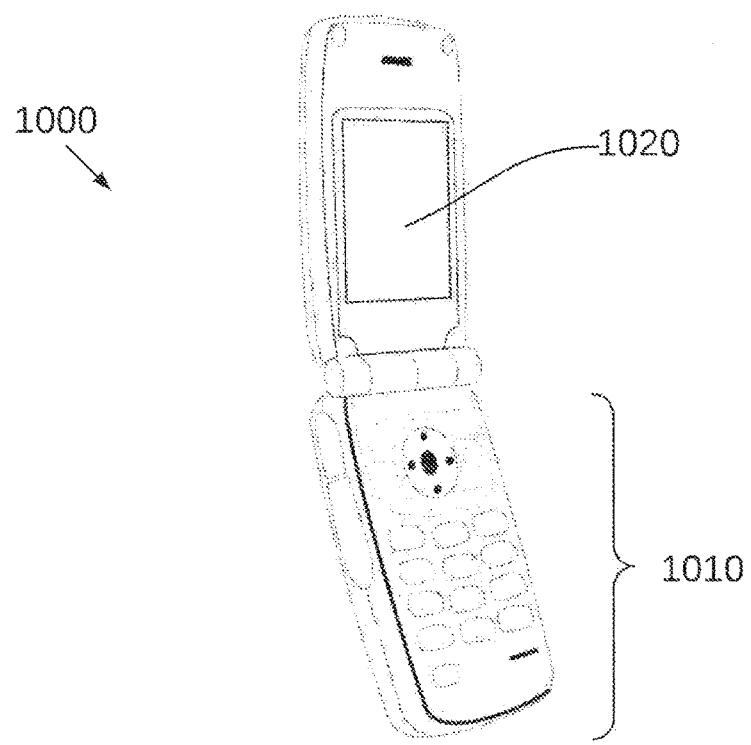
FIG. 10 is an illustration of a mobile device, in accordance with certain examples.

In certain embodiments, a mobile device is provided that can be used to implement the methods described herein. For example, a mobile device configured to be coupled to a vehicle to permit starting of the vehicle when the mobile device is electrically coupled at least one electrical system of the vehicle can be used. Referring to FIG. 10, a mobile device 1000 is shown which includes a keyboard 1010, an interface screen 1020 and an internal processor. The mobile device 1000 shown in FIG. 10 is merely illustrative and other mobile devices including those having virtual keyboards can be substituted or otherwise used with the technology described herein. In some examples, the mobile device can be configured to disable text messaging or non-hands free functions when the device is coupled to the vehicle. In other examples, the mobile device can be configured to be charged when coupled to the vehicle. In additional examples, the mobile device comprises an identifier to permit starting of the vehicle. In some examples, the mobile device can be configured to disable its interface screen 1020 or its keyboard 1010 when coupled to the vehicle. In other examples, the mobile device can be configured to couple to a wireless unit to permit hands free calling when the mobile device is coupled to the vehicle. In some examples, the mobile device can be configured to couple wirelessly to the vehicle. In additional examples, the mobile device can be configured to couple to the vehicle in addition to a prior coupled mobile device. In certain embodiments, the mobile device can include user-specified parameters to adjust the vehicle settings. In further embodiments, the mobile device can be a cellular phone, a smart phone, a personal digital assistant or an enterprise digital assistant. In some examples, the mobile device can be rendered dumb when coupled to the vehicle. In some embodiments, the mobile device can be configured with a "Start" button, which may be a physical button on the keyboard 1010 of the mobile device 1000 or may appear on the interface screen 1020. Such start button may permit starting of the vehicle by activation of the button, typically after the mobile device has been wirelessly coupled to the vehicle.

In certain embodiments, a mobile device capable of text messaging can be used to control operation of a vehicle. For example, the mobile device can be configured to be coupled to a vehicle to permit switching of the vehicle into drive when the mobile device is electrically coupled at least one electrical system of the vehicle. In some examples, the mobile device can be further configured to disable text messaging when the device is coupled to the vehicle. In certain examples, the mobile device is configured to be charged when coupled to the vehicle. In some examples, the mobile device comprises an identifier to permit switching of the vehicle into drive. In certain embodiments, the mobile device can be configured to disable an interface screen when coupled to the vehicle. In other embodiments, the mobile device can be configured to couple to a wireless unit to permit hands free calling when the mobile device is coupled to the vehicle. In additional embodiments, the mobile device can be configured to couple wirelessly to the vehicle. In some embodiments, the mobile device can be configured to couple to the vehicle in addition to a prior coupled mobile device. In certain examples, the mobile device comprises user-specified parameters to adjust the vehicle settings. In additional examples, the mobile device can be a cellular phone, a smart phone, a personal digital assistant or an enterprise digital assistant. In further examples, the mobile device can be rendered dumb when coupled to the vehicle.

In certain embodiments, a method of preventing a vehicle operator from sending text messages while operating the vehicle is provided. In certain examples, the method comprises coupling a mobile device to the vehicle to permit operation of the vehicle, and disabling text messaging of the mobile device to prevent sending of text messages while the mobile device is coupled to the vehicle. In some examples, the method can include disabling the text messaging by rendering the mobile device dumb. In other examples, the method can include disabling the text messaging by deactivating an interface screen of the mobile device. In additional examples, the method can include coupling a second mobile device to the vehicle to permit operation of the vehicle. In further examples, the method can include coupling the mobile device to the vehicle through a coupler electrically coupled to an electrical system of the vehicle. In some embodiments, the method can include coupling the mobile device to the vehicle to permit starting of the vehicle. In additional embodiments, the method can include coupling the mobile device to the vehicle to permit shifting of the vehicle into drive.

In some embodiments, the method can include configuring the mobile device for hands free calling when the mobile device is coupled to the vehicle. In further embodiments, the method can include configuring the mobile device to receive a unique identifier to permit operation of the vehicle. In additional embodiments, the method can include configuring the mobile device to receive user specific information.

In certain examples, another method of preventing a vehicle operator from sending text messages while operating the vehicle is described. In some examples, the method comprises coupling a mobile device to the vehicle to permit operation of the vehicle, in which the mobile device is coupled to the vehicle at a position inaccessible to an operator of the vehicle. In certain embodiments, the method can include disabling the text messaging by rendering the mobile device dumb. In additional embodiments, the method can include disabling the text messaging by deactivating an interface screen of the mobile device. In other embodiments, the method can include coupling a second mobile device to the vehicle to permit operation of the vehicle. In some embodiments, the method can include coupling the mobile device to the vehicle through a coupler electrically coupled to an electrical system of the vehicle. In additional embodiments, the method can include coupling the mobile device to the vehicle to permit starting of the vehicle. In yet other embodiments, the method can include coupling the mobile device to the vehicle to permit shifting of the vehicle into drive. In other embodiments, the method can include configuring the mobile device for hands free calling when the mobile device is coupled to the vehicle. In some embodiments, the method can include configuring the mobile device to receive a unique identifier to permit operation of the vehicle. In other embodiments, the method can include configuring the mobile device to receive user specific information.

In certain embodiments, a method of permitting hands free phone calls from a mobile device while operating a vehicle and preventing text messaging from the mobile device while operating the vehicle is disclosed. In certain examples, the method comprises coupling the mobile device to vehicle to permit operation of the vehicle and disabling the text messaging of the mobile device when coupled to the vehicle.

In some examples, the method can include disabling the text messaging by deactivating the text messaging capability of the mobile device. In other examples, the method can include disabling the text messaging by deactivating an interface screen of the mobile device. In further examples, the method can include coupling a second mobile device to the vehicle to permit operation of the vehicle. In some examples, the method can include coupling the mobile device to the vehicle through a coupler electrically coupled to an electrical system of the vehicle. In other examples, the method can include coupling the mobile device to the vehicle to permit starting of the vehicle. In additional examples, the method can include coupling the mobile device to the vehicle to permit shifting of the vehicle into drive. In further examples, the method can include configuring the mobile device for hands free calling through a Bluetooth® unit of the vehicle when the mobile device is coupled to the vehicle. In some examples, the method can include configuring the mobile device to receive a unique identifier to permit operation of the vehicle. In additional examples, the method can include configuring the mobile device to receive user specific information.

In certain examples, a method of permitting hands free phone calls from a mobile device while operating a vehicle and preventing text messaging from the mobile device while operating the vehicle that includes coupling the mobile device to vehicle at a position inaccessible to an operator of the vehicle to permit operation of the vehicle is provided.

In some embodiments, the method comprises disabling the text messaging by deactivating the text messaging capability of the mobile device. In other embodiments, the method comprises disabling the text messaging by deactivating an interface screen of the mobile device. In additional embodiments, the method comprises coupling a second mobile device to the vehicle to permit operation of the vehicle. In further embodiments, the method comprises coupling the mobile device to the vehicle through a coupler electrically coupled to an electrical system of the vehicle. In some embodiments, the method comprises coupling the mobile device to the vehicle to permit starting of the vehicle. In additional embodiments, the method comprises coupling the mobile device to the vehicle to permit shifting of the vehicle into drive. In other embodiments, the method comprises configuring the mobile device for hands free calling through a Bluetooth® unit of the vehicle when the mobile device is coupled to the vehicle. In yet other embodiments, the method comprises configuring the mobile device to receive a unique identifier to permit operation of the vehicle. In further embodiments, the method comprises configuring the mobile device to receive user specific information.

In certain examples, a kit for preventing text messaging while driving is provided. In some embodiments, the kit comprises a memory unit or device comprising a method to prevent operation of the vehicle when a mobile device is not coupled to the vehicle and to allow operation of the vehicle when the mobile device is coupled to vehicle. In other examples, the kit may include instructions for flashing the engine control unit of a vehicle with the method on the memory device.

In certain embodiments, the kit can include a coupler configured to couple the mobile device to the engine control unit of the vehicle. In further embodiments, the kit can include a second coupler different from the coupler, the second coupler configured to couple a second mobile device to the engine control unit of the vehicle. In some examples, each coupler can be individually controlled by an administrator. In additional embodiments, the kit can include a device configured to receive the memory unit and to couple to a port of the vehicle to flash the engine control unit. In some embodiments, the device is configured to couple to an OBDII port of the vehicle.

In certain embodiments, a kit for preventing text messaging while driving that comprises memory means for flashing an engine control means with a method to prevent operation of the vehicle when a mobile device is not coupled to the vehicle and to allow operation of the vehicle when the mobile device is coupled to vehicle, and instructions for using the memory means is described. In certain examples, the kit can include coupling means configured to couple the mobile device to the engine control means of the vehicle. In other examples, the kit can include second coupling means different from the coupling means, the second coupling means for coupling a second mobile device to the engine control means of the vehicle. In additional examples, the kit can include device means for receiving the memory means and for coupling with a port of the vehicle to flash the engine control means. In further examples, the device means can be configured to couple to an OBDII port of the vehicle.

In certain examples, a method comprising determining if a vehicle is constructed and arranged to receive an input from a mobile device, the vehicle configured to prevent operation of the vehicle when the mobile device is not coupled to the vehicle and to allow operation of the vehicle when the mobile device is coupled to vehicle, and providing an insurance policy cost estimate based on the determined vehicle is described. In some examples, the method may include configuring the vehicle to prevent operation of the vehicle when the mobile device is not coupled to the vehicle and to allow operation of the vehicle when the mobile device is coupled to vehicle, and adjusting the insurance cost estimate.

In other examples, a method comprising determining if a vehicle is constructed and arranged to receive an input from a mobile device, the vehicle configured to prevent operation of the vehicle when the mobile device is not coupled to the vehicle and to allow operation of the vehicle when the mobile device is coupled to vehicle, and providing an insurance policy based on the determined vehicle is provided. In some examples, the method may include configuring the vehicle to prevent operation of the vehicle when the mobile device is not coupled to the vehicle and to allow operation of the vehicle when the mobile device is coupled to vehicle, and adjusting the cost of the insurance policy.

In some examples, a method of facilitating safe driving comprising configuring a vehicle to be inoperable when a mobile device is not coupled to the vehicle and is configured to be operable when the mobile device is coupled to vehicle is disclosed.

In additional examples, a method of facilitating safe driving, the method comprising configuring a vehicle to be inoperable when a mobile device is not coupled to the vehicle and is configured to be operable when the mobile device is coupled to vehicle in a location inaccessible by a vehicle operator is provided.

In some examples, a method of facilitating safe driving, the method comprising providing a vehicle that is configured to be inoperable when a mobile device is not coupled to the vehicle and configured to be operable when the mobile device is coupled to vehicle in a location inaccessible by a vehicle operator is provided.

In certain examples, a user may attempt to circumvent the systems and methods described herein by using extension cords, software programs or other bypass features to permit operation of the vehicle while at the same time preserving the ability to send text messages. To mitigate against such an occurrence, the coupler can be configured as a locking compartment (or include a locking door) that remains locked while the vehicle is started or is in gear. As discussed herein, the display or interface of the mobile device may also be disabled to prevent text messaging while the mobile device is coupled. Other possible configurations to reduce the likelihood that text messaging and vehicle operation can be simultaneously performed will be recognized by the person of ordinary skill in the art, given the benefit of this disclosure. For example, the technology described herein can be used in combination with that described in US 20100087137, the entire disclosure of which is incorporated herein by reference.

In certain embodiments, the systems and methods described herein can include one or more safety features such that the vehicle engine does not switch off if the mobile device is removed while the vehicle is in operation. For example, once the vehicle reaches a certain speed, e.g., above 5 mph, the system may permit operation of the vehicle for a limited time after the mobile device is decoupled to avoid crashing or unwanted braking of the vehicle. In some examples, once the vehicle comes to a complete stop, the system may reimplement one or more methods requiring a user to couple the mobile device before the vehicle can be operated again. Other methods of reimplementing the methods described herein will be readily selected by the person of ordinary skill in the art, given the benefit of this disclosure.

In certain examples, the systems, method and devices described herein can be used with one or more biometric features to authorize a user to operative a vehicle. For example, a user's fingerprint stored in the mobile device can be matched with a fingerprint of a finger pressed against a screen in the vehicle to verify the operator is an authorized user of the vehicle. The fingerprint may also be stored in a lookup table in the system. Other biometric features and user features, e.g., user weight, etc., can be used to authorize use of the vehicle.

Figure 11:
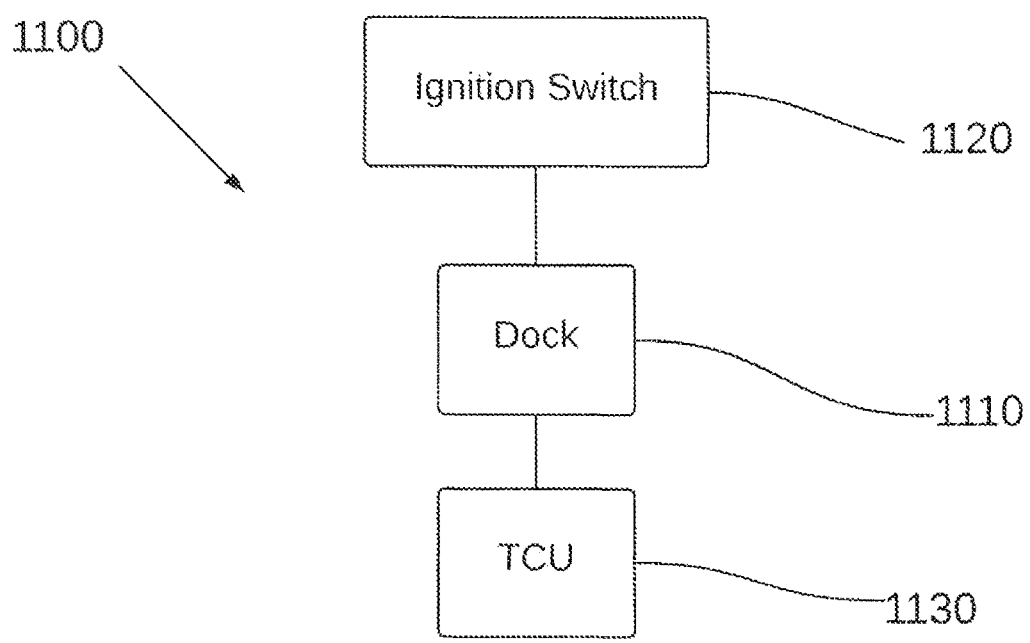
FIG. 11 is an illustration of a dock, in accordance with certain examples.

In certain embodiments, the systems described herein can be configured as a docking station or other device designed to connect to the mobile device. Referring to FIG. 11, a system 1100 comprises a docking station 1110 electrically connected to an ignition switch or circuit 1120 and a transmission control unit 1130. The docking station 1110 can be configured to prevent starting of the vehicle when the mobile device is disconnected from the docking station 1110. For example, the docking station can be configured to send a signal to the engine control unit (not shown) that permits starting of the vehicle when the mobile device is docked and the ignition switch 1120 is actuated by a driver. In other embodiments, a signal from the ignition switch 1120 can be routed through the docking station 1110 and interrupted if a mobile device is not docked to the docking station 1110 and passed by the docking station 1110 if a mobile device is connected to the docking station 1110. In other configurations, the docking station 1110 can be connected to the transmission control unit (TCU) 1130 to prevent switching of the vehicle into drive or reverse until a mobile device is connected to the docking station 1110. For example, the TCU 1130 is typically connected to one or more sensors that can lock the transmission into park until a suitable signal permits actuating of the transmission from park into drive (or reverse). The docking station 1110 can send a suitable signal to the TCU 1130 to permit unlocking of the park feature and switching of the vehicle into drive or reverse. In certain embodiments, the docking station 1110 can be physically integrated into the existing vehicle's electrical system, e.g., hardwired, or may be wirelessly integrated into the existing vehicle's electrical system. In other instances, the docking station may be electrically connected to the vehicle system through a port or interface on the vehicle, e.g., an OBDII port, USB port, miniUSB port or other suitable interface.

In certain embodiments, the systems and method described herein can be used with a connector designed to permit interfacing of the mobile device with a desired interface of the system. For example, the port of a particular mobile device may not be compatible for interfacing with an interface on the vehicle or the systems described herein. A connector can be configured to permit connection of a mobile device to the system. In some instances, the connector can be configured with a connector at one end or side to connect to the mobile device and a connector at another end or side to connect to the system. For example, on one end the connector may comprise a mini-USB connector to connect to the vehicle or the system of the vehicle and a connector on another end to connect to the mobile device. In certain embodiments, the connector can include one end configured to connect to the vehicle or system and a plurality of other types of connectors to couple to mobile devices. For example, the connector can be generally rectangular and comprise a connector on one side to interface to the vehicle and three different connectors, one on each of the other sides of the generally rectangular connector, to interface to a particular type of mobile device. The user can select the particular type of connector suitable for their particular mobile device. If desired, the mobile device connectors can be rotated or rotatable such that the mobile device connects to the connector at an opposite end from the vehicle coupler to provide additional spacing between the mobile device and the system of the vehicle. Suitable types of connectors for coupling to mobile devices include, but are not limited to, USB type connectors, mini-USB type connectors, micro-USB type connectors, and other connectors commonly used to provide an electrical connection between a mobile device and a charging device and/or a mobile device and a computer.

Figure 12:
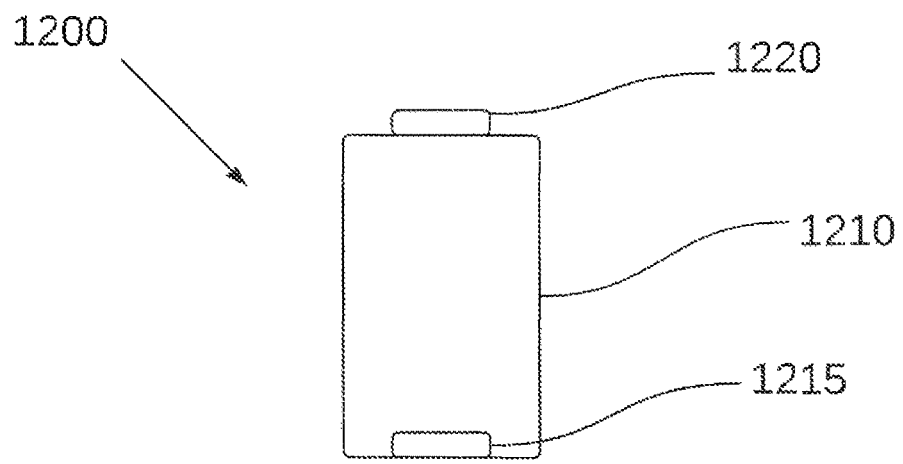
FIG. 12 is an illustration of a mobile device case configured as a phone case, in accordance with certain examples.

In certain examples, the connector may be integrated into a mobile device jacket, sleeve or case, e.g., a phone jacket or phone case, such as those commonly used to protect mobile devices. The mobile device case may be a single piece or may include multiple pieces to permit insertion of the phone and subsequent coupling of the phone sleeve pieces to each other. Referring to FIG. 12, a phone case 1200 comprises a body 1210 configured to receive a mobile device such as a phone, a first connector 1215 configured to electrically connect the phone to the phone case 1210, and a second electrical connector 1220 configured to electrically connect the phone case 1210 to the vehicle or one or more of the systems described herein. The first connector 1215 and the second connector 1220 can be electrically connected to each other through one or more interconnects, hardwire connected to each other such that information or signals from a mobile device can be provided to the first connector 1215 and onto the second connector 1220 and to the vehicle or one or more of the systems described herein. In an alternate embodiment, the first connector 1215 and the second connector 1220 can be wirelessly connected to each other. Phone cases or sleeves can be configured for particular types of phones with a specific type of first connector 1210 designed for a specific type of phone and a common second connector 1220 such that the second connector 1220 that plugs into or interfaces with the dock, system or other devices described herein comprises a common structure and/or features. If desired, the phone case or sleeve may also comprise an integrated microprocessor such that the methods described herein can be implemented through the use of the phone sleeve. For example, the microprocessor of the phone sleeve can be configured to prevent starting of the vehicle until the phone sleeve is connected this to the vehicle.

Figure 13:
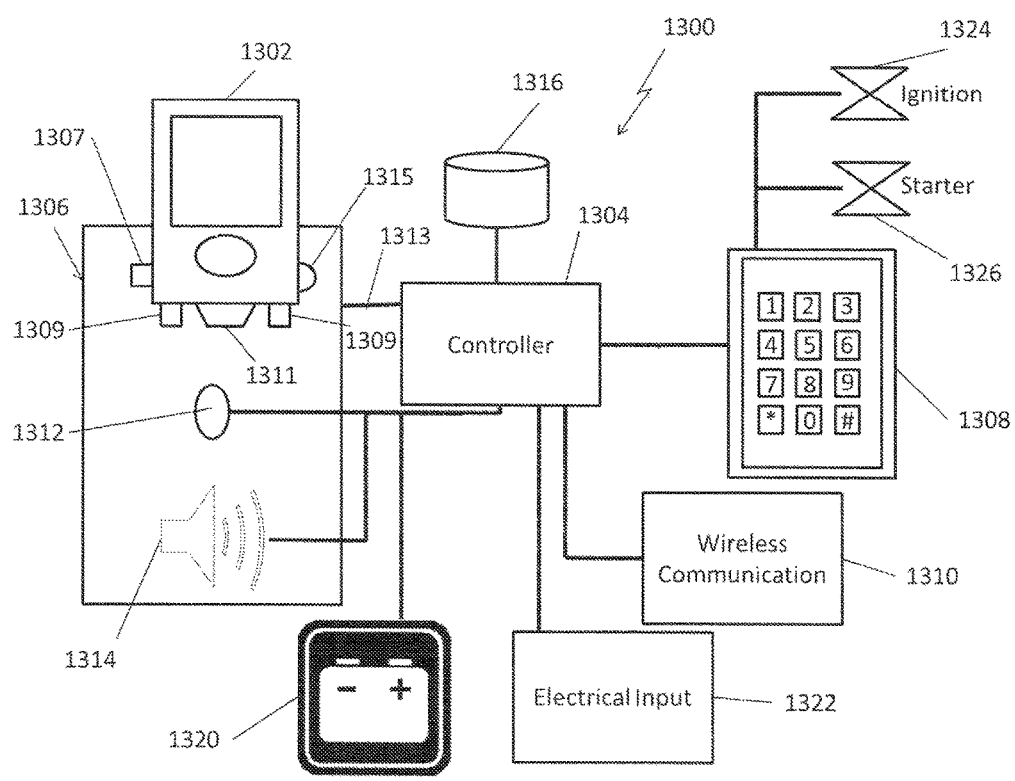
FIG. 13 illustrates a system in accordance with some embodiments.

Referring now to FIG. 13, a system 1300 is illustrated in accordance with some embodiments, where the system is configured to control an operating state of a vehicle, for example, a motor vehicle. According to some embodiments, the system provides a method of preventing operation of the vehicle when mobile-device based activities that would otherwise contribute to distract operation of the vehicle are detected.

The system 1300 includes a mobile device 1302, a controller 1304, a docking station 1306, a user interface 1308, a wireless transceiver 1310, an indicating light 1312, an annunciator 1314, memory 1316, a first electrical input 1320, a second electrical input 1322, a first relay 1324 and a second relay 1326. In general, the system 1300 is deployed in a vehicle to control use of a mobile device in the vehicle by, for example, controlling the operating state of the vehicle based on receipt of the mobile device 1302 in the docking station 1306. In some embodiments, the docking station 1306 is located in the vehicle within arm's reach of the operator. For example, in one embodiment, the docking station 1306 sized and shaped for installation in a cup holder located in a console in the vehicle. According to other embodiments, the docking station 1306 may be located elsewhere in the vehicle, for example, on the visor, in the dash, in the glove box or in the trunk where it is inaccessible to the operator while the vehicle is being operated.

According to the illustrated embodiment, the docking station 1306 includes at least one sensor 1307, at least one alignment element 1309, a connector 1311, a communication interface 1313 and receptacle lamp 1315. Depending on the embodiment, the at least one sensor 1307 can include a limit switch, proximity sensor, optical sensor or other sensing element used to detect when the mobile device 1302 is received within the docking station 1306. The at least one alignment element 1309 can be employed to, for example, "polarize" a receptacle provided by the docking station to prevent a mobile device 1302 from being inserted incorrectly. According to one embodiment, the docking station 1306 includes two pins used as alignment elements 1309 where the two pins have different diameters. According to this embodiment, the mobile device or a case within which the mobile device is housed includes corresponding openings that ensure that the phone can only be fully-inserted in the docking station 1306 in a single orientation. According to a further embodiment, the at least one alignment element 1309 insurers that a hardwired connection between the mobile device and the controller is correctly completed by preventing the mobile device 1302 from being rotated about its longitudinal axis such that it faces the wrong direction. When properly aligned a connector included in the mobile device 1302, or included in a case within which the mobile device is installed for inserting the mobile device in the docking station, properly aligned with the connector 1311 included in the docking station 1306.

According to other embodiments, the coupling of the docking station 1306 and the mobile device 1302 can be a symmetrical connection such that at least one alignment element is not required. According to these embodiments, the mobile device 1302 can be rotated about its longitudinal axis and faced or positioned in either direction when it is received by the docking station 1306.

In some embodiments, where the docking station 1306 provides a hardwired connection for the mobile device 1302, the connector 1311 can be used to provide a connection between the docking station 1306 and the controller 1304 via the communication interface 1313. According to one embodiment, the connector 1311 is a mini-USB connector. According to a further embodiment the communication interface 1313 includes a cable for example a ribbon cable.

In various embodiments, the receptacle lamp 1315 illuminates the docking station to allow the user to view or otherwise to observe more easily a receptacle provided in the docking station 1306 by which the mobile device 1302 is to be received. Such an approach can be used to assist vehicle operators who are in a vehicle after dark.

According to some embodiments, the mobile device 1302 is connected to the docking station 1306 by plugging the mobile device 1302 into the docking station to allow an electrical connector included in the mobile device 1302 to connect with a compatible electrical connector included in the docking station 1306. For example, where the mobile device 1302 is an Apple™ device, the docking station 1306 can include a 30 pin male docking station connector or a 10 pin Lightning® connector used with any of the Apple iPod, iPad and iPhone devices. Other styles and types of connectors can be included in the docking station 1306 depending on the embodiment. As will be described in detail herein, according to one embodiment, the docking station 1306 includes a universal connector configured to couple to any of a variety of mobile devices so long as the mobile device is fitted with a case or other adapter that converts the connector-style employed by the mobile device to a connector suitable for attachment to the universal connector included in the docking station 1306.

In certain embodiments, the docking station, phone jacket or other components of the system can be produced using one or more materials including, but not limited to, metals, metal alloys, non-metals, plastics, elastomers and the like. Where plastics are used, the materials can be disposed or injected into a mold or die that is sized and arranged to provide a desired form factor, shape or other features. In some examples, the material used to produce the components can be a thermoset or a thermoplastic material. Where a thermoset material is used, the thermoset material can include a fiberglass, a rubber, a foam, a melamine resin, an epoxy resin, a polyimide, a cyanate, a cyanate ester, a polycyanurate and combinations thereof or other commonly used thermoset materials. Where a thermoplastic material is used, the thermoplastic material can include an acrylonitrile butadiene styrene, an acrylic, a cellulose acetate, a cyclic olefin copolymer, an ethylene-vinyl acetate, an ethylene vinyl alcohol, a fluoroplastic such as PTFE, an acrylic/PVC alloy, a polyoxymethylene, a polyacrylate, a polyacrylonitrile, a polyamide, a polyamide-imide, a polyaryletherketone, a polybutadiene, a polybutylene, a polybutylene terephthalate, a polycaprolactone, a polychlorotrifluoroethylene, a polyethylene terephthalate, a polycyclohexylene dimethylene terephthalate, a polycarbonate, a polyhydroxyalkanoate, a polyketone, a polyester, a polyethylene, a polyetheretherketone, a polyetherketoneketone, a polyetherimide, a polyethersulfone, a halogenated polyethylene, a polyimide, a polylactic acid, a polymethylpentene, a polyphenylene oxide, a polyphenylene sulfide, a polyphthalamide, a polypropylene, a polystyrene, a polytrimethylene terephthalate, a polyurethane, a polyvinyl acetate, a polyvinyl chloride, a polyvinylidene chloride, a styrene-acrylonitrile and combinations thereof or other commonly used thermoplastic materials. The components may also be painted, etched, dyed or include coatings or other features as desired.

In some embodiments, the controller 1304 is included in the docking station 1306. According to other embodiments, the controller 1304 is located elsewhere in the vehicle. Similarly, in some embodiments, the user interface 1308 is included in the docking station while in other embodiments the user interface 1308 is located elsewhere in the vehicle. For example, the user interface 1308 and the controller 1304 can be located in a common housing remote from the docking station 1306. In other embodiments, the user interface 1308 and the controller 1304 are located in separate locations in the vehicle, respectively. In some embodiments, the user interface may be integrated within existing user interface in the vehicle, for example, an existing touchscreen display.

According to some embodiments, the user interface 1308 includes a keypad and/or a display. In these embodiments, the user interface 1308 can mount on a face of the docking station 1306. According to one embodiment, the user interface 1308 includes a keypad that is hingedly mounted to the remainder of the docking station to allow easier access to a vehicle operator.

The controller 1304 can include electronic components including one or combination of a microcontroller including a processor (for example, a CPU) and memory 1316. Depending on the embodiment the memory 1316 can be included internal to the microcontroller or external to the microcontroller in a variety of forms including FLASH, EEPROM, RAM and ROM. In some embodiments, the memory 1316 is located remote from the docking station 1306 and no communication path exists that would allow a car thief to log into the system or otherwise access program and/or memory content via the docking station 1306. According to these embodiments, the system 1300 has improved security resulting from the preceding configuration.

In some embodiments, the controller 1304 includes the transceiver 1310 for example a Bluetooth™ transceiver. According to these embodiments, the transceiver 1310 allows a fully hands-free operation of an authorized mobile device 1302 when received by the docking station 1306.

In addition to the preceding features and functionality, the controller 1304 can include other elements alone or in combination, for example, signal processing circuitry (for example, an analog-to-digital converter), Wi-Fi circuitry, GPS transceivers and other navigational system elements, other instrumentation and/or sensors. In addition, the controller 1304 can include an internal communication bus for the transfer of instructions and data in the controller.

The user interface 1308 can be provided in any of a variety of forms depending upon the embodiment. For example, the user interface can include a conventional keypad similar to the keypad found in a phone. In other embodiments, the user interface can include a graphical user interface (GUI) such as a GUI presented in a touchscreen display. In other embodiments, the graphical user-interface can allow the user to operate the user interface 1308 via a touchpad or mouse and cursor, or via speech recognition to execute voice commands.

According to one embodiment, the indicating light 1312 and/or the annunciator 1314 are coupled to the controller 1304. In some embodiments the indicating light 1312 and/or the annunciator 1314 are included in the docking station 1306. These devices can be employed to provide feedback to the user concerning the operating status of the system. Further, although the indicating light 1312 is referred to in the singular, the indicating light 1312 may include one or a plurality of light sources. For example, indicating light 1312 can be a single lamp capable of illumination in a plurality of colors. Alternatively, the indicating light 1312 can include a plurality of light sources (for example, LEDs) that may include one or a plurality of different colors. Thus, where the indicating light 1312 is described as producing red and green depending on the operating state of the system, it should be understood that separate red and green lamps, respectively, can be employed in the indicating light 1312. In addition, user feedback can be provided by establishing various blink-patterns with the indicating light 1312 where the different blink-patterns are known to a user to indicate different operating statuses of the controller 1304, for example.

According the various embodiments, the controller 1304 can also be connected to one or more elements included in the vehicle, for example, various inputs and outputs (I/O). In the illustrated embodiment, for example, the first electrical input 1320, the second electrical input 1322 are connected to an unswitched source of power and a switched source of power, respectively. Other I/O connections can include connections between the controller 1304 and vehicle limit switches, transducers and sensors (including fuel sensors, various electrical and electronic sensors and transducers, combustion sensors, transmission sensors, brake sensors), dome light circuits, ignition circuits and I/O coupled with I/O provided by the vehicle onboard computer.

In an embodiment where the system 1300 is installed in an automobile, the unswitched source of power can include nominal battery voltage, for example, 12 or 24 VDC. The switched source of power can include the same source of power isolated from the controller 1304 by operation of a key-switch (for example, an ignition key) or other switching device. According to the illustrated embodiment, the first relay 1324 and the second relay 1326 are connected to outputs included in the controller 1304. According to one embodiment, each of the first relay 1324 in the second relay 1326 are "kill" relays employed to prevent operation of the vehicle where for example the mobile device 1302 is not located in the docking station 1306. For example, the first relay 1324 can be located in an ignition circuit for the vehicle and the second relay 1326 can be located in a start circuit for the vehicle.

According to some embodiments, the controller 1304 is configured to communicate commands and to receive data in reply. However, to improve security of the system 1300, in some embodiments, commands cannot be sent to the controller 1304 of the communication interface 1313 between the docking station 1306 and the controller 1304. These embodiments can provide increased security by preventing the system 1300 from being hacked using the communication interface between the docking station 1306 and the controller 1304. For example, these embodiments prevent a hacker from employing a mobile device 1302 received in the docking station to access and/or program the controller 1304 and memory 1316.

According to some embodiments the docking station 1306 is manufactured from plastic, for example, ABS. According to further embodiments, the docking station 1306 is amended back shirt using an injection molding process.

Figure 14A:
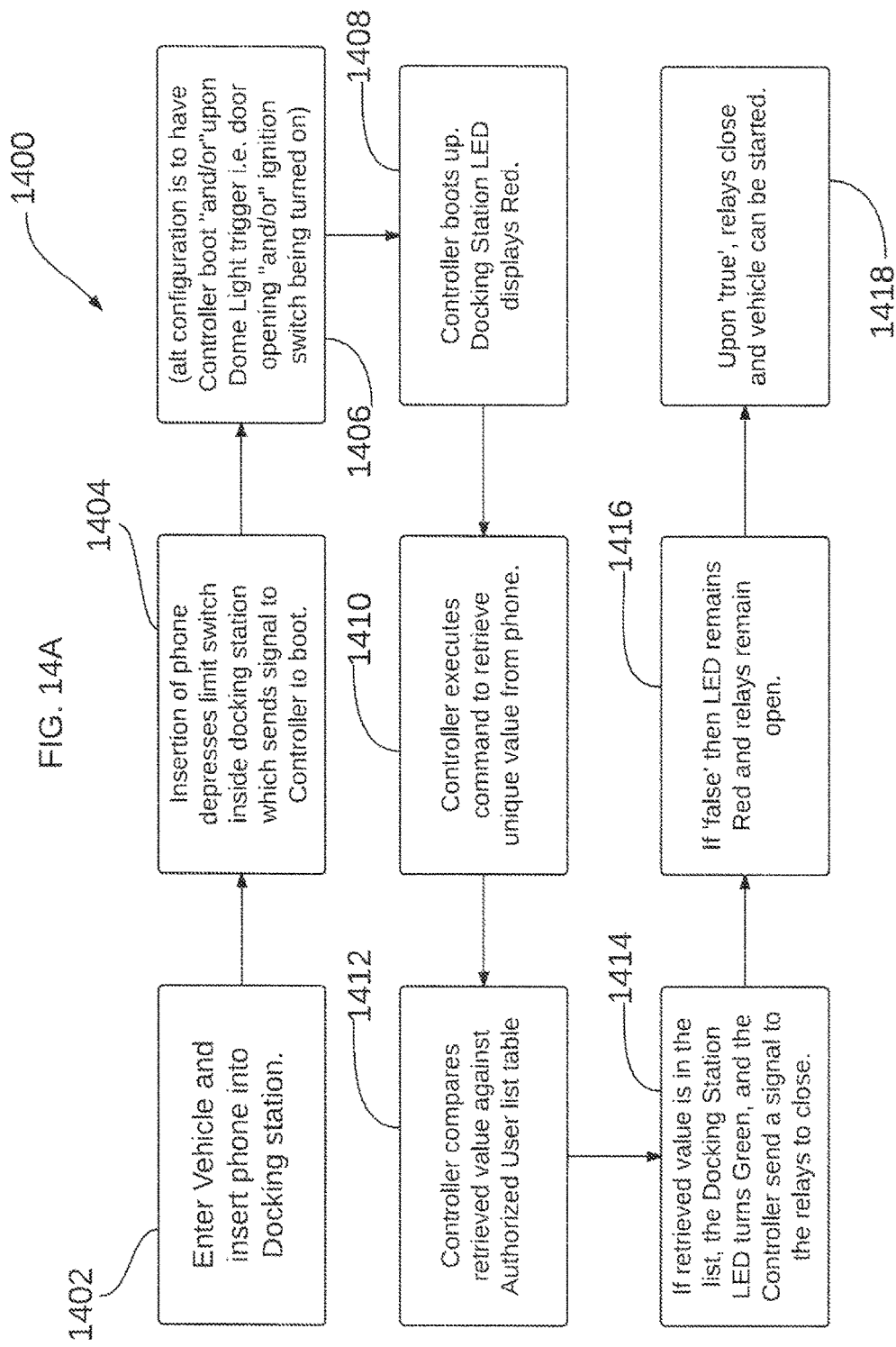
FIG. 14A illustrates a flow diagram of system operation in accordance with some embodiments.
Figure 14B:
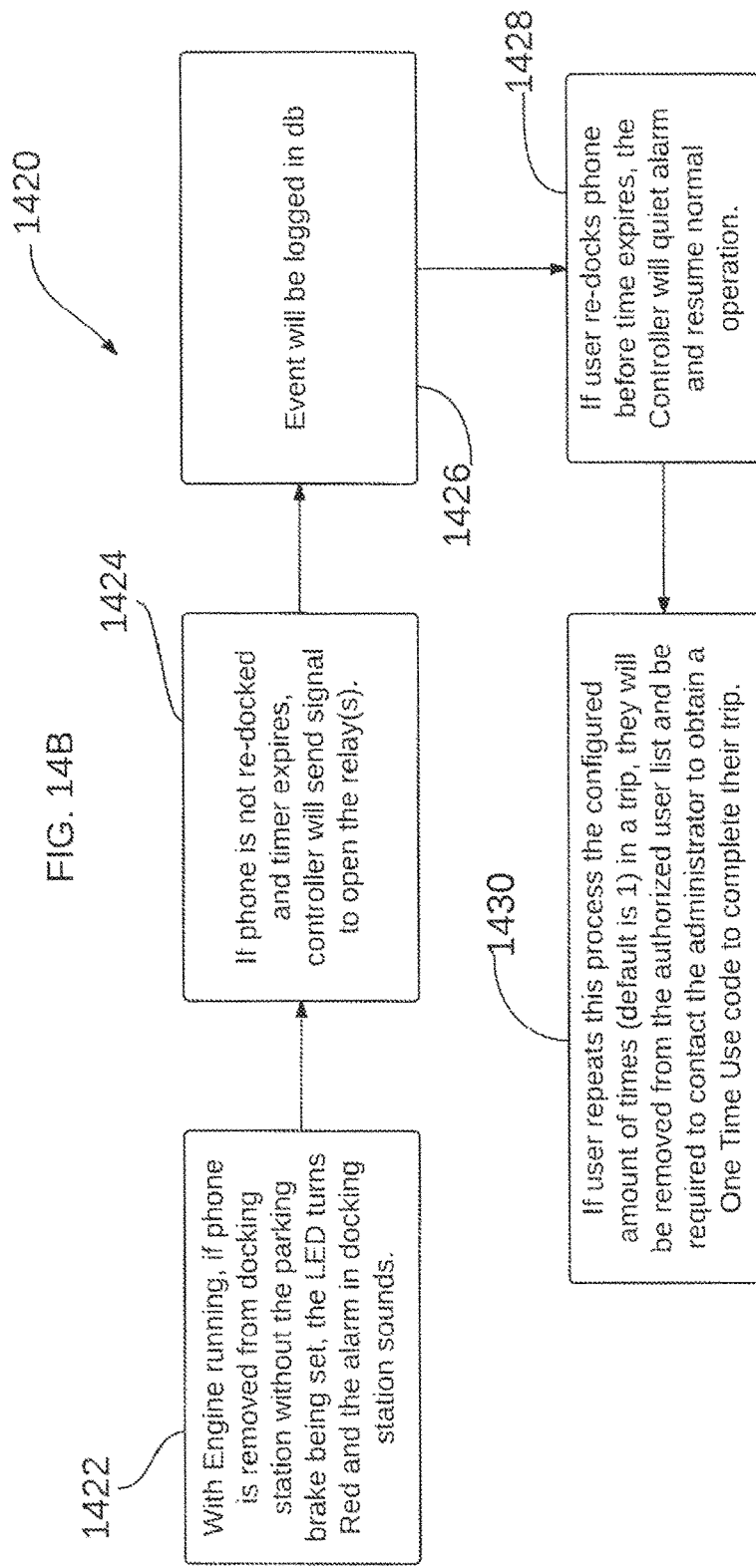
FIG. 14B illustrates a flow diagram of system operation in accordance with some further embodiments.

Referring now FIGS. 14A-14B, operation of the system 1300 is described in accordance with various embodiments in which an authorized mobile device is employed with the vehicle. The process 1400 illustrated in FIG. 14A illustrates the system 1300 as employed to control the starting of a vehicle in accordance with some embodiments. At act 1402, the vehicle operator enters the vehicle and inserts an authorized mobile device in the docking station 1306. At act 1404, the controller detects that the docking station 1306 is in receipt of the mobile device 1302. In accordance with one embodiment, the controller 1304 detects that the mobile device 1302 is received in the docking station 1306 when one or more limit switches located in the docking station 1306 change state. For example, the limit switches can be located such that they are activated with the mobile device 1302 fully received in the docking station 1306. At act 1406, an optional act is provided by which the controller 1304 boots-up based on one or combination of; the opening of the vehicle door, activation of a dome light circuit or an ignition switch being turned on.

At act 1408, operation of the controller is indicated by turning on the indicating lamp 1312. The indicating lamp can be located integral to the docking station 1306, in the vehicle control panel, dash, or other user interface located in the vehicle in the vicinity of the user. According to some embodiments, other forms of user feedback can be provided to indicate when the controller is operational, for example, the annunciator 1314 can be used. According to one embodiment, the speakers included in the mobile device 1302 can be used to provide feedback concerning the status of the controller 1304. At act 1410, controller 1304 operates to receive the mobile-device ID from the mobile device 1302. According to some embodiments, at act 1410, the controller 1304 polls the mobile device 1302 to receive the mobile-device ID. In other embodiments, the mobile device 1302 automatically communicates the mobile-device ID to the controller 1304 when the mobile device 1302 is docked and the controller 1304 is operational.

According to one embodiment, the authentication of the mobile-device ID by the controller only occurs before the vehicle is started. In another embodiment, removal of a previously authenticated mobile device from the docking station of an operating vehicle can cause a vehicle shutdown and/or generate an audible alarm (or visual alarm or indicia if desired) in the vehicle. According to these embodiments, a later reinsertion of the mobile device into the docking station can require a re-authentication of the mobile device in order to allow continued and/or further operation of the vehicle. The preceding approach can be used to defeat attempts to circumvent the system 1300 by operating the vehicle either with an unapproved mobile device or some form of "dummy" device inserted in the docking station. Either alone or in combination with the preceding, the system 1300 can log the occurrence of a removal of the mobile device from the docking station of the operating vehicle. For example, the controller 1304 can store a record (i.e., log) of the event. As described further herein, this record can later be used to prevent a restarting or other operation of the vehicle. These records can also be used in system administration. In one example, such records can be used in personnel management.

According to some embodiments, before the vehicle can be started, the mobile device 1302 is first authenticated. At act 1412, the controller 1304 compares the mobile-device ID received from the mobile device 1302 with mobile-device ID(s) of authorized mobile device(s). The configuration of the controller 1304 with the identity of the authorized mobile devices is described further herein. An unsuccessful authentication at act 1412 results in the vehicle remaining inoperative. A successful authentication can result in feedback to the operator indicating that the vehicle can be started. For example, at act 1414, a green indicating lamp can be displayed. In other embodiments, other forms of user feedback can be provided to alert the vehicle operator that the mobile device 1302 is successfully authenticated.

According to the illustrated embodiment, a successful authentication also results in the controller 1304 generating output signals that trigger operation of the relays 1324 and 1326. For example, the output signals can close the relays to allow the vehicle to be started and operated, at act 1418. In accordance with some embodiments, the controller 1304 wirelessly communicates with the relays 1324, 1326.

Where the authentication of the mobile device is unsuccessful the process 1400 moves to act 1416. Here, indicating light 1312 remains in a state (for example, red in color) to provide the operator with notice that the authentication was unsuccessful. According to further embodiments, one or more approaches can be used to provide the operator with one or a series of follow-on opportunities to authenticate the mobile device.

Referring now to FIG. 14B, a process 1420 illustrates the response of the system 1300 when the authenticated mobile device is removed from the docking station 1306 while the vehicle is operating. At act 1422, removal of the phone from the docking station in an operating vehicle results in immediate feedback to the vehicle operator. According to one embodiment, removal of the phone from the docking station is detected by one or more sensors (for example, limit switches) that change state when the mobile device is fully seated in the docking station. According to another embodiment, the system 1300 periodically receives a unique mobile-device ID from the mobile device 1302 so long as the mobile device is received within the docking station 1306. In a further embodiment, each of the sensor inputs and the receipt of the mobile-device ID must occur to allow the continued operation of the vehicle and failure to receive each results in the immediate feedback to the vehicle operator at the mobile device is removed from docking station. Failure to return the mobile device to the docking station can result in a shutdown of the vehicle.

In the illustrated embodiment, a change of state of the indicating lamp 1312 and activation of the annunciator 1314 occur in response to removal of the mobile device from the docking station. In accordance with one embodiment, the annunciator 1314 provides an audio signal that is greater than 70 dB, for example, 72 dB. The preceding insures that the vehicle operator will be made aware of and respond to such an occurrence.

The system 1300 can be configured to provide predetermined time delays in advance of a variety of actions that may occur during operation of the system. At act 1424, the controller sends a signal to open one or more relays because the phone has not been re-docked. In embodiments where the controller is coupled to a start relay, there may be no immediate effect on the operation of the vehicle. According to other embodiments where the controller is coupled to an ignition relay alone or in addition to the start relay, act 1424 can result in a shutdown of the vehicle. According to these embodiments, the relay actuation will occur unless the authenticated mobile device is returned to the docking station within a predetermined period of time. For example, the controller 1304 can be programmed to deactivate the relays 1324, 1326 to isolate a start circuit or to shut the vehicle down. Regardless of whether the mobile device is returned to the docking station within the predetermined period of time, the removal of the mobile device from the docking station with the vehicle operating is logged as an event by the controller 1304, at act 1426. According one embodiment, the event-logging that occurs at act 1426 includes associating a timestamp each occurrence of a dc-docking of the mobile device from the docking station of an operating vehicle. According to another embodiment, the event logging does not include a timestamp but simply adjusts a count (increments or decrements) maintained by a counter included in the controller 1304. Each of the preceding embodiments allows a system administrator to identify whether and how many times a mobile device is removed from the docking station 1306 of the operating vehicle.

As is described in more detail herein, such event logging can be used to prevent a further operation by preventing the vehicle from being restarted following the first time the vehicle is shutdown, e.g., after the ignition is turned off, after such an event. Accordance to a further embodiment, vehicle restarting is prevented after some other predetermined maximum number of events in which the mobile device is removed from the docking station while the vehicle is operating. In any of the preceding embodiments, a system administrator can allow the user to override the "lockout" by providing the user with a one-time code to allow them to arrive at their destination or other predetermined location where the occurrence of the event(s) can be addressed. If desired, a system administrator can immediately address whether the operator should be permitted to operate a vehicle.

At act 1428, the controller 1304 responds to the mobile device being received back in the docking station 1306 by deactivating the alarms originally triggered by its removal from the docking station. For example, the indicating light 1312 can return to a green color and activation of the annunciator 1314 is stopped. According to one embodiment, the mobile device is re-authenticated when it is returned to the docking station. In a further embodiment, failure to successfully re-authenticate the mobile device can result in a shutdown of the vehicle or the logging of a different type of event.

The system 1300 can also be configured such that a series of events in which the mobile device is removed from the docking station acts to shut the vehicle down. Where, for example, a series of three or more such events occurs during a single trip, the authenticated mobile device can be removed from a list of authorized mobile devices. Further at act 1430, the vehicle operator with the previously authorized mobile device can be forced to contact a system administrator to obtain authorization (for example, a one-time-use code for entry via the user interface 1308) to complete the trip despite the mobile device being removed from the authorized list.

In some embodiments, a monitoring of the presence of the mobile device 1302 in the docking station 1306 includes not only the use of the at least one sensor 1307, but also a monitoring of the connectivity of the hardwired electrical connection between the mobile device 1302 and the connector 1311. In one embodiment, a USB connection is used to connect the mobile device 1302 to the docking station 1306. According to one embodiment, a mini-USB connection is employed. In this embodiment, the controller 1304 monitors the connection of the mobile device to the USB connector included in the docking station to confirm the presence of the mobile device in the docking station.

According to one embodiment, the continued operation of the vehicle following a successful authentication in accordance with FIG. 14A uses two forms of feedback that confirm the presence of the authenticated mobile device in the docking station. The first was described with reference to FIG. 14B where the sensors included in the docking station (for example, limit switches, magnetic sensors, etc.) detect the continued presence of the mobile device in the docking station. Otherwise the system detects that the mobile device is removed from the docking station at act 1422. In further embodiments, the system can detect the presence of the mobile device in the docking station based on a periodic receipt of a unique mobile-device ID from the mobile device.

According to some embodiments, the mobile-device ID includes at least one of a SIM number, IMEI number and a USB serial number to identify the mobile device to the controller 1304. Here, SIM number refers to the number associated with the Subscriber Identity Module included in the mobile device and the IMEI number refers to an International Mobile Equipment Identity number associated with a mobile device. In accordance with some embodiments the mobile-device ID uniquely identifies the mobile device to the controller 1304. According to one embodiment, the USB serial number is employed because it is more easily accessed electronically than SIM number or IMEI number and/or it is common to the mobile devices regardless of manufacturer. In some embodiments, the controller actively polls the mobile device for the mobile-device ID, for example, periodically polls the mobile device for the ID. According to these embodiments, the mobile device communicates the mobile-device ID to the docking station in response to a request from the docking station while in other embodiments the mobile device is programmed to periodically communicate the mobile-device ID to the docking station without being requested to do so. The above-described approach allows the system to detect the presence of the mobile device in the docking station independent of the sensors and independently warn the vehicle operator of an impending vehicle shutdown or other action (event logging, etc.) that will result due to removal of the mobile device from the docking station.

Figure 14C:
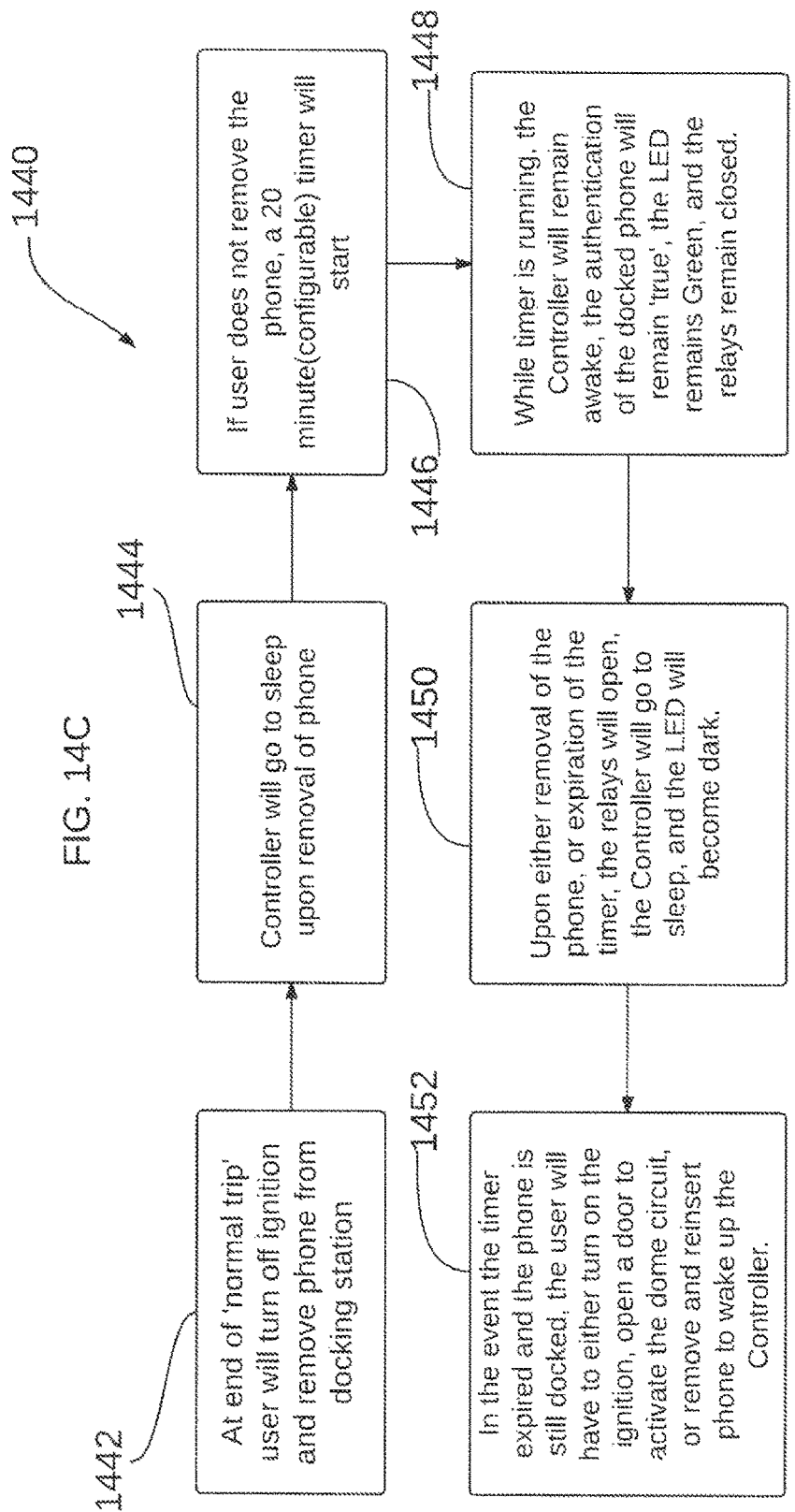
FIG. 14C illustrates a flow diagram of a further operation of a system in accordance with still further embodiments.

Referring now to FIG. 14C, a process 1440 is illustrated in accordance with a further embodiment. The illustrated process 1440 shows a result where a trip in the vehicle with an authorized mobile device has reached an end. At act 1442, a user turns off the ignition and removes the authenticated mobile device from the docking station 1306. At act 1444, the controller 1304 enters a "sleep" mode when it detects the removal of the mobile device from the docking station after the vehicle is shutdown. Where the vehicle is shutdown and the user does not remove the mobile device from the clocking station, a timer operates a predetermined amount of time at act 1446. With the timer running, the controller 1304 remains "awake". During this period, at act 1448, the authentication of the mobile device 1302 remains active and the local status indication, for example, the status of the indicating light 1312, provides feedback that the authentication remains valid and the vehicle is operational.

Upon either removal of the phone from the docking station or expiration of the timer, the controller 1304 operates to open the relays 1324, 1326, turn the indicating light 1312 off and enter a reduced-power sleep mode at act 1450.

Should the timer expire while the mobile device 1302 remains docked, the controller 1304 remains in the sleep mode until a subsequent act occurs. In one embodiment, any of the following acts place the controller 1304 in an active mode: the ignition is turned on: a vehicle door is opened to activate a dome-light circuit; or the mobile device is momentarily removed from and then returned to the docking station 1306.

Figure 15:
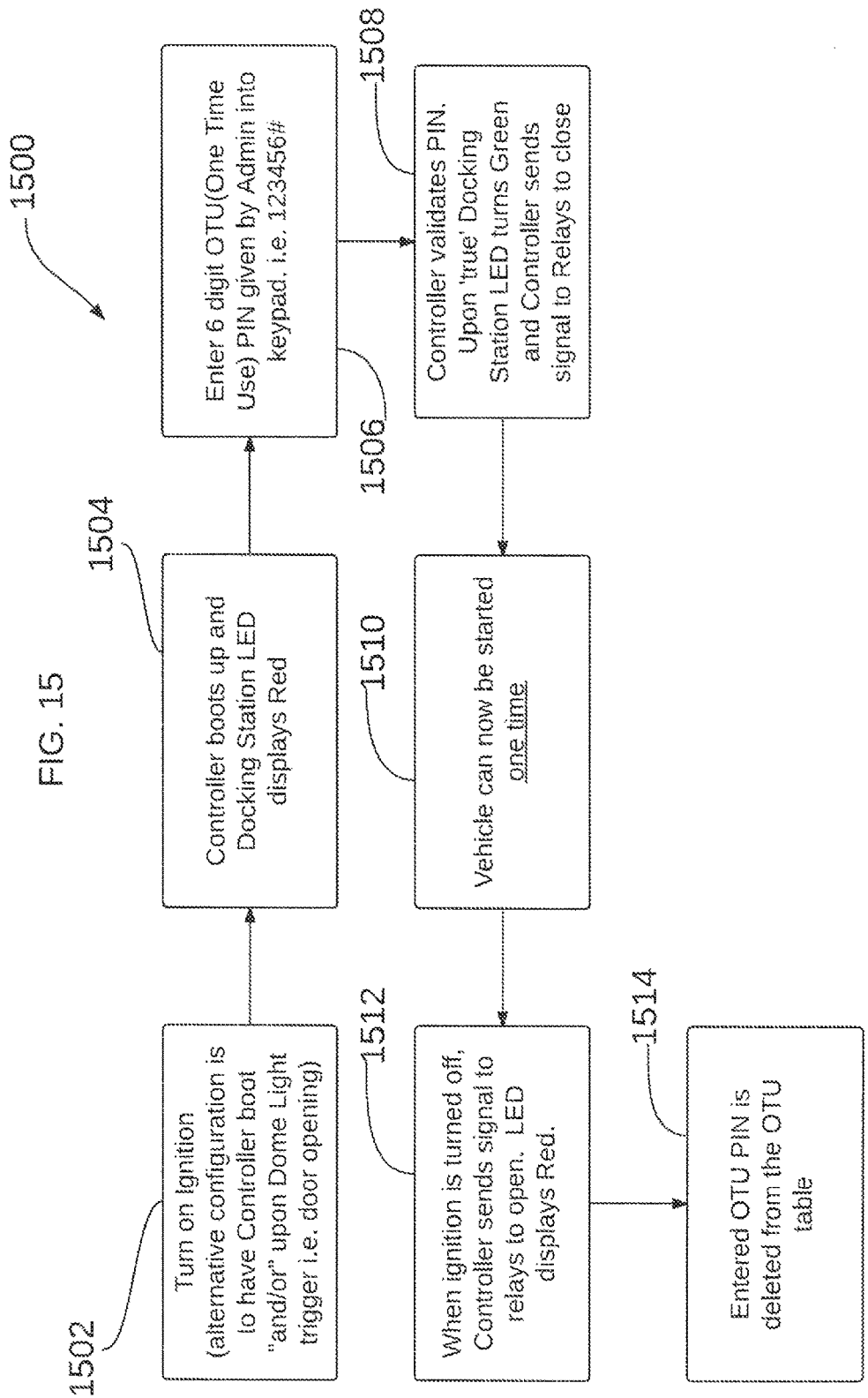
FIG. 15 illustrates a flow diagram of yet another operation of the system in accordance with some embodiments.

The system 1300 can also, in various embodiments allow for limited operation of a vehicle on a temporary basis by operators who do not possess an authorized mobile device. FIG. 15 illustrates a process 1500 in accordance with an embodiment in which temporary operation of the vehicle is permitted on entry of a previously approved one-time code. At act 1502, the controller 1304 enters an active mode when it is, for example, awakened by any one of or combination of: insertion of a key into an ignition switch; activation of an ignition circuit for the vehicle; or opening of a door to the vehicle. At act 1504, the controller 1304 enters the active operating state and turns on the indicating light 1312 to indicate that the system is not ready to allow operation of the vehicle. For example, the docking station or other user interface including the system 1300 can display a red LED to indicate the operator the operator that the vehicle is currently inoperative.

According to the illustrated embodiment, the system 1300 has one or more one-time use codes previously established by a system administrator. The controller 1304 is programmed with these codes, for example, by the administrator using the user interface 1308. In one embodiment, the administrator employs a tablet computer or the mobile device to wirelessly program the controller 1304, for example, via the Bluetooth communication network. In the illustrated embodiment, the operator enters a six digit code (for example, a PIN number) into the system 1300 via the user interface 1308, at act 1506. At act 1508, the controller 1304 authenticates the PIN to determine whether it is valid. Where the PIN is successfully authenticated, the controller changes the state of the system 1300 to allow operation of the vehicle even though an authenticated mobile device is unavailable. In the illustrated embodiment, successful authentication results in a change in the status of the indicating light 1312 (for example, a change from red to green) and activation of the relays 1324, 1326. At act 1510, the vehicle operator can start the vehicle, one time only, with the successful authentication.

Upon completion of the temporary-use by the operator, the ignition is turned off and the controller 1304 provides outputs to operate the relays 1324, 1326 to shut the vehicle down. The one-time code is no longer available to permit operation of the vehicle. In addition, at act 1512 the controller operates indicating light 1312 to indicate that the vehicle is inoperative. According to some embodiments, the process 1500 includes act 1514 at which the one-time code is deleted or otherwise rendered unavailable for future use.

In general, one-time codes can be updated (newly added or deleted) by a system administrator.

Figure 16:
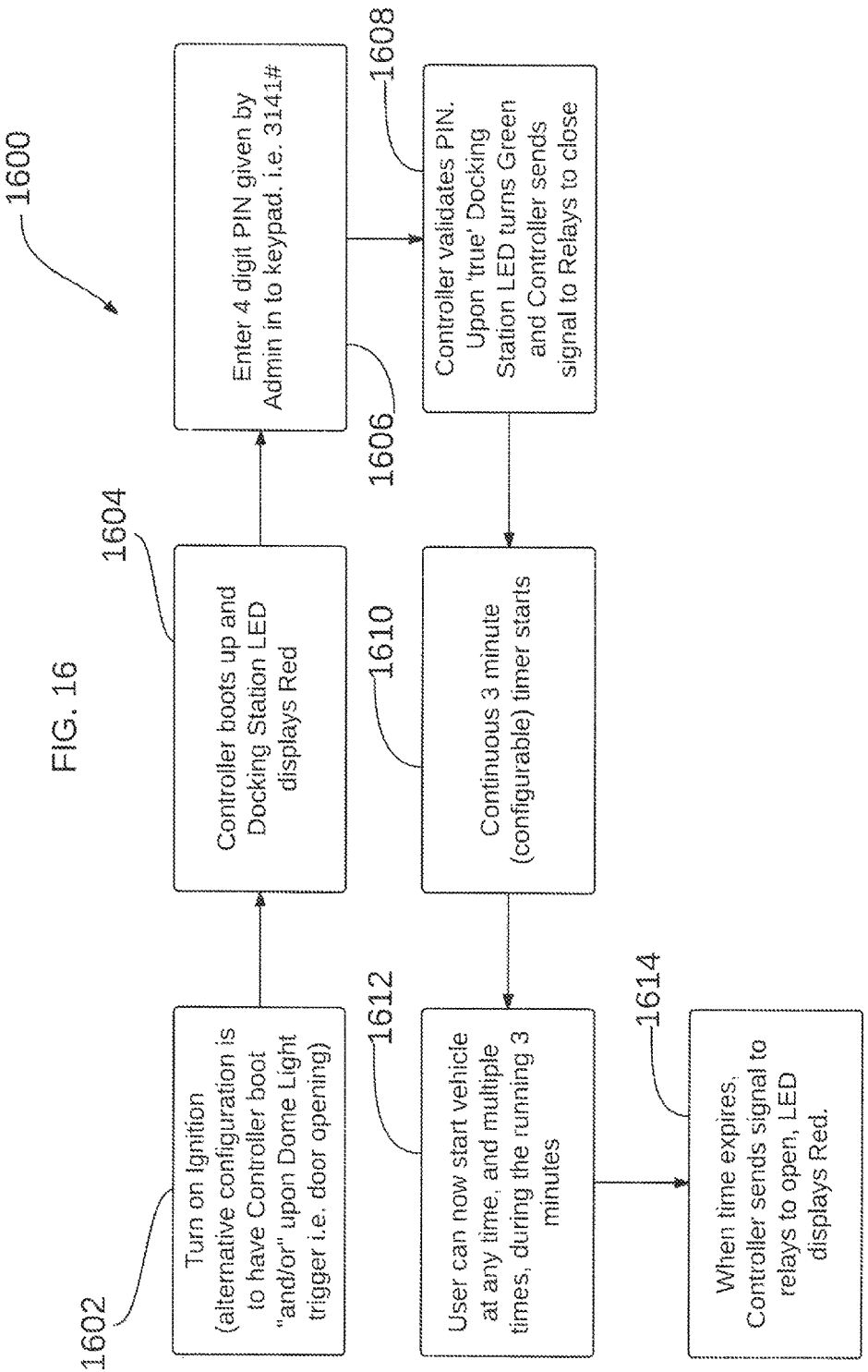
FIG. 16 illustrates a flow diagram of still another operation of the system in accordance with some embodiments.

Further approaches can be used to allow an operator who is not in possession of an authorized mobile device to operate the vehicle on a temporary basis. FIG. 16 illustrates a process 1600 according to some embodiments, for example, a valet-parking or vehicle-service situation. At act 1602 the controller 1304 enters an active mode when it is, for example, awakened by any one of or combination of: insertion of a key into an ignition switch; activation of an ignition circuit for the vehicle; or opening of a door to the vehicle. At act 1604, the controller 1304 enters the active operating state and turns on the indicating light 1312 to indicate that the system is not ready to allow operation of the vehicle. For example, the docking station or other user interface including the system 1300 can display a red LED to indicate to the operator that the vehicle is currently inoperative.

According to the illustrated embodiment, the system 1300 has one or more PIN codes previously established by a system administrator for the valet-parking situation. The controller 1304 is programmed with these codes by, for example, the administrator. In the illustrated embodiment, the operator enters a six digit code into the system 1300 via the user interface 1308, at act 1606. At act 1608, the controller 1304 authenticates the PIN to determine whether it is valid. Where the PIN is successfully authenticated, the controller changes the state of the system 1300 to allow operation of the vehicle. In the illustrated embodiment, successful authentication results in a change in the status of the indicating light 1312 (for example, a change from red to green) and activation of the relays 1324, 1326. At act 1610, a timer begins operation to measure a predetermined period of time established by the system administrator and associated with the authorized PIN entered by the operator. In the illustrated example, the predetermined period of time is 3 minutes.

Where the authentication of the mobile device is unsuccessful the process 1600 returns to act 1604 where the controller is operational and the system awaits entry of a valid PIN. According to one embodiment, the system can limit the number of access attempts following activation of the controller 1604 from the "sleep" mode.

At act in the 1612 the vehicle operator can start the vehicle, at any time within a continuous but temporary period beginning with successful authentication of the PIN. In various embodiments, the allowable operating period is established by a system administrator and can vary with each PIN. In general, the approach illustrated by the process 1600 facilitates a temporary operation of the vehicle by operators who are not in possession of an authorized mobile-device.

In an act 1614, the predetermined period of time expires. In response, the controller 1304 signals the relays 1324, 1326 to open and prevent any further operation of the vehicle. In addition, the controller changes the status of the indicating light 1312 to indicate that the vehicle is not operational. In a further embodiment, the system does not automatically shut down the vehicle after the predetermined period of time. Instead, the system activates an annunciator (which can include indicia such as, for example, an audible sound, flashing lights or a warning light) that operates until the vehicle is shut down. According to this embodiment, the vehicle cannot be restarted thereafter without a new PIN code provided by the administrator.

It will be recognized by the person of ordinary skill in the art, given the benefit of this disclosure, that the processes and methods described with reference to FIGS. 14A-16 are merely illustrative and certain steps may be omitted and other steps may be added. For example, the method may be implemented without the ability to override the system such that coupling of the mobile device to the vehicle is required to operate the vehicle.

The system 1300 can include a variety of administrative capabilities to allow the system administrator to customize the system configuration. Referring to the process 1604 for example, a system administrator can change pin number and/or timer duration. In addition, an administrator can establish a delay that requires a minimum predetermined amount of time between a time the vehicle is turned off during the allowable operating period and the next time that it is started during that same period.

Other available administrative options can include: adding a mobile device to a list of approved mobile devices for the vehicle; removing a mobile device from the list of approved mobile devices for the vehicle; setting the predetermined period of time that the system 1300 will operate in the valet/service mode; establishing the PIN used as the valet/service code; adding to or deleting from the list of approved one-time use passwords; establishing a period of time that must elapse between successful authentication of the one-time use codes; adjusting the operating-period during which the controller remains "awake" following a vehicle being shut down; and various resets that allow a return to one or more factory original settings for the system.

Figure 17:
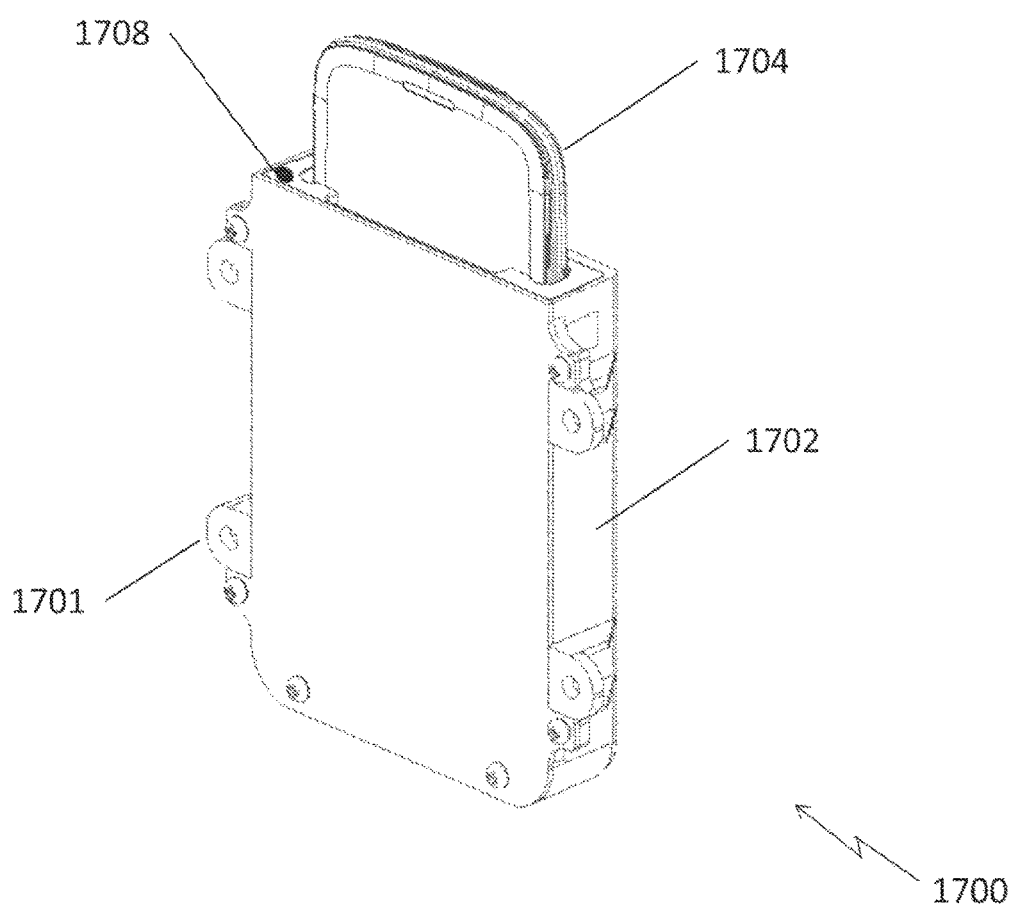
FIG. 17 illustrates a mobile-device docking system accordance with some embodiments.

Referring now to FIG. 17, a docking system 1700 for a mobile device is illustrated in accordance with some embodiments. In the illustrated embodiment, the docking system includes a docking station 1702 and a mobile-device case 1704. The mobile-device case may for example be employed with a mobile phone and is described in more detail herein. In other embodiments, a docking station 1702 is employed with a mobile device and a mobile-device case is not used. In general, in some embodiments, the docking system 1700 provides a receptacle located in a vehicle where the vehicle-operator's mobile device is placed to allow the vehicle to be started and operated. According to these embodiments, the docking system 1700 is used to prevent operation of the vehicle when mobile-device based activities that would otherwise contribute to distracted operation of the vehicle are detected. According to some embodiments, the docking station 1702 includes mounting hardware 1701. According to one embodiment, different style mounting hardware is employed depending on whether the docking station is mounted in a console, on a dash or elsewhere in the vehicle. Further, the docking station can include one or more indicating lights 1708. According to some embodiments, the indicating light(s) 1708 can be used, either alone or in combination with a speaker, as an annunciator to alert the vehicle operator to the system status. For example, the indicating light(s) 1708 can illuminate and/or blink when the mobile device is removed from the docking station 1702 of operating vehicle. If desired, or more lights on the vehicle may blink (for example, a dome light) or be switched on to notify the user that the mobile device has been removed from the docking station 1702.

According to some embodiments, the docking station 1702 renders inaccessible a hands-on user interface included in the mobile device. For example, the docking station can prevent access to a physical keypad, touch pad or touch-screen graphical user interface when the mobile device is received in the docking station. According to these embodiments, however, a wireless communication user interface of the mobile device is operational with the mobile device received in the docking station 1702. For example, a user operating vehicle may be able to use the mobile device in a hands-free manner with the mobile device received in the docking station 1702, for example, via Bluetooth™ communication using a headset or microphone mounted in the cab of the vehicle.

Figure 18:
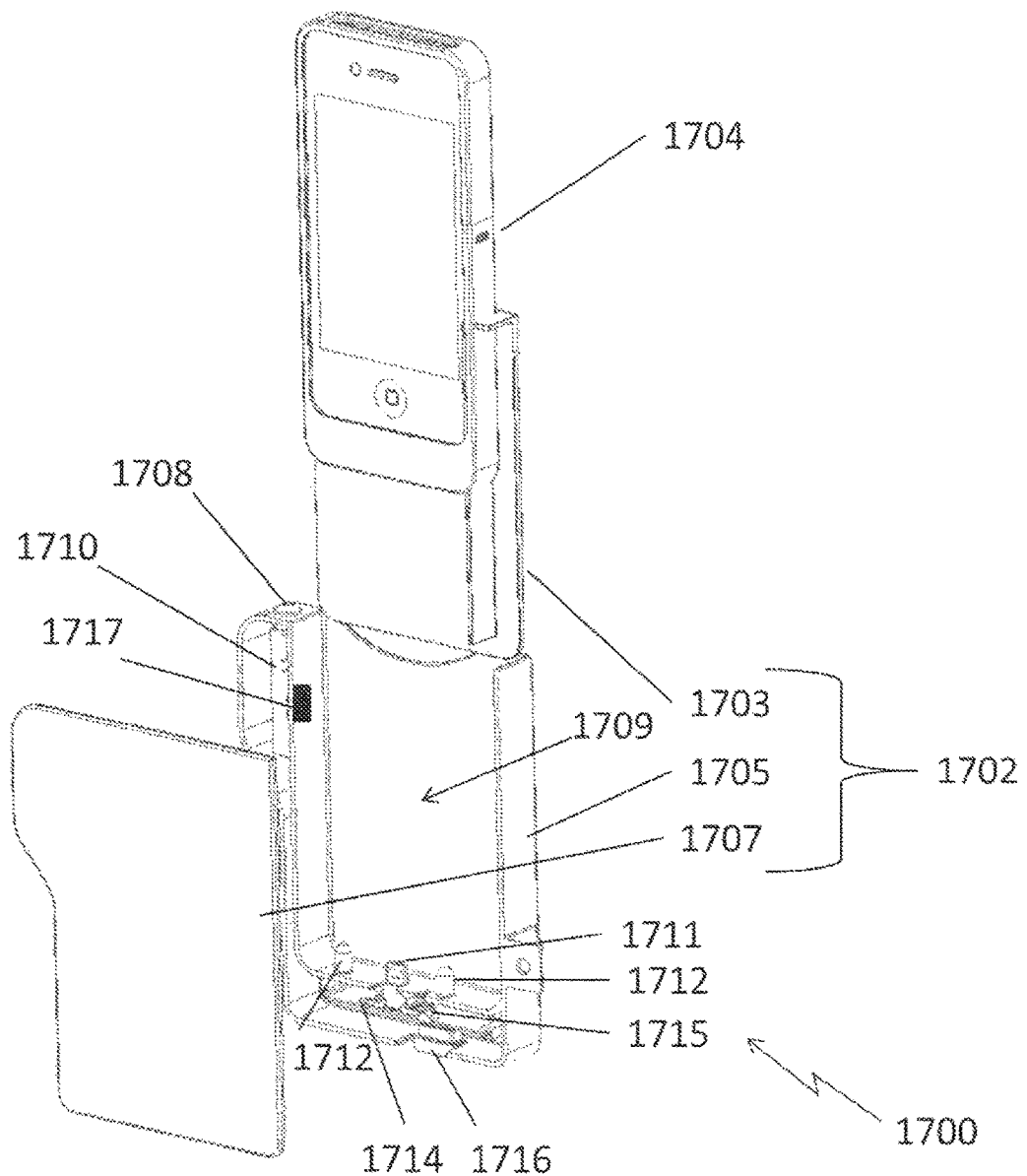
FIG. 18 illustrates an exploded of the mobile-device docking system of FIG. 17.

FIG. 18 illustrates an exploded view of the docking system 1700 in accordance with some embodiments. In the illustrated embodiment the docking station 1702 includes a sleeve 1703, abuse 1705 and a wall 1707. The docking station 1702 also includes a first circuit board 1710, at least one alignment element, a second circuit board 1714, a first connector 11711, a second connector 1716, a lamp 1715 and a sensor 1717. In one embodiment, the first circuit board 1710 and the second circuit board 1714 are connected to one another using a ribbon cable.

According to various embodiments, the docking station 1702 provides a receptacle 1709 in which the mobile device is inserted. In the illustrated embodiment, the wall 1707 attaches to the base 1705 to form the receptacle 1709 within which the mobile device 1302 (enclosed in the mobile-device case 1704) is inserted in a linear sliding motion. In the illustrated embodiment, the sleeve 1703 is used to provide some amount of adjustment for the width of the receptacle.

The docking station 1702 also houses a portion of electronics included in the system 1300. In the illustrated embodiment, electronics are housed in the base 1705 and the first circuit board 1710 is connected to the indicating light 1708. An annunciator (for example, the annunciator 1314) may also be connected to the first circuit board 1710. The second circuit board 1714 is connected to the lamp 1715. Further, the indicating light 1708, annunciator, lamp 1715 and sensor 1717 can be mounted (for example, surface mounted, through-hole mounted, etc.) to their respective circuit boards 1710, 1714. According to a further embodiment, the docking station. 1702 only includes a single circuit board housed in the base 1705.

The sensor 1717 can be provided in a variety of configurations depending on the embodiment. For example, the sensors 1717 can be mechanically-activated limit switches, optical sensors, magnetically-operated proximity switches or another style sensor provided that sensor changes state when the mobile device is fully received within the docking station 1702. In the illustrated embodiment, a limit switch is used and the switch is depressed when the mobile device enclosed in the case 1704 is fully inserted within the receptacle 1709. According to one embodiment. A plurality of sensors 1717 can be employed to detect the presence of the mobile device 1302 in the receptacle 1709.

In various embodiments, the first connector 1711 (for example, a mini-USB) provides the electrical connection for connection of the mobile device 1302 to the docking station 1702. In some embodiments, the mobile device 1302 is plugged directly into the docking station 1702 to complete a hardwired connection between the mobile device 1302 and the docking station 1702. However, in the illustrated embodiment, the mobile device 1302 is inserted in the mobile-device case 1704 where a hardwired connection is completed between a connector included in the mobile device 1302 a connector included in the mobile-device case 1704. Further in the illustrated embodiment, the first connector 1711 completes a hardwired connection with the connector included in the mobile-device case 1704 when the mobile-device case is fully inserted within the docking station 1702. According to one embodiment, the first connector 1711 is limited to a USB connection. Alternate communication buses can be provided for the hardwired connection between the docking station 1702 and the mobile device 1302 in alternate embodiments.

According to some embodiments, the receptacle 1709 is configured for a selected mobile phone including a case (for example, an Apple iPhone, a Samsung Galaxy 3 or other phone) and corresponding case. According to this embodiment, a mobile phone other than the selected mobile phone may desirably interface with the system through the use of the sleeve 1703 for the sleeve helps properly align the other mobile phone in the receptacle 1709. Accordingly, the docking system 1700 provide universal receptacle for a wide range of phones. The type and style of case can be determined by the designer depending on the embodiment. In accordance with one embodiment, the selected phone is a Samsung Galaxy 3 with a mil spec cover from Casemate. In further embodiments, the preceding approach can also be employed with other devices such that the docking system 1700 is configured for a plurality of tablet computers or other mobile devices with or without sleeve 1703 depending on the embodiment.

The connector 1716 can be mounted to the second circuit board 1714 to provide a hardwired connection between the docking station 1702 and the controller 1304. In some embodiments the connector 1716 provides a hardwired connection between the docking station and other system elements.

The at least one alignment element 1712 can be employed to, for example, "polarize" a receptacle provided by the docking station to prevent a mobile device 1302 from being inserted incorrectly. According to one embodiment, the docking station 1306 includes two pins used as alignment elements 1712 where the two pins have different diameters. According to this embodiment, the mobile device or a case within which the mobile device is housed includes corresponding openings that ensure that the phone can only be fully-inserted in the docking station 1306 in a single orientation. According to a further embodiment, the at least one alignment element 1309 insurers that a hardwired connection between the mobile device and the controller is correctly completed by preventing the mobile device 1302 from being rotated about its longitudinal axis such that it faces the wrong direction.

Figure 19:
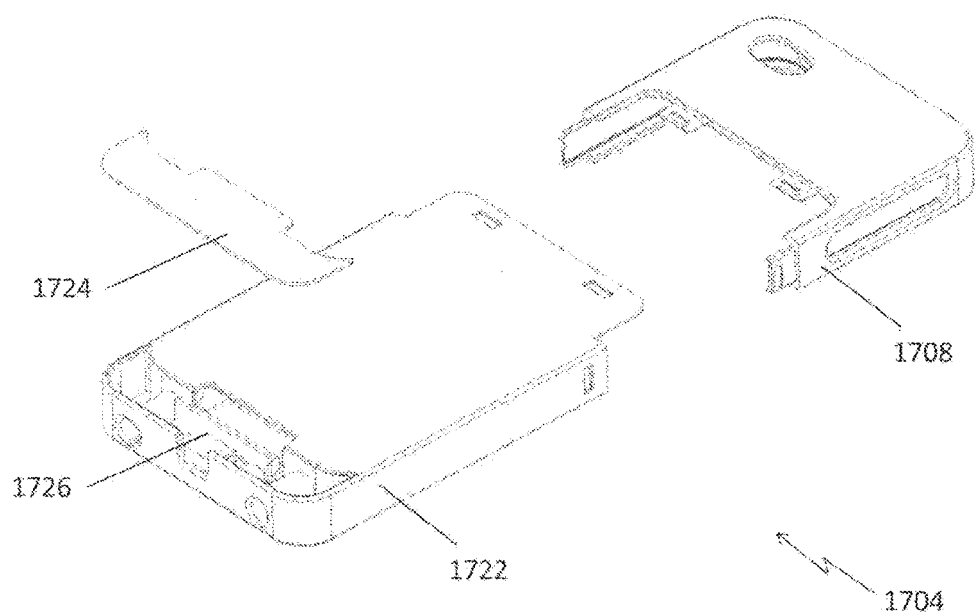
FIG. 19 illustrates an exploded view of a mobile-device case in accordance with some embodiments.

Referring now to FIG. 19, the mobile-device case 1704 is illustrated in accordance with one embodiment. In general, the mobile-device case 1704 is an adapter that converts the hardwired electrical connection provided by the mobile device to a hardwired electrical connection suitable for connection with the connector included in the docking station 1702. In the illustrated embodiment, the mobile-device case 1704 including an uppercase 1720, a lowercase 1722, a rear panel 1724 and a connector 1726. Depending on the embodiment, the mobile-device case 1704 can be configured for a variety of mobile devices to provide a universal hardwired electrical connection for connection of the mobile device to the docking station 1702. In the illustrated embodiment, the mobile-device case 1704 is configured for use with a mobile phone. Therefore, the connector 1726 provides a hardwired connection between a connector included with the mobile phone and the first connector 1711 included in the docking station. The rear panel 1724 can be provided to allow access to the connector 1726 during any of manufacturing, assembly and testing.

In the illustrated embodiment, the mobile phone inserted in the lowercase 1722. The uppercase 1720 and then attached to the lowercase and the upper half of the phone. According to some embodiments, the display screen of the mobile device 1302 is not viewable when the mobile device is received by the docking station 1702.

Figure 20:
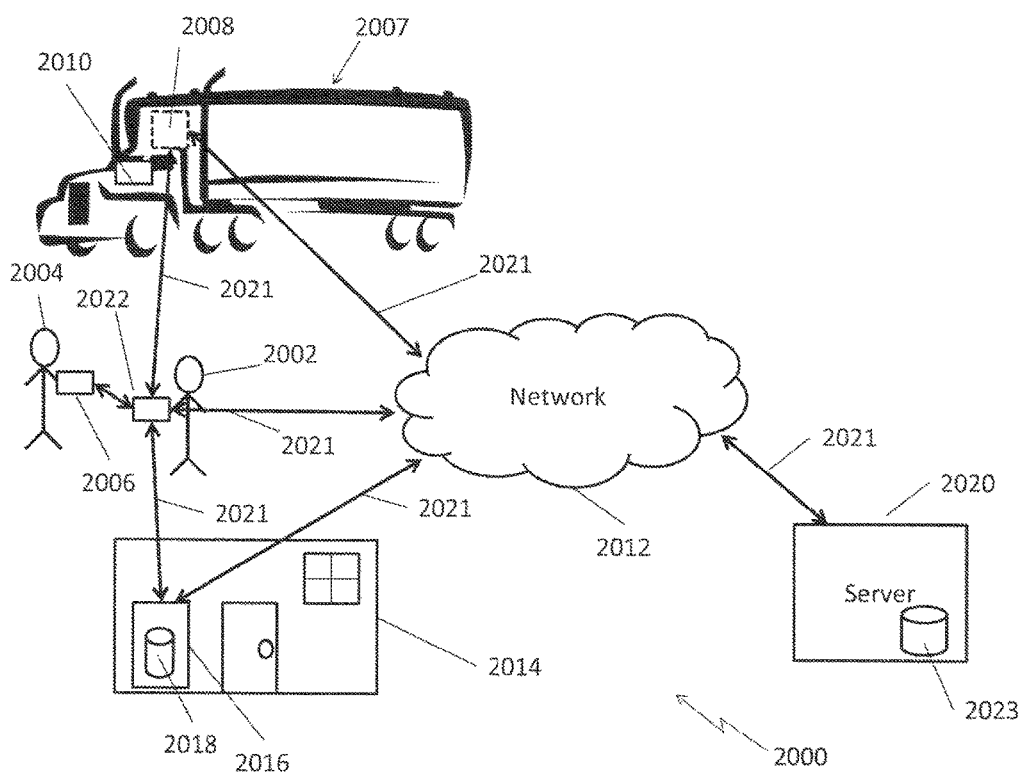
FIG. 20 illustrates a system in accordance with a further embodiment and FIG. 21 illustrates a process in accordance with one embodiment.

Referring now to FIG. 20, a system 2000 is illustrated in accordance with further embodiments. In some embodiments, the system 2000 is employed to limit, reduce or entirely prevent operation of a vehicle when mobile-device based activities that would otherwise contribute to distracted operation of the vehicle are detected. In accordance with one embodiment, the system 2000 is employed in managing a plurality of fleet vehicles to reduce or prevent distracted driving caused by mobile-phone use of the operators of the fleet vehicles.

In the illustrated embodiment, the system 2000 includes an administrative user 2002, a vehicle operator 2004, a mobile device 2006 that is associated with the vehicle operator, at least one vehicle 2007, an on-board vehicle system 2008, a vehicle identifier 2010, a network 2012, a local administrative center 2014, a local system 2016 including data storage 2018, and a remote system 2020 also including data storage 2023. In various embodiments, the elements of the system 2000 can communicate with one another over the network 2012 via one or more communication interfaces 2021.

According to some embodiments, the on-board vehicle system 2008 includes any or a combination of the controller 1304, memory 1316, docking station 1306 and the system elements illustrated as being included therein, user interface 1308, wireless system 1310, unswitched input 1320, switched input 1322, and relays 1324, 1326, for example, as originally described with reference to the system 1300 illustrated in FIG. 13. Accordingly, the on-board vehicle system 2008 can be employed as described with reference to the system 1300 and the embodiments illustrated in FIGS. 13-19.

Embodiments of the system 2000 can be employed for a single end-user with one or multiple vehicles and/or multiple operators under their administration. The system can also be employed for one or a fleet of commercial vehicles, for example, a fleet of delivery or other transport vehicles. Further, the system 2000 can be employed with any type of vehicle depending on the embodiment. Accordingly, it should be apparent to one of ordinary skill in the art with benefit of this description that the system 2000 is not limited to use solely with commercial fleets or solely where multiple vehicles are under common administrative control. For example, the administrative user 2002 may also be a vehicle operator of the vehicle 2007. Further, the administrative user 2002 may be the only vehicle operator of the vehicle 2007.

The system 2000 can also include, or be configured to work with, operate with, or be programmed by, an administrative mobile device 2022, for example, a tablet computer (for example, an iPad device), mobile phone or other portable computing device. The administrative mobile device 2022 includes configuration capabilities to allow the administrative user 2002 to program the onboard system 2008 with configuration information to: 1) add and remove operators and their associated mobile devices from the list of authorized users of the at least one vehicle 2007; 2) adjust predetermined time limits associated with any of one-time codes, temporary operating periods, etc.; 3) adjust override settings; 4) establish and set one-time codes; 5) manage memory (for example, memory 1316); 6) clear an event log and 7) interface with the vehicle ECU. According to some embodiments, the administrative mobile device 2022 wirelessly communicates with the on-board vehicle system 2008, for example, via Bluetooth™.

In some embodiments, the system includes the local administrative center 2014 that can house the local system 2016 and data storage 2018. Where the system includes multiple users and/or multiple vehicles (for example, at a distribution center) the local system 2016 can store the configuration information listed in the immediately preceding paragraph for one or a plurality of vehicles 2007 and one or a plurality of vehicle operators 2004. This configuration information for multiple vehicles and/or users can be stored in a database provided in the data storage 2018 from which it can be communicated to administrative user device 2022 of the administrative users 2002. According to one embodiment, a hardwired interface is employed communicate data between the local system 2016 and the administrative user device 2022. In another embodiment, a wireless communication interface is employed to communicate data between the local system 2016 and the administrative user device 2022.

In general, the network 2012 can include local-area networks (LANs), wide area networks (WANs) and may include the Internet. According to a further embodiment, the network 2012 provides access "over-the-cloud" to one or more remote locations 2020 where further configuration information can be stored. According to one embodiment, the local system 2016 periodically synchronizes with servers at the remote location 2020. According to this embodiment, the remote location 2020 provides redundant storage and storage element 2023 for the local system 2016 in the event that the local system is corrupted. In addition, the network 2012 and communication interfaces 2021 allow the system 2002 "push" software updates and/or updated lists of authorized users, and updated system configurations that can be used by an administrative user 2002 to configure the on-board vehicle system(s) 2008 in the vehicle(s) 2007. According to one embodiment, a local system 2016 is not employed however the remote system 2020 is employed. In another embodiment, the remote system 2020 is not employed. In yet another embodiment, neither the local system 2016 nor the remote system 2020 are employed and configuration information is managed and stored solely on the administrative mobile device 2022.

In further embodiments, the administrative mobile device 2022 wirelessly communicates with either or both of the local system 2016 and/or the remote system 2020 and network 2021. In general, the administrative mobile device 2022 is employed using a wireless or a hardwired communication interface 2021 to configure the on-board vehicle system 2008 for one or more authorized mobile devices and associated operators 2004. For example, the controller 1304 included in the on-board vehicle system 2008 can store one or a plurality of lookup tables concerning the configuration information stored in the memory 1316. The lookup tables can include a vehicle-operator identification, associated mobile-device ID or IDs and other configuration information concerning the authorized user (for example, the vehicle operator 2004). Further, the lookup tables can include similar configuration information for a plurality of authorized users.

In some embodiments, the vehicle identifier 2010 is employed to allow an electronic identification of the vehicle 2007 by the administrative user 2002. According to one embodiment, the vehicle identifier 2010 is a barcode or other similar identification device that can be optically scanned. Further, where the administrative user 2002 employs a tablet computer or other mobile device with a barcode reader, the configuration information and settings for a specific vehicle 2007 can be more easily established and catalogued in the field. According to one embodiment, the administrative mobile device 2022 is employed to first identify the vehicle 2007 and then "push" updated configuration settings for the vehicle to the on-board vehicle systems 2008. According to one embodiment, these configuration settings are stored in the administrative mobile device 2022.

In one example, the administrative user 2002 administers a fleet of vehicles and the vehicle operator 2004 is scheduled to leave the transportation depot with the vehicle 2007. In this example, the administrative user 2002 can receive the configuration information for the vehicle operator 2004 and the vehicle operator's associated mobile device 2006 from the local system 2016 or via direct entry into the administrative mobile device 2022, for example, using a touchscreen or other user interface. Using a scanning feature available in the administrative user device 2022 (a barcode and/or IR scanner), the administrative user 2002 scans in the vehicle identification and associates the vehicle operator 2004 and mobile device 2006 with the vehicle 2007. According to another embodiment, the administrative user device identifies the vehicle using near field communication. The administrator user 2002 then employs the administrative user device 2022 to load/program the on-board vehicle system 2008 with the updated configuration including the operator 2004 and mobile device 2006.

Figure 21:
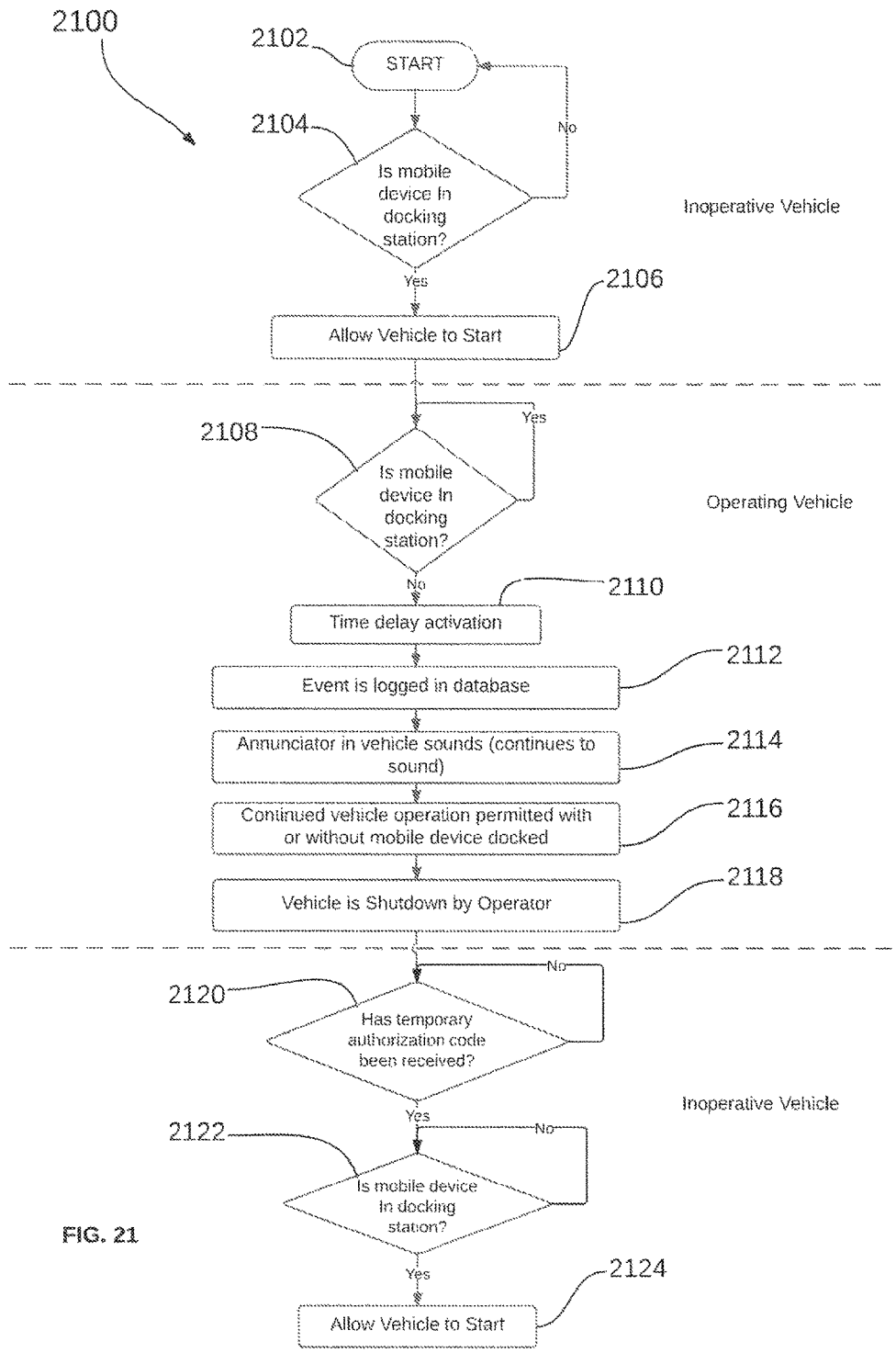

Referring now FIG. 21, operation of a process 2100 for use with a system to control use of a mobile device in a vehicle is described in accordance with various embodiments, for example, the system 1300 and the system 2000. The process 2100 starts at act 2102, for example, when a key is inserted in a vehicle ignition and/or moved to a vehicle start position. In embodiments where vehicle starting employs an element other than a key (for example, the pressing of a button in an electric vehicle) act 2102 begins when the activation of the button or other start mechanism is detected by the system controller (for example, the controller 1304).

At act 2104, the process determines whether the docking station (for example, the docking station 1306) is in receipt of the mobile device (for example, mobile device 1302, 2006). In accordance with various embodiments, the presence of the mobile device in the docking station is detected using one or more sensors in the docking station (any of limit switches, magnetic switches, optical sensors, etc.), the receipt of an electrical signal from the mobile device, or the detection of current being drawn by the mobile device (for example, charging current). The preceding approaches can be used alone, in combination with one another or in combination with other forms of detection depending on the embodiment.

Where the presence of the mobile device in the docking station is not detected, the vehicle cannot be started and the process returns to the start 2102. Where the presence of the mobile device in the docking station is detected, the process 2100 moves to act 2106 where the vehicle operator is permitted to start the vehicle.

At act 2108, the continued presence of the mobile device in the docking station is monitored while the vehicle is operational. Depending on the embodiment, where the presence of the mobile device is detected, the process 2100 continues to repeat act 2108 either periodically or on a continuous basis while the vehicle is operating.

When the presence of the mobile device is no longer detected in the docking station the process moves to acts 2112 and 2114 either directly or following an optional time delay at act 2110. At act 2112, the removal of the mobile device from the docking station is recorded as an event (for example, in either or both of the memory of the controller and remote storage such as the storage 2018 or other database accessed via the "cloud"). In some embodiments, the event can also be recorded in memory included in the mobile device.

At act 2114, an annunciator or other alarm device (for example, a blinking lamp) activates to alert the vehicle operator that the removal-event has occurred. In addition, where an annunciator is used the decibel level of the alarm can serve as motivation to the vehicle operator (or any other occupant) to return the mobile device to the docking station. Where act 2110 is included in the process 2100, the time delay activation can be used to permit a temporary (for example, inadvertent) removal of the mobile device from the docking station without either or both of recording an event (act 2112) or activating an annunciator (act 2114). In accordance with these embodiments, the delay is only temporary and the events in annunciator activation do occur if the mobile device is not returned to the docking station within a predetermined period of time.

At act 2116, a continued operation of the vehicle is permitted regardless of whether the mobile device is returned to the docking station. According to this embodiment, the continued operation can allow the operator to complete an immediate trip.

At act 2118, the vehicle was shut down by the operator, for example, at the end of their current trip. In accordance with further embodiments, the logging of an event at act 2112 places the system in a state that prevents further vehicle operation once the vehicle is shut down following the event. According to this embodiment, the system (for example, the controller 1304) must receive an input in the form of either a temporary-use code or a clearing/acknowledgment by a system administrator of the event before the vehicle can be operated again.

Thus, at act 2120, the process 2000 continues when the operator tries to restart the vehicle and the system determines whether a temporary authorization code has been received, or alternatively, whether the events has been cleared and/or acknowledged by an administrator. Where the required input or acknowledgment are not received the process 2000 repeats act 2120. According to these embodiments, the operator is unable to start the vehicle unless act 2120 is successfully completed. In some embodiments, the operator can contact a system administrator to receive a one-time code that when entered into the onboard system, for example, via a keypad included in the docking station, allows the vehicle to be restarted and returned for a single trip.

Provided that act 2120 is successfully completed, the process 2000 moves to act 2122 where it is determined whether the mobile device is received in the docking station. In the illustrated embodiment, the act 2122 is repeated and the vehicle cannot be started, even following a successful completion of act 2120, unless the mobile device is also received in the docking station. The process continues at act 2124 where the vehicle can be started by the operator following a successful completion of acts 2120 and 2122. According to one embodiment, act 2122 is not included and the vehicle can be started at act 21124 following act 2120.

Variations of the process 2100 can include the addition of one or more acts, the removal of one or more acts or a combination of the preceding. Further, the sequence of the acts can be modified in some embodiments.

Figure 22:
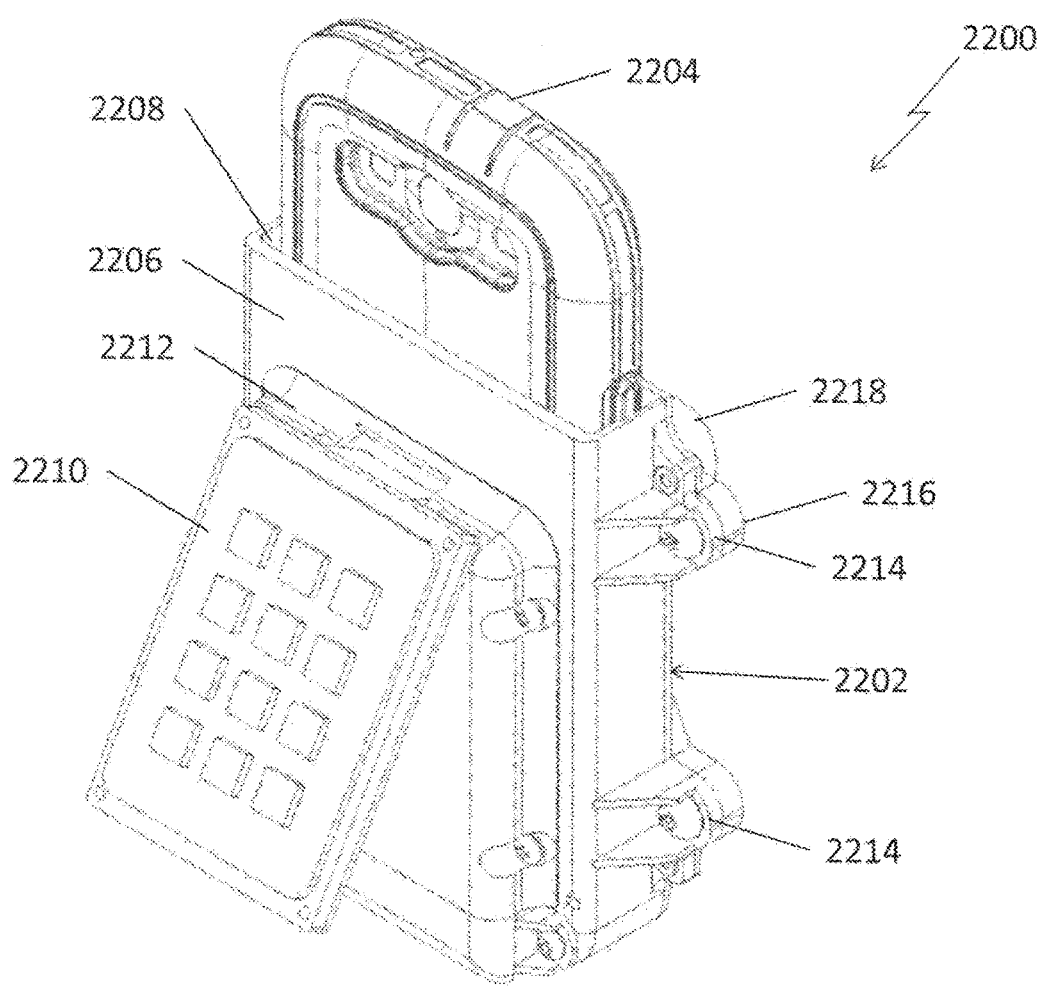
FIG. 22 illustrates an isometric view of a mobile-device docking system, in accordance with some embodiment.

Referring now to FIG. 22, a docking system 2200 for a mobile device 2204 is illustrated in accordance with some embodiments. In the illustrated embodiment, the docking system includes a docking station 2202 to receive the mobile device 2204. In general, the docking system 2200 provides a receptacle located in the vehicle where the vehicle-operator's mobile device is placed to allow vehicle operation. According to some embodiments, the system 2200 is set up to prevent the vehicle from being started unless the operator's mobile device 2204 is received by the docking station 2202. In other embodiments, the system 2200 allows the vehicle to be started without the operator's mobile device 2204 received by the docking station 2202 but prevents the vehicle from being placed in gear until the mobile device 2204 is received by the docking station 2202.

In one embodiment, the docking station 2202 includes a housing 2206 that includes a receptacle 2208. The docking station also includes a user interface 2210. In the illustrated embodiment, the user interface 2210 includes a keypad with a set of pushbuttons, for example, a keypad similar to the keypad of a telephone or a QWERTY keyboard. According to other embodiments, the docking station includes a display and the user interface 2210 is presented in a graphical user interface rendered in the display. According to these embodiments, the user interface 2210 is operated via a touchscreen display and/or a mouse or trackball to guide a cursor for selecting icons presented in the display. In one embodiment, a touch keypad is presented in the display. Where the docking station 2202 includes a display, the display can include OLED technology, LCD technology, light emitting polymer display technology or other display technology suitable for presenting information to a user in a visual format.

According to one embodiment, the user interface 2212 is attached to the housing 2206 via a pivoting connection 2212 (for example, a hinge). This can allow the vehicle operator to more easily access the user interface with the docking station 2202 mounted in the vehicle by providing a range of motion by which the vehicle operator can adjust the orientation of the display relative to the remainder of the docking station 2202.

Depending on the embodiment, the docking station 2202 can be mounted in the vehicle using any of a variety of approaches. According to one embodiment, the docking station 2202 includes mounting hardware 2214 to allow the docking station to be attached to a surface in the vehicle using one or more fasteners, for example, mounted within arm's reach of the vehicle operator. According to another embodiment, the mounting hardware 2214 is attached to an adapter 2216 that allows the docking station 2202 to be attached to another mount 2218, for example, a RAM Mount®. According to these embodiments, the manner in which the clocking station 2202 is mounted in the vehicle can further increase the range of motion and adjustability of the docking station for the convenience of the vehicle operator.

According to some embodiments, the mobile device 2004 is housed in a case before being inserted in the receptacle 2208 while in other embodiments a case is not employed. In still further embodiments, the docking station 2002 may include a sleeve or adapter placed in the receptacle 2208 to modify the dimensions for receipt of the mobile device 2004.

Figure 23:
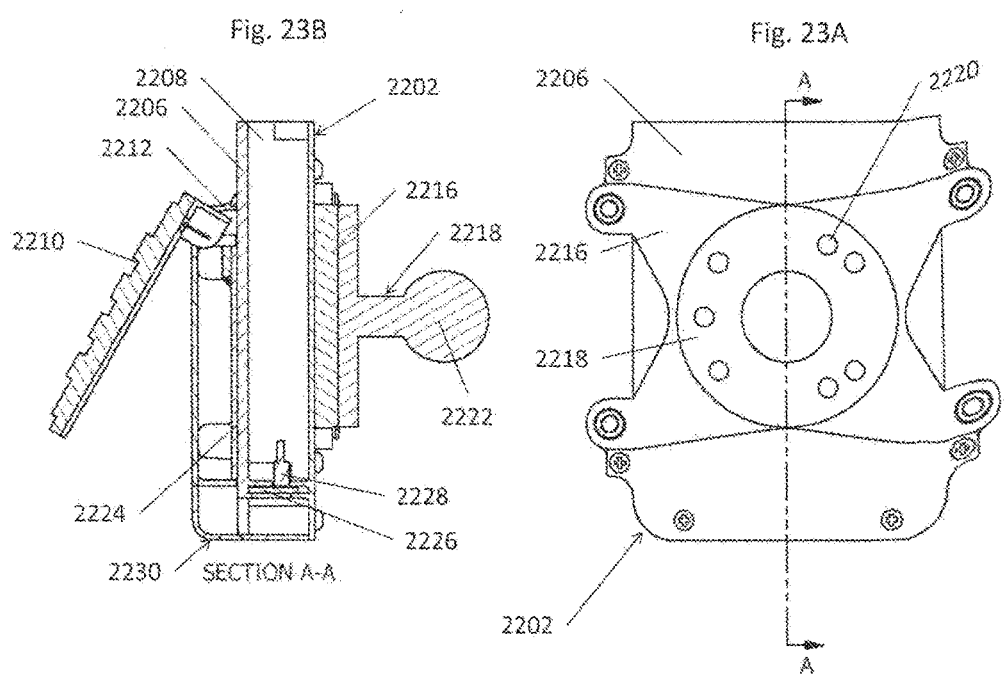
FIG. 23A illustrates a plan view of the mobile-device docking system illustrated in FIG. 22.
FIG. 23B illustrates a cross sectional view of the mobile-device docking system illustrated in FIG. 23A.

Referring now to FIG. 23A, a plan view of the docking station 2202 is illustrated from a side opposite the user interface. The illustrated embodiment includes the adapter 2216 attached to the housing 2206 using fasteners to attach the adapter to the housing via the mounting hardware 2214 illustrated in FIG. 22A. According to one embodiment, the mount 2218 is attached to the adapter 2216 via fasteners 2220.

FIG. 23B illustrates a cross-sectional view of the docking station 2202. According to this embodiment, the user interface 2210 is attached to the housing 2206 via the pivoting connection 2212 and the mount 2218 is attached to the housing 2206 via the adapter 2216 on a side opposite the user interface 2210. In the illustrated embodiment, the mount 2218 includes a ball 2222 for attachment to a second portion of the mount (not illustrated) to complete a ball and socket connection between the mount 2218 and the second portion of the mount. In these embodiments, the ball and socket connection provides increased convenience to the vehicle operator because it provides a wide range of motion through which the docking station 2202 can be moved.

The cross-sectional view also illustrates a first circuit board 2224, a second circuit board 2226 and a mobile-device connector 2228 (for example, a USB connector, a mini USB connector, an Apple® 30 pin connector, a 10 pin Lightning® connector, etc.). According to one embodiment, the first circuit board 2224 includes the controller and the memory, for example, the controller 1304 and the memory 1316, respectively, illustrated in FIG. 13. In the illustrated embodiment, the second circuit board 2226 provides the electrical connection for the mobile-device connector 2228. Further, each of the user interface 2210 and the second circuit board 2226 can be connected to the first circuit board via electrical wiring, for example, via separate ribbon cables. Either or both of the first circuit board 2224 and the second circuit board 2226 can be electrically connected to other elements of a system (for example, the system 1300). According to one embodiment, the first circuit board 2224 is electrically connected to various input and output circuits, for example: a remote speaker, indicating lamp or other annunciator; the vehicle electronic control unit; vehicle ignition/start circuitry; vehicle power; or other electrical/electronic I/O.

According to some embodiments, alignment hardware is located within the receptacle 2208 to improve the ease with which the connection between the mobile-device connector 2228 in the mobile device is completed. According to one embodiment, a guide (for example, a sloped surface extending upward from the base of the receptacle 2208) is located on either side of the mobile-device connector 2228 to align the mobile-device connector 2228 with a corresponding connector included in the mobile device.

According to one embodiment, the bottom of the receptacle 2208 includes one or more drain tubes designed to remove any fluid that is accidentally spilled into the receptacle 2208. The drain tubes can be configured to route any such fluid from the receptacle 2208 out a bottom surface 2230 to avoid fluid contact with any of the electronics included in the docking station 2202.

Although the docking station 2202 illustrated in FIG. 22 includes a receptacle, other embodiments can receive a mobile device in a manner different than that illustrated in FIG. 22. In one embodiment, the docking station includes a faceplate and is constructed such that mobile device can only be received in the docking station in an orientation in which the hands-on user interface of the mobile-device is blocked from access/view with the mobile device received by the docking station. For example, alignment features can be included in the docking station as previously described with reference to FIG. 18.

Further, although a mobile phone 2204 is illustrated in FIG. 22 the docking station 2202 can be configured to receive other types of mobile devices such as a tablet computer (for example, an iPad), mobile phone or other portable computing device. According to these embodiments, the hands-on user interface is rendered inaccessible with the mobile device received by the docking station.

The apparatus, system and method described herein can each be employed in all manner of vehicles where distracted vehicle-operation can otherwise be a problem. For example, the apparatus, systems and methods described herein can be used to facilitate safe operation of a public transit vehicle including buses, trolleys, subways and trains. Where the public transit vehicle includes a drive vehicle for additional vehicles coupled with it (for example, a locomotive), the operation of the drive vehicle can be controlled with the apparatus, system and method described herein. The apparatus, system and method described herein can also be employed with passenger vehicles (public or privately owned) and commercial vehicles including trucks and planes.

In certain embodiments, the devices, systems and methods described herein may include, or be used with, at least one processor optionally electrically coupled to one or more memory units. In certain examples, the module may be a larger part of a computer system, e.g., part of the ECU of the vehicle, whereas in other examples, the module may be a stand alone module and include its own processor. The computer system may be, for example, a general-purpose computer such as those based on Unix, Intel PENTIUM-type processor, Motorola PowerPC, Sun UltraSPARC, Hewlett-Packard PA-RISC processors, or any other type of processor. In some examples, the processor may be an inexpensive processor that may be programmable to receive inputs from an administrator to configure the system as desired. It should be appreciated that one or more of any type computer system may be used according to various embodiments of the technology. Further, the system may be located on a single computer or may be distributed among a plurality of computers attached by a communications network. A general-purpose computer system may be configured, for example, to perform any of the described functions including but not limited to: vehicle override, override time out, speed limiter, and the like. It should be appreciated that the system may perform other functions, including network communication, and the technology is not limited to having any particular function or set of functions. It is desirable that the system permit remote access to allow an administrator to configure the system on the fly.

For example, various aspects may be implemented as specialized software executing in a general-purpose computer system. The computer system may include a processor connected to one or more memory units, such as a disk drive, memory, or other device for storing data. The memory unit is typically used for storing programs and data during operation of the device. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between system components of the system. The interconnection device typically is electrically coupled to the processor such that electrical signals may be provided to control operation of the vehicle.

The computer system may also include one or more input devices, for example, a keyboard, mouse, trackball, microphone, touch screen, touch pad, manual switch (e.g., override switch) and one or more output devices, for example, a printing device, display screen, speaker, etc. In addition, the computer system may contain one or more interfaces (not shown) that connect computer system 800 to a communication network in addition or as an alternative to the interconnection device.

The storage system typically includes a computer readable and writeable nonvolatile recording medium in which signals are stored that define a program to be executed by the processor or information stored on or in the medium to be processed by the program. For example, the SIM card identifiers, user-specified parameters, time out periods, override parameters and the like used in certain embodiments disclosed herein may be stored on the medium. The medium may, for example, be a disk or flash memory. Typically, in operation, the processor causes data to be read from the nonvolatile recording medium into another memory that allows for faster access to the information by the processor than does the medium. This memory is typically a volatile, random access memory such as a dynamic random access memory (DRAM) or static memory (SRAM). It may be located in the storage system or in memory system, for example. The processor generally manipulates the data within the integrated circuit memory and then copies the data to the medium after processing is completed. A variety of mechanisms are known for managing data movement between the medium and the integrated circuit memory element, and the technology is not limited thereto. The technology is also not limited to a particular memory system or storage system.

In certain examples, the computer system may also include specially-programmed, special-purpose hardware, for example, an application-specific integrated circuit (ASIC). Aspects of the technology may be implemented in software, hardware or firmware, or any combination thereof. Further, such methods, acts, systems, system elements and components thereof may be implemented as part of the computer system described above or as an independent component that can be added to the vehicle, e.g., either through software upload or by using a separate module that is added to the vehicle's electrical system.

Although a computer system is described by way of example as one type of computer system upon which various aspects of the technology may be practiced, it should be appreciated that aspects are not limited to being implemented on any particular type of computer system. Various aspects may be practiced on one or more computers having a different architecture or components than that described herein. The computer system may be a general-purpose computer system that is programmable using a high-level computer programming language. The computer system may be also implemented using specially programmed, special purpose hardware. In the computer system, the processor is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME), Windows XP or Windows Vista operating systems available from the Microsoft Corporation, MAC OS System X operating system available from Apple Computer, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a computer platform for which application programs in high-level programming languages may be written. For example, the technology described herein may be tunable or controllable by an administrator where the administrator can add vehicle specific functions based on their needs or desires. It should be understood that the technology is not limited to a particular computer system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate computer systems could also be used.

In certain examples, the hardware or software can be configured to implement cognitive architecture, neural networks or other suitable implementations. For example, a remote operator database may be linked to the system to permit operation of the vehicle by those users specified in the operator database. Such configuration provides for operation of the vehicle by many different users as specified off-site. One or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. In some examples, the module in the vehicle may function as a client computer and a remote server may be present at an administrator site and can be configured to send commands to the client computer. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP), Bluetooth, etc. It should also be appreciated that the technology is not limited to executing on any particular system or group of systems. Also, it should be appreciated that the technology is not limited to any particular distributed architecture, network, or communication protocol.

In some examples, various embodiments may be programmed using an object-oriented programming language, such as SmallTalk, Basic, Java, C++, Ada, or (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof.

In certain instances, the devices described herein may also comprise one or more sniffing functionalities. For example, a controller/processor can be present and used to determine if one or more mobile devices are present inside the vehicle. Detection of authorized and unauthorized mobile devices can be performed. An administrator can add/remove detected devices to an authorized list to permit operation of the vehicle.

Figure 24:
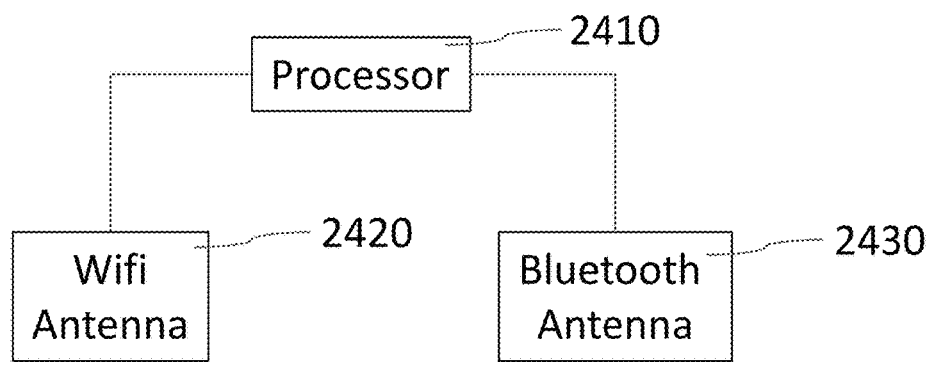
FIGS. 24 and 25 show various block diagrams of components in a sniffing system, in accordance with certain examples.

In some configurations, the sniffer may comprise one or more of a Bluetooth antenna (1 or 2 or more), a Wifi antenna (1 or 2 or more) e.g., an antenna which can detect a wireless network signal, a processor, a memory unit, a cellular chip or cellular device, a GPS chip or device, an accelerometer or other suitable components. In some instances, the components may be integrated into a controller or control box which can be coupled to an OBDII port, CAN bus of the vehicle or other communications systems present in the vehicle. In other instances, the sniffing device can be integrated into the ECU of the vehicle or may be configured to replace the existing ECU of the vehicle with an ECU comprising sniffing functionality. One configuration of a sniffer device is shown in FIG. 24. The device 2400 comprises a processor 2410 electrically coupled to each of a Wifi antenna 2420 and a Bluetooth antenna 2430. The processor 2410 is typically electrically coupled to the vehicle ECU (not shown) to determine when the vehicle is in motion. For example, the processor 2410 can monitor signals from the vehicle speed sensor (VSS) to determine if the vehicle is in motion or not. When the vehicle is not in motion, the processor 2410 can permit usage of a mobile device in the vehicle without triggering an alert or fault. When the vehicle is in motion, the processor can trigger an alert or fault about usage of the mobile device. This alert can be sent remotely to an administrator or may be displayed in the vehicle or cause an audible noise in the vehicle.

In certain instances, the Wifi antenna 2420 and the Bluetooth antenna 2430 are used to monitor wireless signals sent from mobile devices within the vehicle. For example, the antennae 2420, 2430 can be configured to monitor for wireless signals when the vehicle is in motion. When a wireless signal is detected, the fault or alert may be provided by the processor 2410 to a desired location or device. To avoid interference from mobile devices outside of the vehicle, the power of the antennae 2420, 2430 can be selected such that signals within about 4-8 feet of the antenna 2420, 2430 are detected, e.g., about 4-6 feet.

Figure 25:
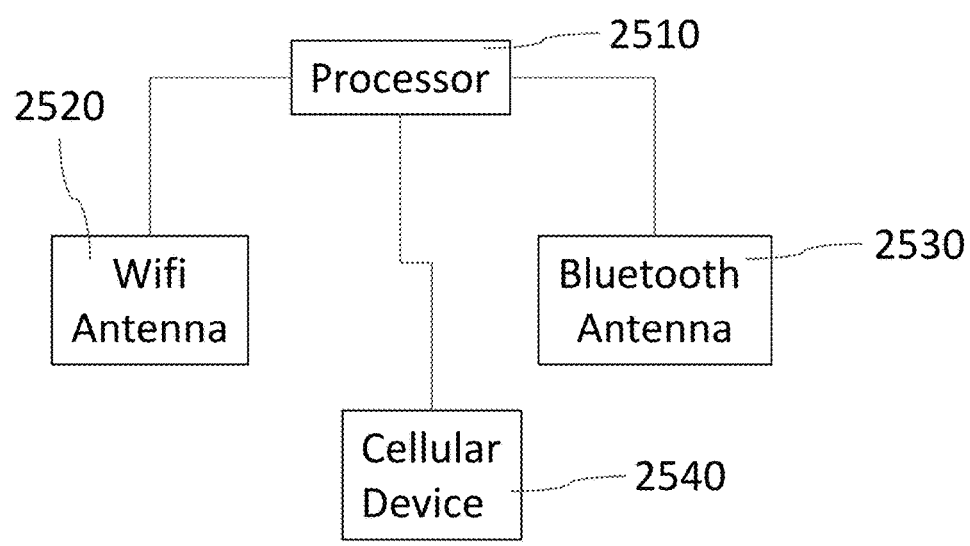

It will be recognized by the person of ordinary skill in the art, given the benefit of this disclosure, that the sniffing methods and devices can piggyback onto Wifi hotspots already present in certain vehicles. For example, the sniffing device may include only a wifi antenna, Bluetooth antenna (or both) and use the cellular connection from the vehicle hotspot to send sniffing activity to a remote user. Where no vehicle cellular connection exists, the sniffing device may also comprise a cellular device or chip. For example and referring to FIG. 25, a system comprising a processor 2510, a Wifi antenna 2520, a Bluetooth antenna 2530 and a cellular device 2540 is shown. Each of the components 2520, 2530, 2540 is electrically coupled to the processor 2510. The cellular device 2540 can be configured to send alerts or faults to a remote administrator. In addition, the cellular device 2540 can receive input from the remote administrator to alter the system functioning, e.g., to authenticate or de-authenticate authorized mobile devices, to disable the vehicle remotely, to send the driver alerts, etc. The exact nature of the cellular device 2540 can vary and typically the cellular device may be, or may comprise, a cellular chip or device designed to connect to a cellular network such as, for example, a GSM based network, a CDMA based network or other types of cellular networks.

In certain instances, the sniffing device can be used to determine if one or more mobile devices are authorized or unauthorized mobile devices. For example, the MAC address of a mobile device detected using the sniffing device can be compared to a table of authorized MAC addresses to determine if the mobile device is authorized or not. Where the MAC address of the mobile device is not authorized, the user may not be able to start the vehicle or an alert can be sent that an unauthorized mobile device has been detected. In some instances, the sniffing device can be used to detect if more than a single mobile device is present in the vehicle. For example, the vehicle operator may have a company phone and a personal phone. The sniffing device can detect the presence of both phones. An alert can be sent to an administrator notifying them of the presence of another mobile device and optionally permitting the administrator to contact the vehicle operator to inquire about the second device. This configuration may be particularly useful to prevent the vehicle operator from texting (or using other functions of the mobile device) while driving using their personal mobile device.

In some instances, the sniffing system can be configured to store alerts and send them at a later time. For example, if the vehicle is being operated in a dead zone or out of range of a cellular tower, any alerts triggered by the system can be stored and later sent to an administrator once a suitable cellular connection is reestablished. This configuration may be particularly desirable when cellular service is not reliable in certain areas.

In certain examples, the sniffing device can be configured to periodically poll or sniff for wireless signals. This frequency can be adjustable or can be fixed. In some instances, the sniffing device can sniff every 30 seconds, every minute, every two minutes, every five minutes, etc. In certain configurations, the sniffing frequency can be randomized so the vehicle operator cannot easily ascertain when the sniffing device will be searching for wireless signals within the vehicle. The particular frequency at which the sniffing device searches for wireless signals can also be varied. While a typical cellular device may operate at a frequency of about 700-2700 MHz, the exact frequency or frequencies detected by the sniffing device may vary. In some instances, the sniffing device can be designed to sweep a frequency range to detect whether any wireless signals across the frequency range are present. In other instances, the sniffing device can be designed to detect frequencies at one, two, three or four frequencies which can correspond to the frequencies typically used by three band or four band mobile devices.

In certain instances, the sniffing device can be powered by the vehicle by hardwiring the system to the battery of the vehicle, by coupling the sniffing device to the OBDII port of the vehicle, by configuring the sniffing device so it can be wirelessly charged by the vehicle or in other manners. The sniffing device can include an on-board battery to permit operation of the sniffing device for some period even if the vehicle loses power or the power connection is terminated in some manner. The sniffing device can be configured to send an alert if the power connection is interrupted so a remote administrator can take appropriate action.

The sniffing device may also comprise one or more backup devices which can be activated or used if some functions of the vehicle are no longer detected by the sniffing device. For example, the sniffing device can include an on-board accelerometer to compare the vehicle movement with signals from the vehicle speed sensor to ensure that mobile device operation is detected if the vehicle is in motion. It may be possible to trick the vehicle speed sensor to register that the vehicle is not in motion, e.g., by grounding the VSS wire, and the presence of an accelerometer in the sniffing device itself would allow the sniffing device to independently determine if the vehicle is in motion or not.

In some embodiments, the sniffing device can be designed to permit passage of signals from certain apps on the mobile device without triggering a fault or alert. For example, music can be played or streamed to/from the mobile device without triggering a fault or alert. Certain apps or mobile device functions can be permitted while others can be excluded. Application software can be installed on the mobile device and used to communicate with the sniffing device to permit permissible applications to be used on the mobile device. For example, the system or mobile device can include a list of permissible applications which can be functional when the vehicle is in motion without generating a fault or alert. Use of applications on the mobile device which are not on the permissible list can trigger a fault or alert and notify an administrator or otherwise make a record of the alert.

In some instances, the sniffing device can be used in a valet mode or may include a valet pin, e.g., which can be entered on the mobile device. The valet mode can, for example, be designed to implement geofencing so that the vehicle must be present within a certain zone to avoid triggering an alert. If the vehicle goes beyond a certain radius, then an alert can be triggered. Similarly, the valet mode can permit operation of the vehicle only below a certain speed, e.g., 5 mph or 10 mph, if desired. Where geofencing is implemented, the sniffing device typically comprises its own GPS to implement the geofencing independent of the vehicle or a remote administrator.

In certain examples, the sniffing device can also be configured to monitor vehicle maintenance items including, for example, miles driven, hours between oil changes, diesel exhaust fluid levels, brake wear indicators, driver's logs, etc. For example, the sniffing device can be configured to implement logic to alert a driver that the vehicle has insufficient diesel exhaust fluid based on a particular route or trip programmed into the GPS. This alerting would prevent the vehicle operator from operating the vehicle without sufficient fluids for the trip. If desired, the sniffing device can be used with an ignition interlock or transmission control module interlock, as noted herein, to prevent the vehicle from starting and/or being placed into drive if insufficient maintenance fluids are present in the vehicle for a particular route or trip.

Certain specific examples are described below to illustrate some aspects and configurations of the technology described herein.

EXAMPLE 1

Figure 26:
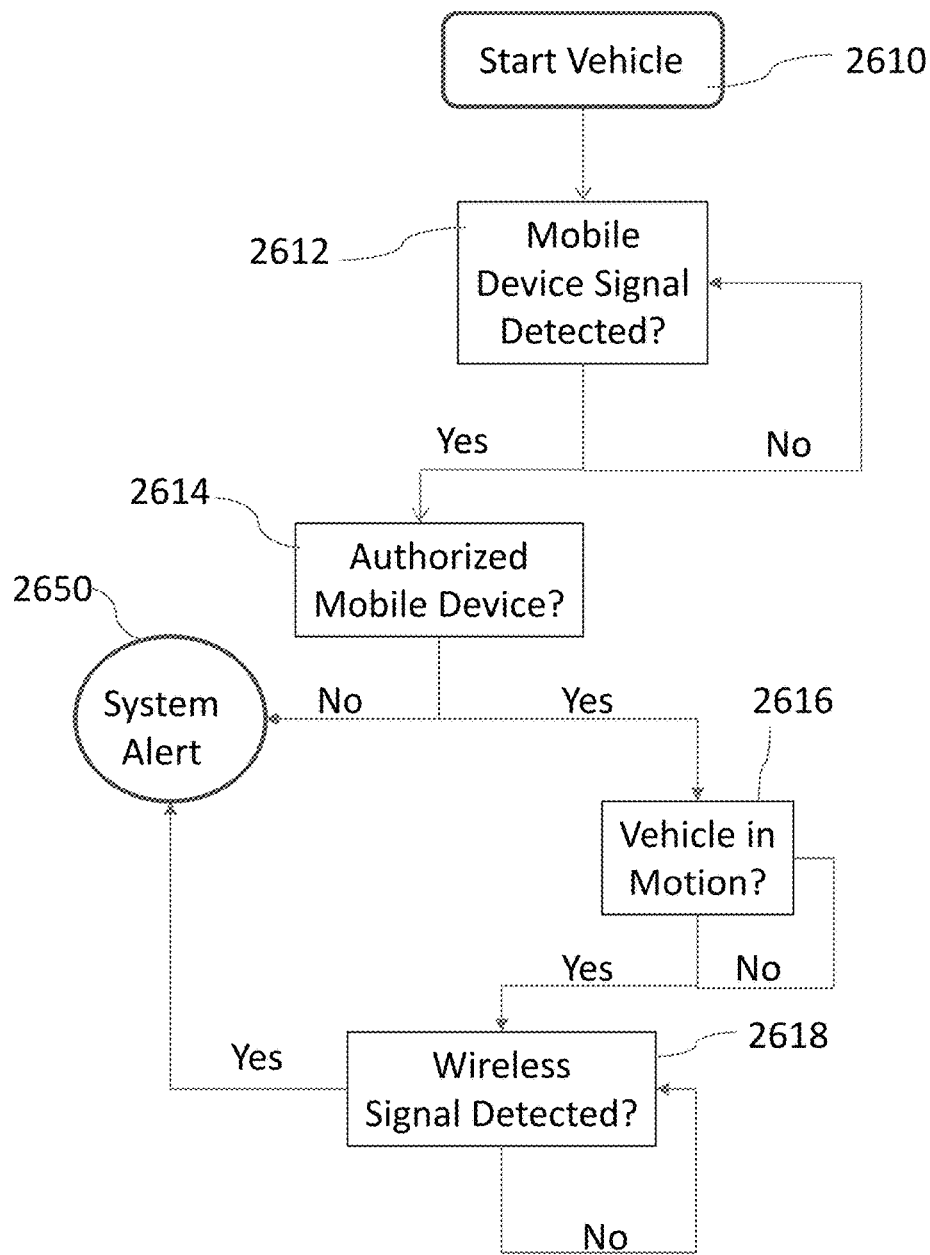
FIGS. 26 and 27 show various process steps which can be implemented using a sniffing system.

To illustrate operation of a sniffing device, the following prophetic example is described with reference to FIG. 26. A driver enters a vehicle that comprises a sniffing device. The driver starts the vehicle at a step 2610. The sniffing device detects whether a mobile device is present at step 2612. If no device is detected, then the sniffing device periodically rechecks whether a mobile device is present at step 2612. If a mobile device is detected, then the sniffing device determines if the mobile device is an authorized device at step 2614. If the mobile device is not an authorized device, then a system alert 2650 is generated and/or stored or sent to a remote administrator. If the detected mobile device is an authorized mobile device, then the sniffing device checks to determine if the vehicle is in motion at step 2616. If no vehicle motion is detected, then the sniffing device periodically rechecks for vehicle motion at step 2616. If vehicle motion is detected, e.g., vehicle motion above 5 mph or 10 mph, then the sniffing device checks to see if a wireless signal from the mobile device is detected still at a step 2618. If no wireless signal is detected, then the sniffing device periodically rechecks for wireless signals at step 2618. If a wireless signal is detected, then the sniffing device generates a fault or alert 2650, which is stored or sent to a remote administrator or both.

EXAMPLE 2

Figure 27:
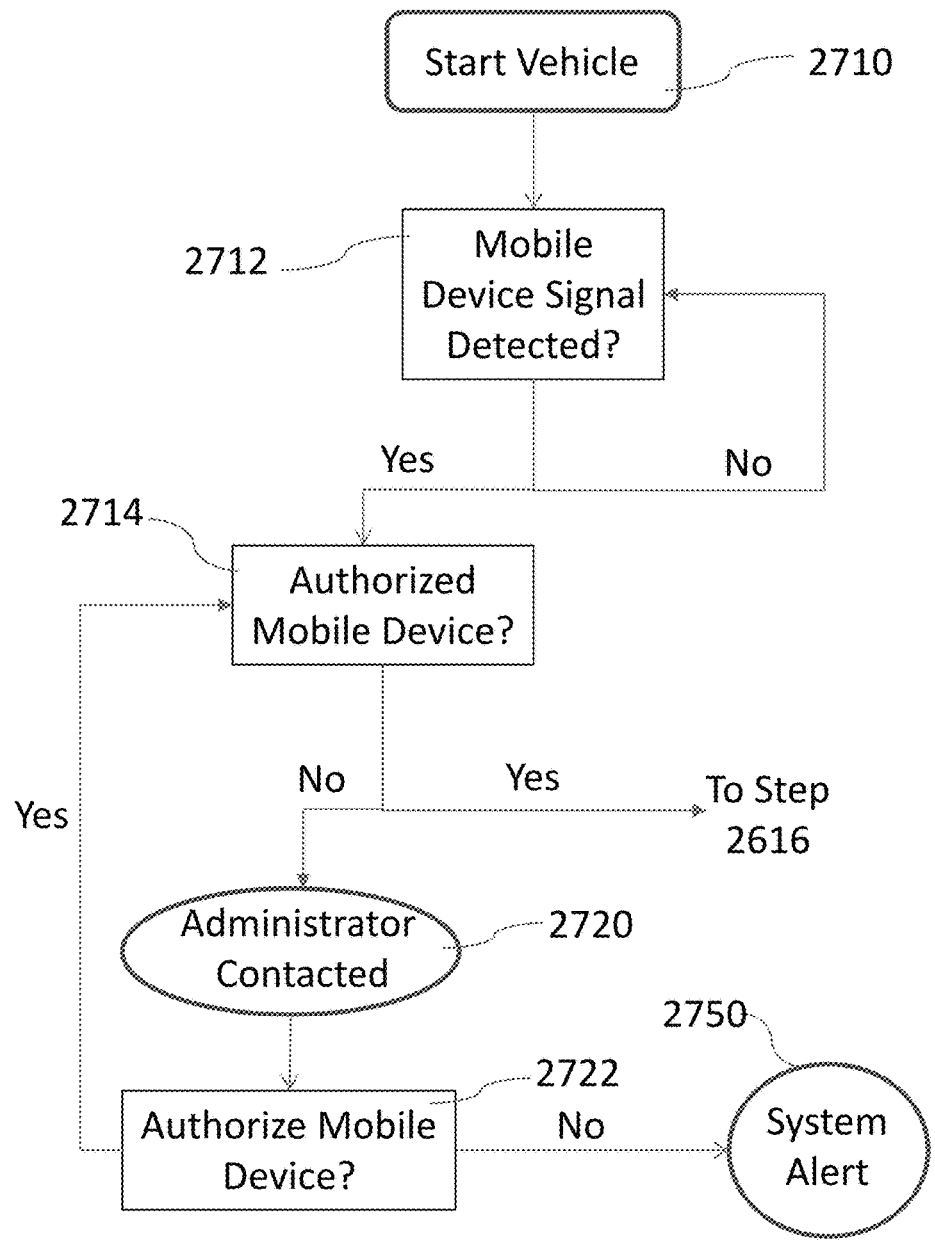

Mobile device users can also be authenticated in real time. Referring to the prophetic example shown in FIG. 27, once a vehicle is started at step 2710, the presence of a mobile device can be detected at a step 2712. If a mobile device is not detected, then the sniffing device can periodically check for mobile devices. If a mobile device is detected, then the sniffing device can determine if the mobile device is an authorized mobile device or not at step 2714. If the mobile device is an authorized mobile device, then a process similar to that described in connection with FIG. 26 may proceed. If the mobile device is not an authorized mobile device, than an alert can be sent to a remote administrator at a step 2720, where the administrator can authorize the device for some period at step 2722, e.g., for a day, week, month, permanently, etc. or can choose not to authorize the device which will cause a system alert 2750. Where two or more mobile devices are present in the vehicle, the steps shown in FIGS. 26 and 27 may be implemented simultaneously to detect whether each of the two or more mobile device are authorized.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications and alterations of the disclose illustrative aspect, examples and embodiments are possible.

What is claimed is:

1. A system configured to detect the presence of at least one mobile device within a vehicle and determine if the detected mobile device is an authorized mobile device and whether non hands free mobile device functions are being used while the vehicle is in motion, the system comprising a processor separate from a vehicle engine control unit, in which the processor is electrically coupled to a first antenna configured to receive a wireless transmission from the mobile device when the mobile device is present in the vehicle and transmitting wirelessly, the processor configured to determine if the detected mobile device is an authorized mobile device, the processor further configured to determine if the non hands free mobile device functions of the authorized mobile device are being used when the vehicle is in motion wherein the processor is configured to detect a unique identifier in the received wireless transmission from the mobile device and compare the received unique identifier of the mobile device with a remote listing of mobile device identifiers of authorized mobile devices to thereby determine if the detected mobile device is an authorized mobile device, wherein the remote listing of mobile device identifiers is present on a system separate from the vehicle, and wherein the unique identifier in the received wireless transmission from the mobile device comprises at least one of a MAC address, a SIM number, a USB number, an alpha numeric number or does not include any numeric information, in which the processor is configured to determine if the vehicle is in motion and is configured to permit use of the detected mobile device if the vehicle is not in motion and generate an alert if use of the non hands free mobile device functions is detected when the vehicle is in motion.

2. The system of claim 1, in which the system is configured to generate an alert if the detected mobile device is determined to be an unauthorized mobile device.

3. The system of claim 2, in which the system is configured to detect a presence of all mobile devices present in the vehicle and determine if all the detected mobile devices are authorized mobile devices.

4. The system of claim 2, in which the processor is configured to compare a MAC address of a detected wireless transmission from the mobile device with a listing of local authorized MAC addresses present in a memory unit of the vehicle to determine if the detected mobile device is present in the listing of the local authorized MAC addresses to thereby determine whether the detected mobile device is an authorized mobile device.

5. The system of claim 4, in which the system is configured to permit a remote administrator to update the listing of the local authorized MAC addresses to add the MAC address of the detected mobile device to the listing of the local authorized MAC addresses to render the detected mobile device to be an authorized mobile device if the MAC address of the mobile device is not originally present in the listing of the local authorized MAC addresses.

6. The system of claim 2, in which the system is configured to compare a MAC address of the detected wireless transmission with a remote listing of authorized MAC addresses to determine if the detected mobile device is present in the remote listing of authorized mobile device to thereby determine if the detected mobile device is an authorized mobile device, wherein the remote listing of authorized MAC addresses is present on a system separate from the vehicle.

7. The system of claim 6, in which the system is configured to permit a remote administrator to update the remote listing authorized MAC addresses to add the MAC address of the detected mobile device to the listing of the remote authorized MAC addresses to render the detected mobile device to be an authorized mobile device if the MAC address of the mobile device is not originally present in the listing of the remote authorized MAC addresses.

8. The system of claim 1, further comprising a second antenna electrically coupled to the processor, in which the second antenna is different than the first antenna.

9. The system of claim 1, in which the processor is further configured to determine if the vehicle is in motion when the first antenna receives the wireless transmission from the mobile device.

10. The system of claim 9, in which the system is configured to alert a remote administrator if a wireless transmission is detected when the vehicle is in motion.

11. The system of claim 1, in which the system is configured to electrically couple to a vehicle communication system.

12. The system of claim 11, in which the system electrically couples to the vehicle communication system through an OBDII port or a CAN bus of the vehicle.

13. The system of claim 12, in which the processor is configured to determine if the vehicle is in motion using a vehicle speed sensor of the vehicle, in which the vehicle speed sensor is electrically coupled to the vehicle communication system.

14. The system of claim 13, in which the processor is configured to permit use of the detected mobile device if the vehicle is not in motion and prohibit use of the non hands free mobile device functions if the vehicle is in motion.

15. The system of claim 13, in which the system is configured to permit use of permissible mobile device applications when the vehicle is in motion without generating a system alert.

16. The system of claim 1, in which the system further comprises at least one of a cellular device electrically coupled to the processor or an accelerometer electrically coupled to the processor.

17. The system of claim 16, in which the first antenna is configured to detect the presence of the mobile device within an 8 foot radius of the antenna, in which the processor is configured to compare a MAC address of the detected wireless transmission with the listing of the authorized MAC addresses present in a memory unit of the vehicle to determine if the detected mobile device is an authorized mobile device, and in which the cellular device is configured to alert a remote administrator if the detected mobile device is determined to be an unauthorized mobile device not present in the listing of the authorized MAC addresses.

18. The system of claim 17, in which the system is configured to permit the remote administrator to add the MAC address of the detected, unauthorized mobile device to the listing of the authorized MAC addresses.

19. The system of claim 17, in which the system is configured to store generated alerts and transmit the generated alerts to a remote user separate from the vehicle if the cellular device loses its connection to a cellular network.

* * * * *